US012694323B2

(12) United States Patent
King et al.

(10) Patent No.: US 12,694,323 B2
(45) Date of Patent: Jul. 28, 2026

(54) SYSTEMS AND METHODS FOR DEGENERACY MITIGATION IN A QUANTUM PROCESSOR

(71) Applicant: 1372934 B.C. Ltd., Burnaby (CA)

(72) Inventors: Andrew Douglas King, Vancouver (CA); Alexandre Fréchette, Montreal (CA); Evgeny A. Andriyash, Vancouver (CA); Trevor Michael Lanting, Vancouver (CA); Emile M. Hoskinson, Vancouver (CA); Mohammad H. Amin, Coquitlam (CA)

(73) Assignee: 1372934 B.C. LTD., Burnaby (CA)

( * ) Notice: Subject to any disclaimer, the term of this patent is extended or adjusted under 35 U.S.C. 154(b) by 532 days.

(21) Appl. No.: 18/138,989

(22) Filed: Apr. 25, 2023

(65) Prior Publication Data

US 2023/0334355 A1      Oct. 19, 2023

Related U.S. Application Data

(63) Continuation of application No. 17/379,172, filed on Jul. 19, 2021, now Pat. No. 11,681,940, which is a
(Continued)

(51) Int. Cl.
| | | |
|---|---|---|
| *G06N 10/70* | (2022.01) | |
| *G06F 15/163* | (2006.01) | |
| *G06N 10/60* | (2022.01) | |

(52) U.S. Cl.
CPC ........... *G06N 10/70* (2022.01); *G06F 15/163* (2013.01); *G06N 10/60* (2022.01)

(58) Field of Classification Search
CPC ....... G06N 10/70; G06N 10/60; G06F 15/163
See application file for complete search history.

(56) References Cited

U.S. PATENT DOCUMENTS

| | | | |
|---|---|---|---|
| 7,275,010 B2 | 9/2007 | Mitschang | |
| 7,533,068 B2 | 5/2009 | Maassen et al. | |
| (Continued) | | | |

FOREIGN PATENT DOCUMENTS

| | | |
|---|---|---|
| CN | 1498416 A | 5/2004 |
| CN | 101399425 A | 4/2009 |
| (Continued) | | |

OTHER PUBLICATIONS

Altshuler, et al., "Anderson localization casts clouds over adiabatic quantum optimization", arXiv:0912.0746v1 [quant-ph] Dec. 3, 2009, 14 pages.
(Continued)

*Primary Examiner* — Mark D Featherstone
(74) *Attorney, Agent, or Firm* — Cozen O'Connor

(57) ABSTRACT

Degeneracy in analog processor (e.g., quantum processor) operation is mitigated via use of floppy qubits or domains of floppy qubits (i.e., qubit(s) for which the state can be flipped with no change in energy), which can significantly boost hardware performance on certain problems, as well as improve hardware performance for more general problem sets. Samples are drawn from an analog processor, and devices comprising the analog processor evaluated for floppiness. A normalized floppiness metric is calculated, and an offset added to advance the device in annealing. Degeneracy in a hybrid computing system that comprises a quantum processor is mitigated by determining a magnetic susceptibility of a qubit, and tuning a tunneling rate for the qubit based on a tunneling rate offset determined based on the magnetic susceptibility. Quantum annealing evolution is controlled by causing the evolution to pause for a determined pause duration.

9 Claims, 28 Drawing Sheets

Related U.S. Application Data continuation of application No. 15/771,606, filed as application No. PCT/US2016/059169 on Oct. 27, 2016, now Pat. No. 11,100,416.

(60) Provisional application No. 62/399,764, filed on Sep. 26, 2016, provisional application No. 62/331,288, filed on May 3, 2016, provisional application No. 62/324,210, filed on Apr. 18, 2016, provisional application No. 62/247,085, filed on Oct. 27, 2015.

(56) References Cited

U.S. PATENT DOCUMENTS

| | | | |
|---|---|---|---|
| 7,624,088 B2 | 11/2009 | Johnson et al. | |
| 7,788,192 B2 | 8/2010 | Amin | |
| 7,800,395 B2 | 9/2010 | Johnson et al. | |
| 7,843,209 B2 | 11/2010 | Berkley | |
| 7,876,248 B2 | 1/2011 | Berkley et al. | |
| 7,898,282 B2 | 3/2011 | Harris et al. | |
| 7,984,012 B2 | 7/2011 | Coury et al. | |
| 8,098,179 B2 | 1/2012 | Bunyk et al. | |
| 8,169,231 B2 | 5/2012 | Berkley | |
| 8,174,305 B2 | 5/2012 | Harris | |
| 8,175,995 B2 | 5/2012 | Amin | |
| 8,190,548 B2 | 5/2012 | Choi | |
| 8,195,596 B2 | 6/2012 | Rose et al. | |
| 8,229,863 B2 | 7/2012 | Amin et al. | |
| 8,421,053 B2 | 4/2013 | Bunyk et al. | |
| 8,536,566 B2 | 9/2013 | Johansson et al. | |
| 8,670,807 B2 | 3/2014 | Rose et al. | |
| 8,700,689 B2 | 4/2014 | Macready et al. | |
| 8,854,074 B2 | 10/2014 | Berkley | |
| 9,015,215 B2 | 4/2015 | Berkley et al. | |
| 9,218,567 B2 | 12/2015 | Macready et al. | |
| 9,495,644 B2 | 11/2016 | Chudak et al. | |
| 9,588,940 B2 | 3/2017 | Hamze et al. | |
| 9,882,112 B2 | 1/2018 | Kwon et al. | |
| 9,949,020 B1 | 4/2018 | Gedney et al. | |
| 10,002,107 B2 | 6/2018 | Lanting | |
| 10,031,887 B2 | 7/2018 | Raymond | |
| 10,552,755 B2 | 2/2020 | Lanting et al. | |
| 10,599,988 B2 | 3/2020 | Thom et al. | |
| 10,671,937 B2 | 6/2020 | Yarkoni et al. | |
| 10,769,545 B2 | 9/2020 | Amin et al. | |
| 11,062,227 B2 | 7/2021 | Amin et al. | |
| 11,100,416 B2 | 8/2021 | Lanting et al. | |
| 11,157,817 B2 | 10/2021 | Rolfe | |
| 11,295,225 B2 | 4/2022 | Hoskinson et al. | |
| 11,481,669 B2 | 10/2022 | Rolfe et al. | |
| 2003/0141868 A1 | 7/2003 | Bakharev | |
| 2005/0059138 A1 | 3/2005 | Vitaliano et al. | |
| 2005/0119829 A1 | 6/2005 | Bishop et al. | |
| 2006/0115145 A1 | 6/2006 | Bishop et al. | |
| 2008/0103996 A1 | 5/2008 | Forman et al. | |
| 2009/0289638 A1 | 11/2009 | Farinelli et al. | |
| 2010/0185422 A1 | 7/2010 | Hoversten | |
| 2010/0228694 A1 | 9/2010 | Le et al. | |
| 2012/0319684 A1 | 12/2012 | Gambetta et al. | |
| 2014/0025926 A1 | 1/2014 | Yao et al. | |
| 2014/0040176 A1 | 2/2014 | Balakrishnan et al. | |
| 2014/0214835 A1 | 7/2014 | Oehrle et al. | |
| 2014/0297235 A1 | 10/2014 | Arora et al. | |
| 2014/0297247 A1 | 10/2014 | Troyer et al. | |
| 2015/0009746 A1 | 1/2015 | Kucsko et al. | |
| 2015/0032992 A1 | 1/2015 | Goettfert et al. | |
| 2015/0324705 A1 | 11/2015 | Biercuk et al. | |
| 2018/0307988 A1 | 10/2018 | Fano et al. | |
| 2018/0341874 A1 | 11/2018 | Puri et al. | |
| 2018/0365587 A1 | 12/2018 | Barzegar et al. | |
| 2021/0004709 A1 | 1/2021 | Mohseni et al. | |
| 2021/0241143 A1 | 8/2021 | Amin | |
| 2022/0215282 A1 | 7/2022 | Amin | |

FOREIGN PATENT DOCUMENTS

| | | |
|---|---|---|
| CN | 104715806 A | 6/2015 |
| JP | 2012502563 A | 1/2012 |
| WO | 2005093649 A1 | 10/2005 |
| WO | 2007085074 A1 | 8/2007 |
| WO | 2009152180 A2 | 12/2009 |
| WO | 2013082382 A1 | 6/2013 |
| WO | 2015103372 A1 | 7/2015 |
| WO | 2015156126 A1 | 10/2015 |
| WO | 2016089711 A1 | 6/2016 |

OTHER PUBLICATIONS

Amin, "Effect of Local Minima on Adiabatic Quantum Optimization," arXiv:0709.0528v2, Apr. 4, 2008.

Amin, et al., "Thermally Assisted Adiabatic Quantum Computation", arXiv:cond-mat/0609332v1 [cond-mat.mes-hall], Sep. 13, 2006.

Chancellor, "Modernizing Quantum Annealing Using Local Searches", arXiv:1606.06833v1 [quant-ph] Jun. 22, 2016, 22 pages.

Crowley, et al., "Quantum and Classical in Adiabatic Computation", rXiv:1405.5185v1 [quant-ph] May 20, 2014, 9 pages.

DelaFuente Ruiz, "Quantum annealing", http://www.linkedin.com/in/alfonsofr, 2014, 21 pages.

Dickson et al., "Thermally Assisted Quantum Annealing of a 16-Qubit Problem," Nature Communications, 2013, 6 pages.

Farhi et al., "A quantum adiabatic evolution algorithm applied to random instances of an NP-Complete problem", Science, vol. 292, Apr. 20, 2001.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Farhi et al., "Quantum Adiabatic Evolution Algorithms with Different Paths," arXiv:quant-ph/0208135v1, Aug. 21, 2002, 10 pages.

Farhi, et al., "Quantum Computation by Adiabatic Evolution", arXiv:quant-ph/0001106 v1 Jan. 28, 2000, 24 pages.

Friedman et al., "Quantum superposition of distinct macroscopic states," Nature 406:43-46, Jul. 6, 2000.

Garanin, et al., "Effects of nonlinear sweep in the Landau-Zener-Stueckelberg effect", Physical Review B 66, 174438 2000, 11 pages.

Hogg, "Adiabatic quantum computing for random satisfiability problems", Physical Review A 67, 022314, (2003), 7 pages.

Izmalkov, et al., "Observation of Macroscopic Landau-Zener Transitions in a Superconducting Device", Europhys. Lett., 65 (6), pp. 844-849 (2004).

Kaminsky et al., "Scalable Architecture for Adiabatic Quantum Computing of NP-Hard Problems", arXiv:quant-ph/0211152, Nov. 23, 2002.

Kaminsky et al., "Scalable Superconducting Architecture for Adiabatic Quantum Computation," arXiv:quant-ph/0403090v1, Mar. 11, 2004, 5 pages.

Kieu, "Quantum Adiabatic Computation and the Travelling Salesman Problem", arXiv:quant-ph/0601151v2, Mar. 29, 2006, 7 pages.

Lee et al., "Global Optimization: Quantum Thermal Annealing with Path Integral Monte Carlo", J. Phys. Chem. A 2000, 104,86-95.

Lee, et al., "A Renormalization Approach to Quantum Thermal Annealing ", Ann. Phys (Leipzig) 9 (2000) 9-10, 668-678.

Mitchell, et al., "A Random Matrix Model of Adiabatic Quantum Computing", arXiv:quant-ph/0409088 v1 Sep. 15, 2004, 9 pages.

Morita, et al., "Quantum-thermal annealing with cluster-flip algorithm", arXiv:0903.2206v2 [cond-mat.dis-nn] Jun. 8, 2009, 4 pages.

Roland, et al., "Quantum Search by Local Adiabatic Evolution", arXiv:quant-ph/0107015v1, Jul. 3, 2001, 4 pages.

Sarandy, et al., "Adiabatic Quantum Computation in Open Systems", Physical Review Letters, PRL 95, 250503 (2005). 4 pages.

Steffen, et al., "Experimental Implementation of an Adiabatic Quantum Optimization", Physical Review Letters, vol. 90, No. 6. Feb. 14, 2003, 4 pages.

Suzuki et al., "Quantum Ferromagnetic Annealing," Physica E: Low-Dimensional Systems and Nanostructures, 40 (2):367-370, Dec. 2007.

(56)         References Cited

OTHER PUBLICATIONS

Tanaka, et al., "Hybrid Quantum Anneal for Clustering Problems", arXiv:1104.3246v1 [cond-mat.dis-nn] Apr. 16, 2011, 24 pages.

Tian, et al., "Resonant cancellation of off-resonant effects in a multilevel qubit", Physical Review A, vol. 62, 050301 (R), 2000, 4 pages.

Tokuda, "Analog Computation Using Single-Electron Circuits", Analog Integrated Circuits and Signal Processing, Oct. 1, 2000. http://lalsie.ist.hokudai.ac.jp/publication/dlcenter.php?fn=paper/aicsp_2000_tokuda.pdf.

Vinci, et al., "Distinguishing Classical and Quantum Models for the D-Wave Device", arXiv:1403.4228v1 [quant-ph] Mar. 17, 2014, 29 pages.

Amin et al., Macroscopic Resonant Tunneling in the Presence of Low Frequency Noise, arXiv:0712.0845 [cond-mat.mes-hall], May 13, 2008, pp. 1-4.

Bluhm, et al., "Enhancing the Coherence of Spin Qubits by Narrowing the Nuclear Spin Bath Using a Quantum Feedback Loop", arXiv:1003.4031v1 [cond-mat.mes-hall] Mar. 21, 2010, 5 pages.

Boixo, et al., "Experimental signature of programmable quantum annealing", arXiv:1212.1739v1 [quant-ph], Dec. 7, 2012, 12 pages.

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.

Burton Jr. et al., "Event-Dependent Control of Noise Enhances Learning in Neural Networks," Neural Networks vol. 5, 1992, pp. 627-637.

Chinese Office Action for Application No. CN 2016800763698, dated Jun. 11, 2021, 26 pages (including English translation).

Clarke et al., "Quiet Readout of Superconducting Flux States," Physica Scripta. T102: 173-177, 2002.

Denchev et al., "What is the Computational Value of Finite Range Tunneling," arXiv:1512.02206 Jan. 22, 2016.

Dickson, N.G. et al., "Algorithmic Approach to Adiabatic Quantum Optimization," Physical Review A 85(032303), 7 pages, 2012.

Harris et al., "Probing Noise in Flux Qubits via Macroscopic Resonant Tunneling", arXiv:0712.0838v2 [cond-mat.mes-hall], Feb. 8, 2008, pp. 1-4.

Hendrik Bluhm et al., "Enhancing the Coherence of a Spin Qubit by Operating it as a Feedback Loop that Controls its Nuclear Spin Bath", Physical Review Letters, Nov. 19, 2010 (Year: 2010).

International Search Report for PCT/US2020/027532, mailed Jul. 23, 2020, 3 pages.

Kechedzhi, et al., "Efficient population transfer via non-ergodic extended states in quantum spin glass", arXiv:1807.04792v1 [quant-ph] Jul. 12, 2018, 16 pages.

King, et al., "Quantum critical dynamics in a 5000-qubit programmable spin glass", arXiv:2207.13800v1 [quant-ph] Jul. 27, 2022, 41 pages.

Kone et al., "Selection of Temperature Intervals for Parallel-tempering Simulations", The Journal of Chemical Physics Mar. 25, 2005. https://aip.scitation.org/doi/10.1063/1.1917749.

Kumar, P. et al., "Origin and Suppression of 1/f Magnetic Flux Noise," arXiv:1604.00877v1 [cond-mat.supr-con] Apr. 4, 2016, 13 pages.

Kurihara, K. et al., "Quantum Annealing for Clustering," arXiv:1408.2035v1, Aug. 9, 2014, 8 pages.

Lanting, T. et al., "Experimental Demonstration of Perturbative Anticrossing Mitigation Using Nonuniform Driver Hamiltonians," Physical Review A 96(042322), 8 pages, 2017.

Li, Y. et al., "Hybrid Parallel Tempering and Simulated Annealing Method," Applied Mathematics and Computation, 212:216-228, 2009.

Non Final Office Action for U.S. Appl. No. 17/379,172, mailed Sep. 15, 2022, 11 pages.

Ozfidan et al., "Demonstration of Nonstoquastic Hamiltonian in Coupled Superconducting Flux Qubits," arXiv:1903.06139 Nov. 8, 2019.

Preskill, "Quantum Computing in the NISQ era and beyond", arXiv:100862v3 [quant ph] Jul. 31, 2018, 20 pages.

Ronnow et al., "Defining and Detecting Quantum Speedup," arXiv:1401.2910v1 Jan. 13, 2014.

S, Yu and Z. Xi, "The dynamics of a hybrid system based on the NV center in spin bath," 2015 34th Chinese Control Conference (CCC), 2015, pp. 8357-8361, doi: 10.1109/ChiCC.2015.7260967. (Year: 2015).

Sendelbach, S. et al., "Magnetism in SQUIDs at Millikelvin Temperatures," arXiv:0802.1518v1 [cond-mat.supr-con] Feb. 11, 2008, 4 pages.

Smelyanskiy, et al., "Non-ergodic delocalized states for efficient population transfer within a narrow band of the energy landscape", arXiv:1802.09542v2 [quant-ph] May 23, 2018, 48 pages.

Wang, et al., "Many-body localization enables iterative quantum optimization", arXiv:2111.00842v1 [quant-ph], Nov. 1, 2021, 7 pages.

Written Opinion for PCT/US2020/027532, mailed Jul. 23, 2020, 4 pages.

Boixo, et al., "Computational Role of Multiqubit Tunneling in a Quantum Annealer", arXiv:1502.05754v1 [quant-ph], Feb. 20, 2015, pp. 1-7.

Brochu, et al., Brochu et al., "A Tutorial on Bayseian Optimization of Expensive Cost Functions, with Application to Active User Modeling and Hierarchical Reinforcement Learning", arXiv:1012.2599v1 [cs.LG], Dec. 12, 2010, pp. 1-49.

Dickson, Dickson, Niel G. "Elimination of perturbative crossings in adiabatic quantum optimization", New Journal of Physics, 13, Jul. 11, 2011, 073011, 13pp.

Hutter, et al., "Sequential Model-Based Optimization for General Algorithm Configuration", Springer-Verlag Berlin Heidelberg, LION 5, LNCS 6683, 2011, pp. 507-523.

Ingber, Adaptive Simulated Annealing, ASA Options, Jan. 2012, pp. 1-22.

King, et al., "Degeneracy, degree, and heavy tails in quantum annealing" Physical Review a 93, (2016) pp. 052320-1 to 052320-12 (yEAR:2016).

Maryak, et al., Efficient Global Optimization Using SPSA, Proceedings of the American Control Conference, San Diego, California, Jun. 1999, pp. 890-894.

Snoek, et al., Practical Bayesian Optimization of Machine Learning Algorithms, arXiv:1206.2944v2 [stat.ML], Aug. 29, 2012, pp. 1-12.

Swersky, Multi-Task Bayesian Optimization, Advances in Neural Information Processing Systems 26, 2013, pp. 1-9.

Mohseni, et al., "Engineering non-equilibrium quantum phase transitions via casually gapped Hamiltonians" arXix:1804.11037v2 [quant-ph] Oct. 19, 2018, 16 pages.

Ben-Tal, et al., "Robust optimization—methodology and applications", Math. Program., Ser. B 92: 453-480 (2002), Digital Object Identifier (DOI) 10.1007/s101070100286.

Karimi, et al., "Boosting quantum annealer performance via sample persistence", arXiv:1606.07797v4 [quant-ph] May 18, 2017, 25 pages.

Lewis, et al., "Probabilistic multistart with path relinking for solving the unconstrained binary quadratic problem", Int. J. Operational Research, vol. 26, No. 1, 2016.

Notice of Reasons for Rejection dated Jan. 22, 2024, for Japanese Application No. 2022-162242, 5 pages.

200

202

Receive Problem

204

Collect Samples

206

Determine Qubit
Susceptibility χ

208

Determine Subset
of Qubits to be
Tuned

210

Determine Δ-Tuning
Offset for Qubit

212

Tune Qubit Δ

214

Compute Solution

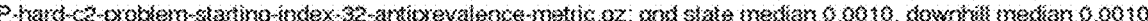
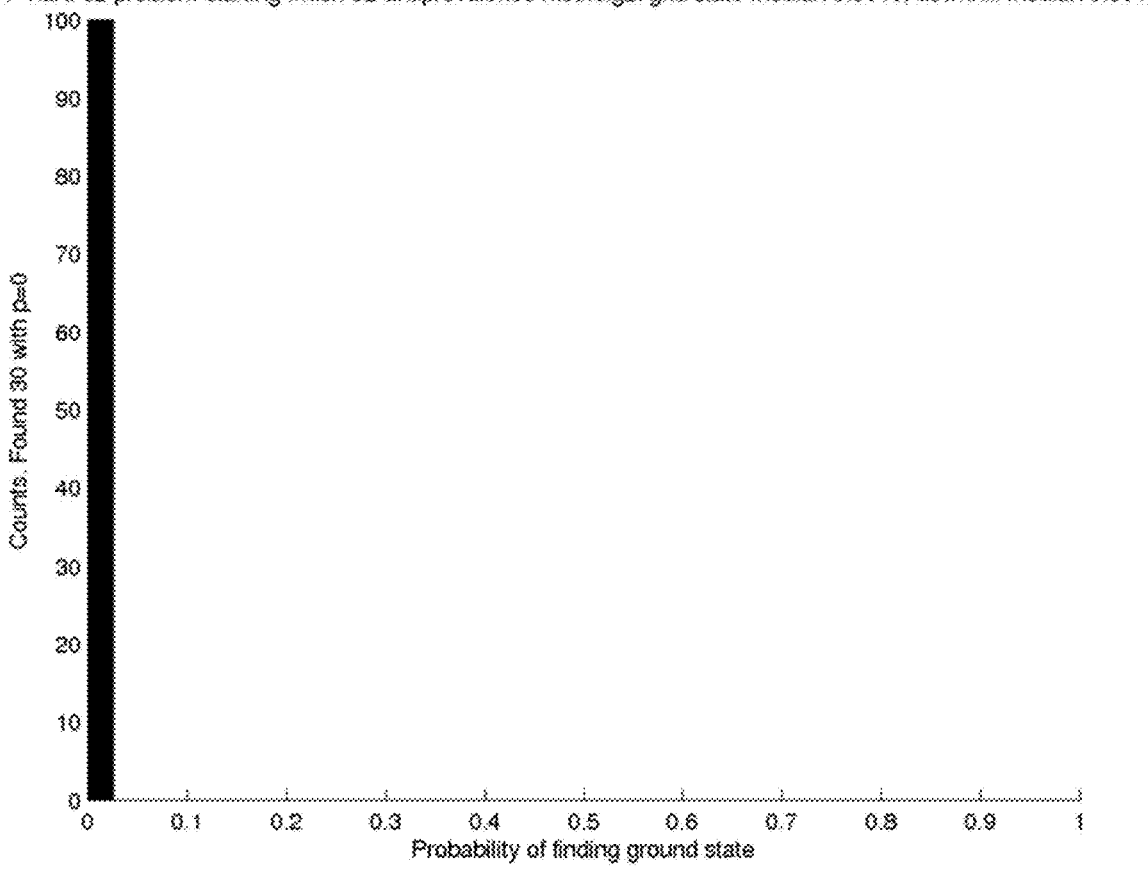
Fig. 10

1200

1205 — Start

1210 — Encode problem in computation qubits

1220 — Allocate probe qubits weakly coupled to computation qubits

1230 — Measure MRT peak width

1240 — Adjust annealing schedule based at least in part on measured MRT peak width 1245 — End

1500

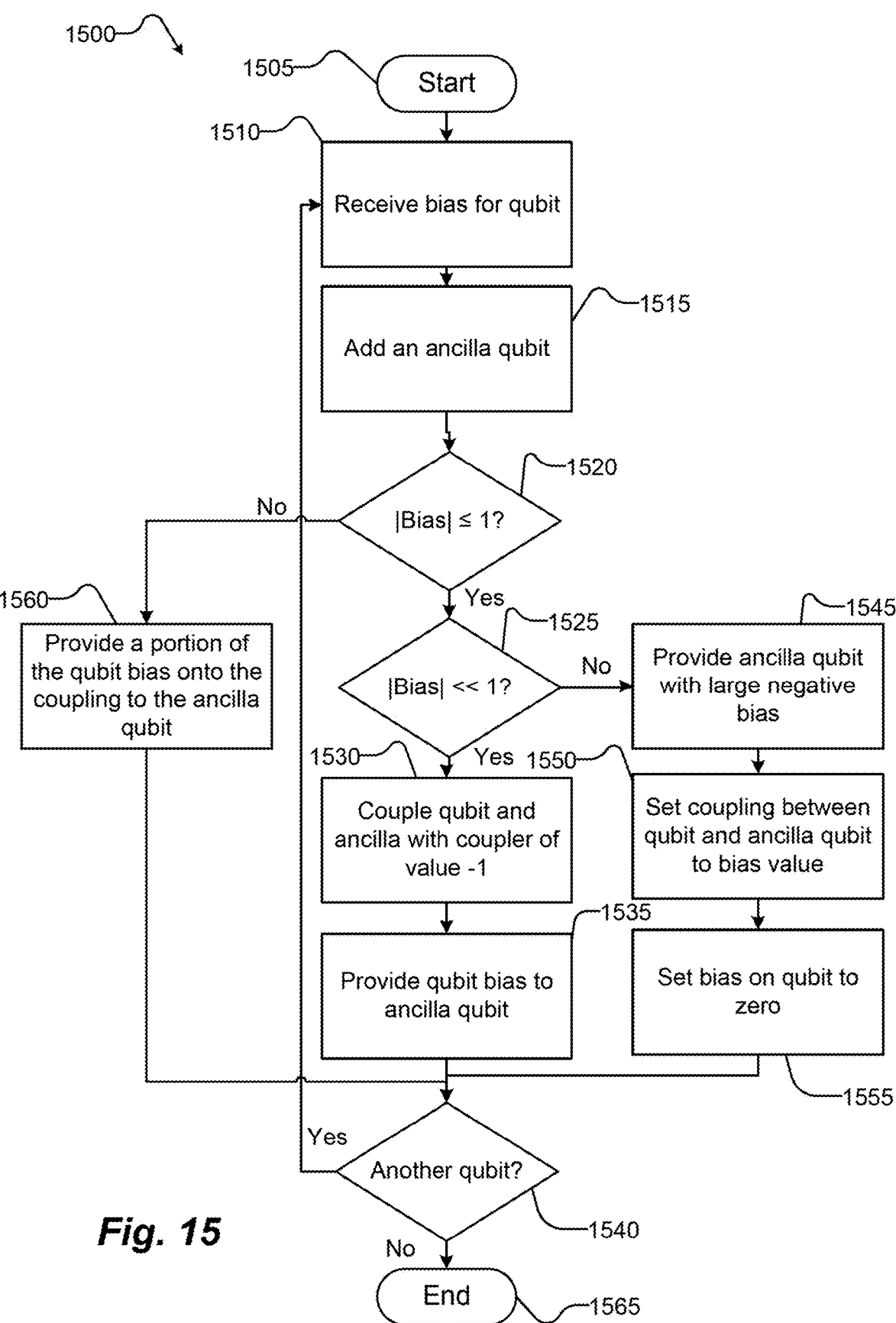

1505 — Start

1510 — Receive bias for qubit

1515 — Add an ancilla qubit

1520 — |Bias| ≤ 1?

No → 1560 — Provide a portion of the qubit bias onto the coupling to the ancilla qubit Yes → 1525 — |Bias| << 1?

No → 1545 — Provide ancilla qubit with large negative bias

1550 — Set coupling between qubit and ancilla qubit to bias value

1555 — Set bias on qubit to zero

Yes → 1530 — Couple qubit and ancilla with coupler of value -1

1535 — Provide qubit bias to ancilla qubit

1540 — Another qubit?

Yes

No → 1565 — End

Fig. 15

SYSTEMS AND METHODS FOR DEGENERACY MITIGATION IN A QUANTUM PROCESSOR

FIELD

This disclosure generally relates to quantum processors, and associated systems, devices, methods, and articles.

BACKGROUND

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

Quantum Computation

A quantum computer is a system that makes direct use of at least one quantum-mechanical phenomenon, such as, superposition, tunneling, and entanglement, to perform operations on data. The elements of a quantum computer are qubits. Quantum computers can provide speedup for certain classes of computational problems such as computational problems simulating quantum physics.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

In some implementations, a time-varying envelope function can be placed on the problem Hamiltonian. A suitable delocalization Hamiltonian is given by:

$$H_D \propto -\frac{1}{2}\sum_{i=1}^{N}\Delta_i \sigma_i^x$$

where N represents the number of qubits, $$\sigma_i^x$$

is the Pauli x-matrix for the $i^{th}$ qubit and $\Delta_i$ is the single qubit tunnel splitting induced in the $i^{th}$ qubit. Here, the $$\sigma_i^x$$

terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N}h_i\sigma_i^z + \sum_{j>i}^{N}J_{ij}\sigma_i^z\sigma_j^z\right]$$

where N represents the number of qubits, $$\sigma_i^z$$

is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

Here, the $$\sigma_i^z \text{ and } \sigma_i^z\sigma_j^z$$

terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Superconducting Quantum Processor for Quantum Annealing

A superconducting quantum processor can be designed for quantum annealing (and/or adiabatic quantum computing—see below) components from which may be used to implement the present systems and methods. The superconducting quantum processor can comprise a plurality of superconducting qubits and at least one coupler providing a tunable $$\sigma_i^z\sigma_j^z$$

coupling (diagonal coupling) between qubits.

The quantum processor can include a plurality of interfaces that are used to configure and control the state of quantum processor. Each of interfaces can be realized by a respective inductive coupling structure, as part of a programming subsystem and/or an evolution subsystem.

In the operation of the quantum processor, interfaces can be used to couple a flux signal into a respective compound Josephson junction of the qubits, thereby realizing a tunable tunneling term (the A, term) in the system Hamiltonian. This coupling provides the off-diagonal $\sigma^x$ terms of the Hamiltonian and these flux signals are examples of "delocalization signals".

Similarly, interfaces can be used to apply a flux signal into a respective qubit loop of the qubits, thereby realizing the $h_i$ terms in the system Hamiltonian. This coupling provides the diagonal $\sigma^z$ terms in the system Hamiltonian. Furthermore, an interface can be used to couple a flux signal into a coupler, thereby realizing the $J_{ij}$ term(s) in the system Hamiltonian. This coupling provides the diagonal $$\sigma_i^z \sigma_j^z$$

terms in the system Hamiltonian.

The quantum processor can include readout devices to read out the final states of the qubits. Examples of superconducting qubits include superconducting flux qubits, superconducting charge qubits, and the like.

Adiabatic Quantum Computing

One model of quantum computing is adiabatic quantum computing. Adiabatic quantum computing can be suitable for solving hard optimization problems, for example. Adiabatic quantum computing may be considered a special case of quantum annealing. In adiabatic quantum computation, the system ideally begins and remains in its ground state throughout an adiabatic evolution. Those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Degeneracy

In a quantum mechanical system, an energy level is said to be degenerate if the energy level can correspond to two or more different measurable states. Two or more different states of a quantum mechanical system are said to be degenerate if they can correspond to the same energy level.

A quantum binary digit, known as a qubit, is a two-state quantum mechanical system. If flipping a qubit from a first of the two states to a second of the two states does not affect the energy of the system, then the two states are said to be degenerate.

Degeneracy Manipulation in Qubits

Dickson and Amin (arXiv 1104.2349) describe a method for avoiding perturbative crossings by adding ancillary qubits (i.e., constraints) to a Hamiltonian. They demonstrate that a simple adiabatic quantum algorithm, based on the penalization of paths to clusters of local minima by tuning single-qubit tunneling energies, can be effective at eliminating perturbative crossings that result in extremely small gaps.

Dickson and Amin describe how if the final ground state is degenerate, the corresponding eigenstates can repel each other away from the end. If degeneracy in the final ground state can be introduced without significantly affecting the excited state, the ground state energy can be pushed away from that of the excited state.

Boixo et al. (arXiv 1212.1739) describe a 17-fold degenerate ground state Hamiltonian that can be constructed from a ferromagnetic 4-cycle by putting an ancillary constraints on each of the four original qubits.

BRIEF SUMMARY

A method for mitigating degeneracy in a hybrid computing system that includes a quantum processor and a digital processor, the quantum processor and the digital processor communicatively coupled to one another, the quantum processor including a plurality of devices and operated as a sample generator providing samples, may be summarized as including sending a problem to the quantum processor; iteratively repeating until an exit criterion is met: drawing a plurality of samples by the quantum processor; returning the plurality of samples to the digital processor; initializing a sample counter; until the sample counter reaches a determined sample limit: initializing a device counter; until the device counter reaches a first determined device limit: determining if a device indexed by the device counter is floppy; and incrementing the device counter; incrementing the sample counter; initializing the device counter; until the device counter reaches a second determined device limit: calculating a normalized floppiness metric for the device indexed by the device counter; adding an offset to advance the device in annealing; and incrementing the device counter.

The method may further include determining whether an exit condition has been met. Determining whether an exit condition has been met may include at least one of completing a determined number of iterations, reaching a predetermined upper bound on allowed computation time, or determining the change in the energy of a solution to the problem between successive iterations is below a determined threshold. Mitigating degeneracy in a hybrid computing system that includes a quantum processor may include mitigating degeneracy in a hybrid computing system that comprises a superconducting quantum processor. Determining if a device indexed by the device counter is floppy may include determining if a superconducting qubit indexed by the device counter is floppy. Determining if a superconducting qubit indexed by the device counter is floppy may include determining a change in the energy of a solution to the problem is below a determined threshold when the state of the superconducting qubit is flipped. Determining if a superconducting qubit indexed by the device counter is floppy may include determining a prevalence of zero net bias from neighboring devices. Calculating a normalized floppiness metric for the device indexed by the device counter may include summing the number of times the device is determined to be floppy and dividing by the determined sample limit. The first determined device limit may be the same as the second determined device limit. Drawing a plurality of samples by the quantum processor may include drawing at least one thousand samples by the quantum processor. Determining if a device indexed by the device counter is floppy may include determining if a domain of qubits indexed by the device counter is floppy, the domain of qubits comprising a plurality of coupled qubits. Sending a problem to the quantum processor may include sending a hard problem to the quantum processor.

A hybrid computing system may be summarized as including at least one quantum processor comprising: a plurality of devices; and a readout subsystem; at least one digital processor-based device communicatively coupled to the at least one quantum processor; and at least one non-transitory computer-readable storage medium that stores processor-executable instructions to mitigate degeneracy, which when executed causes at least one processor-based device to: send a problem to the quantum processor; iteratively repeat until an exit criterion is met: draw a plurality of samples by the quantum processor; return the plurality of samples via the readout system to the digital processor; initialize a sample counter; until the sample counter reaches a determined sample limit: initialize a device counter; until the device counter reaches a first determined device limit: determine if a device indexed by the device counter is floppy; and increment the device counter; increment the sample counter; initialize the device counter; until the device counter reaches a second determined device limit: calculate a normalized floppiness metric for the device indexed by the device counter; add an offset to advance the device in annealing; and increment the device counter.

The quantum processor may be a superconducting quantum processor, and the plurality of devices may include a plurality of superconducting qubits, the quantum processor further including a plurality of coupling devices, wherein each coupling device may provide controllable communicative coupling between a respective pair of superconducting qubits in the plurality of superconducting qubits. The at least one processor device may determine if a superconducting qubit indexed by the device counter is floppy based at least in part on whether a change in the energy of a solution to the problem is below a determined threshold when the state of the superconducting qubit is flipped. The at least one processor device may determine if a superconducting qubit indexed by the device counter is floppy based at least in part on a prevalence of zero net bias from neighboring devices. The normalized floppiness metric may be the number of times the device is determined to be floppy divided by the determined sample limit. The first determined device limit may be the same as the second determined device limit. The plurality of samples may include at least one thousand samples. The exit criterion may include at least one of completing a determined number of iterations, reaching a predetermined upper bound on allowed computation time, or determining the change in the energy of a solution to the problem between successive iterations is below a determined threshold. The device may be a domain of qubits including a plurality of coupled qubits, and in order to determine if a device indexed by the device counter is floppy the at least one processor may determine if a domain of qubits indexed by the device counter is floppy. The problem may be a hard problem.

A method for mitigating degeneracy in a hybrid computing system that comprises a quantum processor and a digital processor, the quantum processor and the digital processor communicatively coupled to one another, the quantum processor comprising a plurality of qubits and operated as a sample generator providing samples, may be summarized as including receiving a problem for computation by the quantum processor; generating one or more samples based on the problem by the quantum processor; determining, for each of one or more qubits of the plurality of qubits, a magnetic susceptibility based on the one or more samples; determining a tunneling rate offset for at least one qubit of the one or more qubits based on the magnetic susceptibilities of the one or more qubits; and tuning a tunneling rate for the at least one qubit based on the tunneling rate offset.

The method may further include determining a subset of the plurality of qubits to be tuned based on a target susceptibility; wherein the magnetic susceptibility for each qubit of the subset differs from the target susceptibility by more than a threshold amount; and wherein the at least one qubit comprises the subset. Determining the magnetic susceptibility for each of the one or more qubits may include measuring a magnetization response of each of the one or more qubits to a flux bias. Determining the magnetic susceptibility for each of the one or more qubits may include, for each of the one or more qubits: generating one or more guesses for the qubit based on one or more samples; refining the one or more guesses for the qubit; and determining the magnetic susceptibility for the qubit based on the one or more guesses for the qubit.

Refining the one or more guesses for the qubit may include generating an initial guess and iteratively generating further guesses based on at least one of: the initial guess and one or more previously-generated guesses. Iteratively generating further guesses may include generating further guesses based on a mean field model. Each further guess may include an estimate of at least one of a current of the qubit and a flux of the qubit, and generating further guesses based on a mean field model may include generating at least one guess based on an expectation value for the current of an isolated-qubit based on a flux of the qubit.

Determining the magnetic susceptibility for each of one or more qubits of the plurality of qubits may include determining a derivative of a flux-current relationship for each of the one or more qubits based on at least one of the one or more guesses. Determining the tunneling rate offset for at least one qubit may include, for each of the at least one qubit: determining a target tunneling rate for which an isolated qubit model predicts a predicted susceptibility which corresponds to the magnetic susceptibility of the qubit; and determining a tunneling rate offset based on the target tunneling rate.

Determining the target tunneling rate may include determining, for each sample, a sample target tunneling rate and determining the target tunneling rate based on a measure of the sample target tunneling rates. Determining the target tunneling rate based on a measure of the sample target tunneling rates may include determining an average of the sample target tunneling rates.

For each of the at least one qubit, the tunneling rate offset may be determined based on a difference between the target tunneling rate for the qubit and a measure of a plurality of target tunneling rates. The measure of the plurality of target tunneling rates may be a median of the plurality of target tunneling rates. For each of the at least one qubit, determining a target tunneling rate may include reducing a magnitude of the target tunneling rate to less than is predicted by the isolated qubit model.

A method of operation of a digital processor for tuning an annealing rate of at least one qubit of a quantum processor, may be summarized as including receiving an encoding of a problem, the encoding comprising one or more qubits; modifying the encoding by representing a qubit of the one or more qubits as a logical qubit, thereby generating a modified encoding of the problem, wherein the logical qubit comprises a plurality of internal qubits of the quantum processor coupled by internal couplings and the logical qubit has an effective tunneling rate which is reduced relative to a tunneling rate of the qubit before modification; and computing causing the problem based on the modified encoding to be computed by the quantum processor. The method may include selecting at least one of: a number of internal qubits and an internal coupling strength for the logical qubit so that the effective tunneling rate approximates a target tunneling rate. The qubit may include an initial logical qubit. The method may further include selecting a topology for the logical qubit to affect the effective tunneling rate. Selecting a topology may include selecting the topology from a plurality of topologies based on a minimum internal coupling strength associated with each of the plurality of topologies.

The method may comprise modifying the logical qubit's effective tunneling rate by determining a tunneling rate offset based on a characteristic of the logical qubit and modifying the logical qubit's effective tunneling rate by applying the tunneling rate offset to an annealing schedule. The logical qubit may have a chain topology and the characteristic of the logical qubit may comprise a chain length. Determining the tunneling rate offset may comprise determining a scaling factor and scaling an offset value by the scaling factor. The offset value may be based on:

$$2^\wedge(k-1)/(k-1)$$

where k is a length of the chain topology of the logical qubit. The encoding may comprise a multiplication circuit embedding of a factoring problem.

The characteristic may comprise a location of the logical qubit in a graph relative to one or more other qubits. The graph may comprise an embedded graph. Determining the tunneling rate offset may comprise determining a distance between the logical qubit and an origin and/or a distance between the logical qubit and an edge of the graph and determining the tunneling rate offset based on the distance. The tunneling rate offset may be determined based on a gradient defined over at least a portion of the graph. The gradient may comprise a radial gradient having a first region proximate an origin wherein annealing schedules are advanced relative to annealing schedules in a second region. The second region is further from the origin relative to the first region.

The logical qubit's effective tunneling rate may be determined based on an annealing sub-schedule specific to the logical qubit and based on an annealing schedule defined across a plurality of qubits. At least one of the plurality of qubits is not contained in the logical qubit.

Selecting the topology from the plurality of topologies based on minimum internal coupling strengths may include selecting the topology based on a correspondence between minimum internal coupling strengths and the number of internal qubits coupling to qubits external to the logical qubit.

A method of operation of a hybrid computing system that comprises a quantum processor and a digital processor, the quantum processor and the digital processor communicatively coupled to one another, the quantum processor comprising a plurality of qubits, may be summarized as including receiving a pause start and a pause duration by the digital processor as inputs via a user interface; controlling by the digital processor a quantum annealing evolution performed by the quantum processor, the controlling comprising: initiating the quantum annealing evolution; upon reaching the pause start, causing the quantum annealing evolution to pause for the pause duration; and completing the quantum annealing evolution; reading out the state of the plurality of qubits by the hybrid computing system.

Receiving a pause start may include receiving a measure of progress through the quantum annealing evolution. Receiving a pause start and a pause duration may include receiving a pause start and a pause duration via an Application Programming Interface. Controlling by the digital processor a quantum annealing evolution performed by the quantum processor may include controlling by the digital processor a quantum annealing evolution performed by a plurality of superconducting flux qubits.

Causing the quantum annealing evolution to pause for the pause duration may comprise selecting a subset of qubits, causing the quantum annealing evolution to pause for one or more qubits not in the subset of qubits, and reverse annealing the subset of qubits while the one or more qubits are paused. The method may comprise forward annealing the subset of qubits after reverse annealing the subset of qubits and before completing the quantum annealing evolution.

A method of operation of a digital processor for mitigating degeneracy in a hybrid computing system that comprises a quantum processor, the quantum processor and the digital processor communicatively coupled to one another, the quantum processor comprising a plurality of qubits and operated as a sample generator providing samples, may be summarized as including sending a problem for computation to the quantum processor; receiving one or more samples generated by the quantum processor based on the problem; determining, for each of one or more qubits of the plurality of qubits, a magnetic susceptibility based on the one or more samples; determining a tunneling rate offset for at least one qubit of the one or more qubits based on the magnetic susceptibilities of the one or more qubits; and tuning a tunneling rate for the at least one qubit based on the tunneling rate offset.

A method of operation of a hybrid computing system that comprises a digital processor communicatively coupled to a physical quantum annealer comprising a plurality of qubits, may be summarized as including encoding a computational problem by the digital processor in a first subset of the plurality of qubits; weakly coupling a second subset of the plurality of qubits to the first subset, the second subset disjoint from the first subset; determining a Magnetic Resonant Tunneling (MRT) peak width by the second subset of qubits; and adjusting an annealing schedule of the physical quantum annealer based at least in part on the MRT peak width.

Encoding a computational problem by the digital processor in a first subset of the plurality of qubits may include encoding a computational problem by the digital processor in a first plurality of superconducting qubits, and weakly coupling a second subset of the plurality of qubits to the first subset may include weakly coupling a second plurality of superconducting qubits.

A method of operation of a hybrid computing system that comprises a digital processor communicatively coupled to a physical quantum annealer, may be summarized as including collecting one or more energy statistics by parallel tempering by the physical quantum annealer; assessing an expected outcome by the digital processor; and determining a preferred annealing rate and a preferred annealing trajectory by the digital processor, based at least in part on one or more energy statistics and the expected outcome.

The method may further include iterating determining the preferred annealing rate and the preferred annealing trajectory by the digital processor based at least in part on one or more energy statistics and the expected outcome, until changes in the preferred annealing rate and the preferred annealing trajectory from one iteration to the next are less than a determined threshold.

Determining a preferred annealing rate may include inverting a cumulative distribution. Determining a preferred annealing trajectory may include performing a local search. Collecting one or more energy statistics by parallel tempering by the physical quantum annealer may include collecting one or more energy statistics by parallel tempering by a superconducting quantum processor.

A method of operation of a hybrid computing system that comprises a digital processor communicatively coupled to a quantum processor, may be summarized as including sending a computational problem to the quantum processor by the digital processor; generating one or more samples by the quantum processor; collecting the one or more samples by the digital processor; determining by the digital processor if a qubit is floppy for a sample; upon determining the qubit is floppy for the sample, adding to a count of floppy qubits by the digital processor; computing a metric based at least in part on the count of floppy qubits by the digital processor; defining an ancilla qubit in the quantum processor by the digital processor; and coupling the ancilla qubit by the digital processor to at least one of the floppy qubits in the quantum processor.

Sending a computational problem to the quantum processor may include sending a computational problem to a superconducting quantum processor. Sending a computational problem to a superconducting quantum processor may include sending a computational problem to a physical quantum annealer. Determining by the digital processor if a qubit is floppy for a sample may include determining by the digital processor if a superconducting qubit is floppy. Computing a metric based at least in part on the count of floppy qubits by the digital processor may include computing a normalized floppiness metric describing the fraction of the one or more samples for which the qubit is floppy. Coupling the ancilla qubit by the digital processor to at least one of the floppy qubits in the quantum processor may include selecting the strength of the coupling between the floppy qubit and the ancilla qubit to adjust the tunneling amplitude of the floppy qubit.

A method of operation of a hybrid computing system that comprises a digital processor communicatively coupled to a quantum processor comprising a plurality of qubits, may be summarized as including receiving a first bias value for a first qubit of the plurality of qubits; coupling an ancilla qubit to the first qubit; determining if the modulus of the first bias value is less than or equal to a determined threshold; upon determining the modulus of the first bias value is less than or equal to the determined threshold: providing the ancilla qubit with a second bias value wherein the second bias value is negative and the modulus of the second bias value is larger than the modulus of the first bias value; setting the strength of the coupling between the first qubit and the ancilla qubit to be approximately equal to the first bias value; and setting a bias of zero on the first qubit.

Receiving a first bias value for a first qubit of the plurality of qubits may include receiving a bias value for a superconducting qubit. Coupling an ancilla qubit to the first qubit may include coupling a superconducting qubit to the first qubit. Determining if the modulus of the first bias value is less than or equal to a determined threshold may include determining if the modulus of the first bias value is less than or equal to one.

A method of operation of a hybrid computing system that comprises a quantum processor and a digital processor, the quantum processor and the digital processor communicatively coupled to one another, the quantum processor comprising a plurality of qubits, may be summarized as including receiving an annealing schedule by the digital processor, controlling by the digital processor a quantum annealing evolution performed by the quantum processor, the controlling including initiating the quantum annealing evolution, performing the quantum annealing evolution based at least in part on the annealing schedule, and completing the quantum annealing evolution, the method further including reading out the state of the plurality of qubits by the hybrid computing system, wherein receiving an annealing schedule by the digital processor includes for each qubit of the plurality of qubits, receiving at least one of a respective tunneling rate or a respective persistent current as a single-valued function of time.

Receiving an annealing schedule by the digital processor may include receiving a first annealing schedule for a first subset of qubits of the plurality of qubits, wherein receiving a first annealing schedule includes, for each qubit of the first subset of qubits, receiving at least one of a first tunneling rate or a first persistent current as a single-valued function of time, and receiving a second annealing schedule for a second subset of qubits of the plurality of qubits, wherein receiving a second annealing schedule includes, for each qubit of the second subset of qubits, receiving at least one of a second tunneling rate or a second persistent current as a single-valued function of time, and performing the quantum evolution based at least in part on the annealing schedule includes performing the quantum evolution of the first subset of qubits based at least in part on the first annealing schedule, and performing the quantum evolution of the second subset of qubits based at least in part on the second annealing schedule. In some implementations, each of the first and the second subsets of qubits may comprise a respective first and second logical qubit.

Receiving the annealing schedule by the digital processor may include receiving a vector as a single-valued function of time. Receiving the annealing schedule by the digital processor may include receiving the transverse and longitudinal energy scales as a single-valued function of time. Receiving an annealing schedule by the digital processor may include receiving a piecewise linear annealing schedule.

A method of operation of a hybrid computing system that comprises a quantum processor and a digital processor, the quantum processor and the digital processor communicatively coupled to one another, the quantum processor comprising a plurality of qubits, and a plurality of coupling devices, each of the plurality of coupling devices selectively communicatively coupling a respective pair of qubits, may be summarized as including receiving an annealing schedule by the digital processor, controlling by the digital processor a quantum annealing evolution performed by the quantum processor, the controlling including initiating the quantum annealing evolution, performing the quantum annealing evolution based at least in part on the annealing schedule, and completing the quantum annealing evolution, the method further including reading out the state of the plurality of qubits by the hybrid computing system, wherein receiving an annealing schedule by the digital processor includes, for each qubit of the plurality of qubits, receiving a respective local bias as a single-valued function of time, and, for each coupling device of the plurality of coupling devices, receiving a respective coupling strength as a single-valued function of time.

A method for selecting an annealing schedule for a problem in a hybrid computing system that comprises a quantum processor and a digital processor. The quantum processor and the digital processor are communicatively coupled to one another. The quantum processor comprises a plurality of qubits. The method may be summarized as including generating one or more annealing schedules; selecting an annealing schedule from the one or more annealing schedules based on an objective function which receives an input annealing schedule and provides a measure of at least one characteristic of the input annealing schedule; and sending the problem to the quantum processor by the digital processor; executing the problem at the quantum processor according to the annealing schedule.

The method may include selecting the objective function from a set of one or more objective functions. Generating the one or more annealing schedules may include performing an optimization algorithm based on the objective function. The optimization algorithm may include parallel tempering. The objective function may measure at least one of: models and chains linking models generated by applying parallel tempering to the problem as modified by the input annealing schedule. The objective function may include computing at most a threshold number of parallel tempering iterations. The threshold number may be less than a number of iterations for solving the problem.

The optimization algorithm may include Bayesian optimization. The objective function may measure a ground state distribution of the problem according to the input annealing schedule. The objective function may provide at least one of: a measure of similarity between the ground state distribution and a characteristic of one or more outliers of the ground state distribution. The objective function may measure an entropy of the ground state distribution, a distance of the ground state distribution from a uniform distribution according to a distance metric, a Gini coefficient of the ground state distribution, and/or a ratio of a maximum to a minimum probability of the ground state distribution.

Selecting the annealing schedule from the one or more annealing schedules may include determining that the annealing schedule provides an optimal result relative to the one or more annealing schedules. Generating the one or more annealing schedules may include generating a plurality of annealing schedules, selecting an interim annealing schedule based on the objective function, and generating the one or more annealing schedules based on the interim annealing schedule.

A method for mitigating sample bias in a hybrid computing system that comprises an analog processor and a digital processor, the analog processor and the digital processor communicatively coupled to one another, the analog processor comprising a plurality of qubits, may be summarized as including: sending a computational problem to the analog processor by the digital processor; generating a first set of one or more samples by the analog processor; collecting the first set of one or more samples by the digital processor; identifying one or more valleys based on the first set of one or more samples, each valley comprising a set of iso-energetic samples; selecting a valley of the one or more valleys based on a valley selection criterion; for each qubit in the valley: determining a degeneracy metric for the qubit; and determining an annealing schedule for the qubit based on the degeneracy metric; and collecting a second set of one or more samples by the analog processor based on the annealing schedules for the qubits in the valley.

Identifying the one or more valleys may include determining that a plurality of qubits are related by a series of iso-energetic qubit flips. Identifying the one or more valleys may include determining the plurality of qubits' membership based on an iso-energetic Hamming distance metric. Selecting the valley from the one or more valleys may include selecting the valley based on a number of samples of the one or more samples in the valley, the valley having at least as many samples as each other valley of the one or more valleys. The degeneracy metric may include a normalized floppiness metric. Determining a degeneracy metric for the qubit may include determining the normalized floppiness metric for the qubit based on a number of times that the qubit was floppy in the samples of the valley.

Determining the annealing schedule for the qubit based on the degeneracy metric may include determining an annealing offset proportionate to the degeneracy metric. Determining the annealing schedule for the qubit based on the degeneracy metric may include advancing the qubit to the beginning of the anneal. Advancing the qubit to the beginning of the anneal may include retarding at least one other qubit so that the at least one other qubit begins annealing after the qubit has completed its anneal. Determining the annealing schedule for the qubit based on the degeneracy metric may include retarding the qubit to the end of the anneal. At least one qubit of the valley may include a domain of qubits.

The method may include: identifying one or more further valleys based on the second set of one or more samples, each valley comprising a set of iso-energetic samples; selecting a further valley of the one or more further valleys based on the valley selection criterion; for each qubit in the further valley: determining a further degeneracy metric for the qubit; and determining a further annealing schedule for the qubit based on the degeneracy metric; and collecting a third set of one or more samples by the analog processor based on the further annealing schedules for the qubits in the further valley.

Determining the annealing schedule for the qubit based on the degeneracy metric may include generating a plurality of annealing schedules and selecting the annealing schedule from the plurality based on one or more selection criteria. Generating the plurality of annealing schedules may include generating a first annealing schedule and generating a plurality of scaled annealing schedules based on a plurality of scaling factors.

A method for controllably simulating noise in an annealing schedule for use in a hybrid computing system, the hybrid computing system comprising an analog processor and a digital processor, the analog processor and the digital processor communicatively coupled to one another, may be summarized as including: receiving an input annealing schedule at the digital processor; generating simulated noise; modifying the input annealing schedule based the simulated noise to produce an output annealing schedule; and providing the output annealing schedule to the analog processor.

Generating the simulated noise may include pseudorandomly generating one or more modifications to apply to the input annealing schedule. Generating the simulated noise may include generating one or more annealing pauses and one or more annealing ramps. The one or more annealing pauses and ramps may be ordered as alternating pairs of pauses and ramps.

Generating the simulated noise may include adding one or more modifications to the simulated noise based on one or more constraints. The one or more constraints may include requiring that the output annealing schedule deviate from the input annealing schedule by no more than a threshold amount. The threshold amount may vary by time and may be based on a time-dependent amplitude of the input annealing schedule. The threshold amount may be a predetermined constant. Adding one or more modifications may include, for each modification, determining at least one of an amplitude of the modification and a duration of the modification pseudo-randomly according to the one or more constraints.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIGS. 6 to 10 are plots that illustrate comparative results for an example implementation of degeneracy mitigation in a quantum processor in accordance with the present systems, devices, articles, and methods.

FIG. 15 is a flow chart that illustrates an example method for mitigating h/J mismatch using an ancilla qubit.

DETAILED DESCRIPTION

General Comments

Figure 1A:
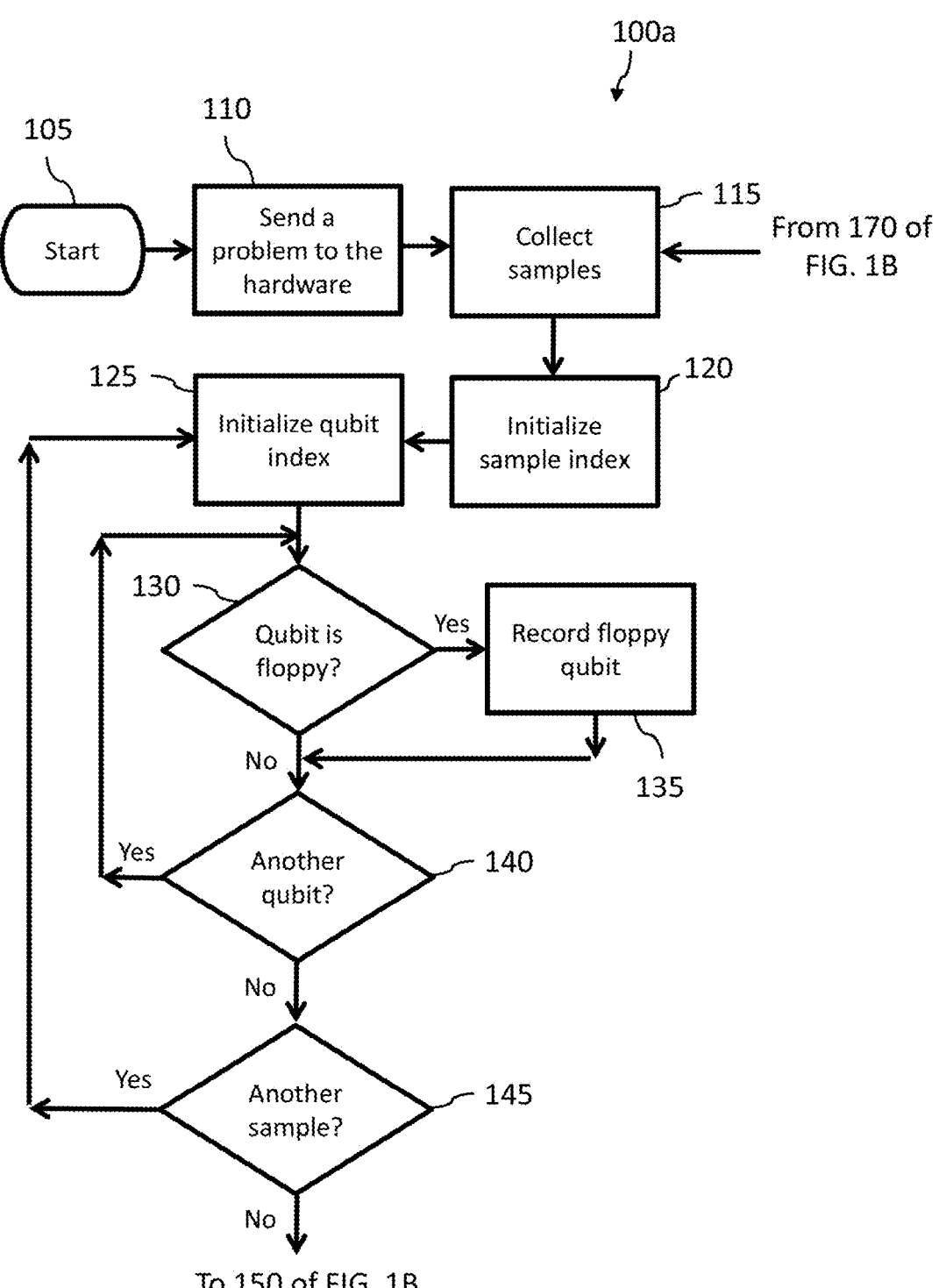
FIGS. 1A and 1B are flow charts that illustrate an exemplary method of operation of a hybrid computing system comprising a quantum processor to mitigate degeneracy via "floppy qubits" in accordance with the present systems, devices, articles, and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise"

and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Tunneling Rates and Degeneracy

At least some quantum processors use tunneling behaviour of qubits to find low-energy states of problems encoded on the processor. Tunneling behavior may be described for each qubit via the single qubit tunnel splitting parameter, denoted $\Delta_i$ (also referred to as the "tunneling rate" or "annealing rate" of the qubit). The tunneling rate $\Delta_i$ generally decreases over the course of the anneal, and during the course of an evolution reaches a low value at which the qubit becomes highly resistant to changing its state and thus ceases to interact with the problem. This behavior is referred to as "freeze-out"; a frozen-out qubit may be considered to be effectively fixed for the remainder of the evolution.

Different qubits may freeze out at different times, and an individual qubit may exhibit different tunneling behavior in different problems. Generally, qubits with lower tunneling rates $\Delta_i$ freeze out earlier in an evolution than qubits with relatively higher tunneling rates $\Delta_j$. When different qubits in the same problem have different tunneling rates, the problem tends to be more prone to degeneracy-related behavior which tends to reduce the optimality of generated solutions. This behavior may include, for example, small-gap avoided level crossings and/or Landau-Zener transitions.

The technology described in the present application is an approach that can mitigate degeneracy by tuning tunneling rates, either directly or indirectly. Such an approach may, in suitable circumstances, significantly boost hardware performance on degeneracy-prone problems, and/or may improve hardware performance for more general problem sets.

The Effect of Degeneracy on Hardware Performance

In low-precision problem sets, experiments have indicated a strong dependence of hardware performance on the parity of a qubit's degree, i.e., on the number of active couplers per qubit. In particular, for a large ensemble of low-precision problem sets, even at the C2 scale, performance data can exhibit "fat tails." The phrase "fat tails" refers to a proportion of the low-precision problem sets that are particularly hard for the hardware. The fat tails can include problem instances that produce low energy solutions at a low rate and/or problems that fail to produce low energy solutions.

The behavior for problem sets in the fat tails appears to be strongly related to degeneracy. Specifically, problems that have low-degeneracy ground states and high-degeneracy first excited states appear to be at least partially responsible for the fat tails.

One approach is to reduce the problem energy scale for hard problems. For C2 and C4 scale problems, reducing the energy scale of the applied J by a factor of between 2× and 5× can increase hardware performance on the hard problems.

Unfortunately, reducing the problem energy scale for hard problems can have negative effects. For example, reducing the energy scale can increase the effect of analog control errors some of which do not scale down with problem scale. Reducing the energy scale can also increase the effective temperature of the bath to which the qubits are coupled. Effects such as these can reduce hardware performance at some processor scale. Furthermore, reducing the energy scale can reduce desirable quantum behavior.

At least some implementations of the technology described in the present application provide approaches that can significantly boost hardware performance on fat tail problems, as well as improve hardware performance for more general problem sets.

Mitigation of Degeneracy Via "Floppy Qubits"

A "floppy qubit" is a qubit for which the state of the qubit can be flipped with no change in energy. Similarly, a floppy domain is a set of multiple coupled qubits that can all be simultaneously or concurrently flipped without a change in energy. In the description that follows, the term floppy qubit includes a floppy qubit or a floppy domain, unless the context dictates otherwise.

For certain problem instances, such as "fat tail" problem instances, there can be large iso-energetic clusters of excited states which differ from each other by a small number of qubit flips (for example, a one-qubit flip or a two-qubit flip). Qubits that are responsible for movement around such iso-energetic clusters are referred to as "floppy" qubits. The technology described in the present application uses the local major bias digital-to-analog converter (DAC), during quantum annealing, to advance (or retard) the floppy qubits with respect to the rest of the working graph. In one implementation, the local major bias DAC can bias the qubit compound-compound Josephson junction (CCJJ) major loop.

Figure 1B:
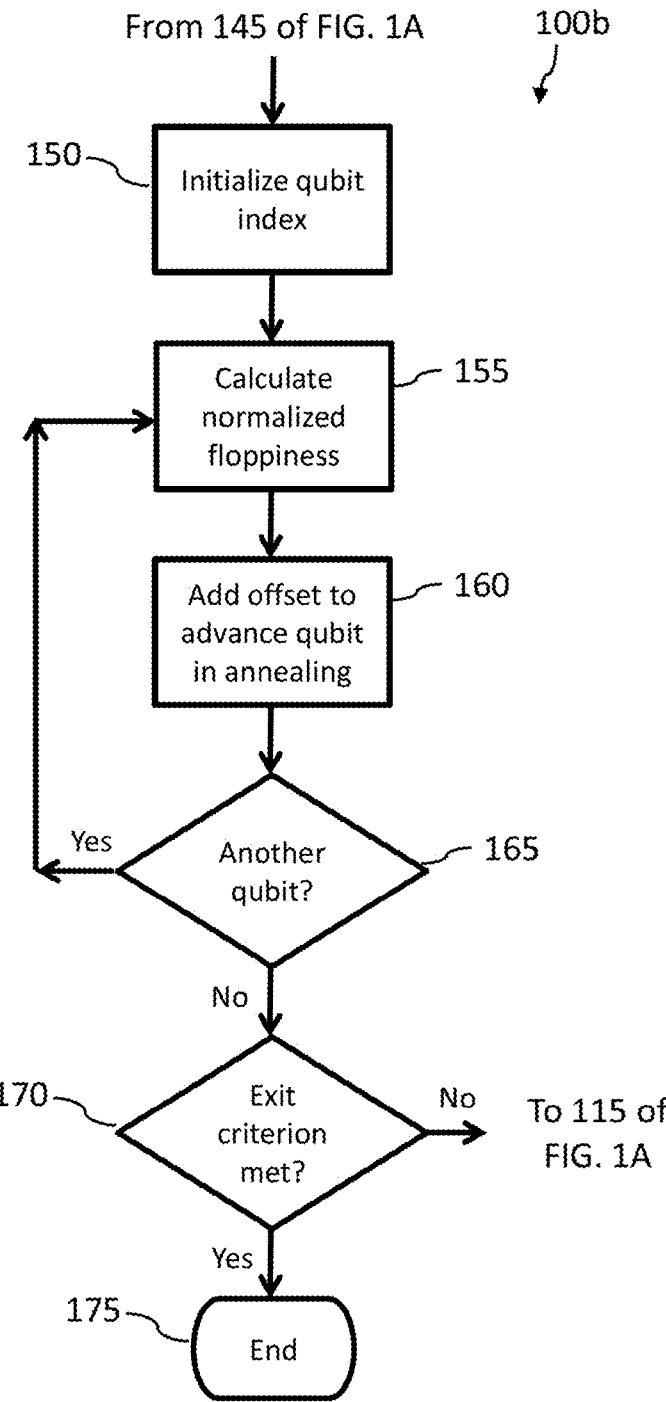

FIGS. 1A and 1B are flow charts that illustrate an exemplary method of operation 100 of a hybrid computing system comprising a quantum processor to mitigate degeneracy in accordance with the present systems, devices, articles, and methods. FIG. 1A is a flow chart that illustrates a first part 100a of the exemplary method 100, and FIG. 1B is a flow chart that illustrates a second part 100b of the exemplary method 100. Control of method 100 can move from the first part 100a to the second part 100b, and vice versa.

The method of operation 100 illustrated by FIGS. 1A and 1B comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIGS. 1A and 1B, the acts are assumed to be performed by a hybrid computer comprising a quantum processor. The first part 100a and the second part 100*b* of method 100 are examples, and those of skill in the art will appreciate that alternative embodiments may omit certain acts and/or include additional acts.

Referring first to FIG. 1A, the first part 100*a* of method 100 starts at 105, for example in response to submission of a problem or in response to an invocation by another routine. At 110, the hybrid computer sends a problem to the hardware. For the purposes of the present example, the hardware is a quantum processor that is communicatively coupled to a digital computer. At 115, the hybrid computer collects a number of samples. In some implementations, the number of samples N is approximately 1,000. In other implementations, the number of samples N is 10. In acts 120 to 145 inclusive, the hybrid computer records which of M qubits in the quantum processor are floppy for each of the N samples.

At 120, the hybrid computer initializes a sample index, and, at 125, the hybrid computer initializes a qubit index.

At 130, the hybrid computer determines if the qubit or domain of qubits is floppy, i.e., if the state of the qubit or domain of qubits can be flipped without changing the energy. In response to determining the qubit or domain of qubits is floppy (YES) at 130, control in the first part 100*a* proceeds to 135, where the floppy qubit or domain of floppy qubits is recorded. In response to determining the qubit or domain of qubits is not floppy (NO) at 130, control in first part 100*a* proceeds to 140.

At 140, the hybrid computer determines if there is another qubit or domain of qubits to check for floppiness. In response to determining there is another qubit (YES) at 140, control in first part 100*a* returns to 130. The loop from 130 to 145 is repeated until there are no more qubits or domains of qubits to check for floppiness.

The process may repeat while there are additional qubits or domains of qubits to check for floppiness. In response to determining there are no more qubits or domains of qubits to check for floppiness (NO) at 140, control of first part 100*a* moves to 145, where the hybrid computer checks to see if there is another sample. In response to determining there is another sample (YES) at 145, control of first part 100*a* returns to 125. The loop from 125 to 145 is repeated until there are no more samples.

In response to determining there are no more samples (NO) at 145, control of method 100 proceeds to second part 100*b* of FIG. 1B.

At 150, the hybrid computer initializes a qubit index. At 155, the hybrid computer calculates a normalized floppiness metric for the current qubit or current domain of qubits. An example definition for the normalized floppiness metric $\mu_i$ for the $i^{th}$ qubit is as follows:

$$\mu_i = n_i/N$$

where $n_i$ is the number of samples for which the $i^{th}$ qubit or domain of qubits was floppy, and N is the total number of samples. Other suitable definitions for the normalized floppiness metric may be used. In some implementations, the floppiness metric may be unnormalized.

At 160, the hybrid computer advances the current qubit or domain of qubits in the quantum annealing based on the normalized floppiness metric. Advancing qubits (or domains of qubits) may be done in any of several ways, as described in greater detail elsewhere herein. As an example, in some implementations, advancing the qubit or domain of qubits involves adding an offset to the major loop (annealing) DAC that is proportional to the normalized floppiness metric. If a domain of qubits, then the offset is applied to all member qubits of the domain of qubits. In an example implementation, where the qubit is a flux qubit, the offset is equal to $\mu_i \times 2.5 m\Phi_0$.

At 165, the hybrid computer determines if there is another qubit or domain of qubits to apply an offset to. In response to determining there is another qubit or domain of qubits (YES) at 165, control in second part 100*b* returns to 155. The loop from 155 to 165 is repeated until there are no more qubits or domains of qubits to apply offsets to.

In response to determining there are no more qubits or domains of qubits (NO) at 165, control of second part 100*b* moves to 170. At 170, the hybrid computer determines whether an exit criterion has been met. The exit criterion can be a single criterion or a combination of more than one criterion. Example criteria can include thresholds based on the diversity of samples, the energy of samples, degree or rate of convergence, and the number of unique ground states or first excited states. Example criteria can also include thresholds based on the computation time and the number of iterations.

In response to determining an exit criterion has been met (YES) at 170, method 100 ends at 175. In response to determining an exit criterion has not been met (NO) at 170, control of method 100 returns to 115 of first part 100*a* of FIG. 1A.

In some implementations, the hybrid computer advances only a subset of the floppy qubits. In general, a qubit or domain of qubits will be floppy in some percentage of the samples drawn, and will rarely be floppy in either no samples or all samples. The floppiness metric (described above) can be used to determine which qubits or domain of qubits are floppy, and which qubits should be advanced. In some implementations, qubits or domains of qubits exceeding a threshold on the floppiness metric can be advanced. In other implementations, other criteria may be used on their own, or in conjunction with the floppiness metric, to decide which qubits or domains of qubits to advance.

In some implementations, the hybrid computer can take an iterative approach in which qubits or domains of qubits are advanced in small subsets, and iterating. In some implementations, the hybrid computer can choose to advance only the floppiest qubit or domain of qubits in each iteration. In other implementations, the hybrid computer can execute a suitable combination of the previously described implementations to advance qubits or domain of qubits. A benefit of advancing qubits or domain of qubits in small numbers and iterating is that the approach can reduce over-correction.

In some implementations, the offset applied to each qubit or domain of qubits can be the same. In other implementations, the offset applied to different qubits or domains of qubits can vary from one qubit to another. For example, the hybrid computer can choose to apply a larger offset to one qubit or domain of qubits than to another qubit or another domain of qubits.

Mitigation of Degeneracy Via Susceptibility

In some implementations, qubits may be advanced or retarded in the quantum annealing based on the magnetic susceptibility (denoted $\chi$, and sometimes referred to herein simply as "susceptibility") of the qubits. Susceptibility $\chi$ is a characteristic of some types of qubits, including flux qubits, which describes the degree of magnetization of a qubit in response to an applied magnetic field. This response may vary in different circumstances (e.g., depending on the strength and topology of its couplings with other qubits, the flux biases of other qubits). Thus, a qubit's susceptibility $\chi$ may be different for different problems. In some implementations, the susceptibility $\chi$ of one or more qubits for a particular problem is measured and/or estimated, and at least one of the one or more qubits is advanced or retarded based on its susceptibility $\chi$. For convenience, reference to "determining" susceptibility in this disclosure includes measuring susceptibility and/or estimating susceptibility.

The inventors have determined, through experiment, that susceptibility $\chi$ of a qubit tends to be inversely correlated with the tunneling rate $\Delta_i$ for that qubit. That is, qubits which freeze out earlier in an evolution (i.e., qubits that quickly reach low $\Delta_i$) tend to have higher susceptibility $\chi$, and qubits which freeze out later in an evolution (i.e., qubits which slowly reach low $\Delta_i$) tend to have relatively lower susceptibility $\chi$.

Figure 2:
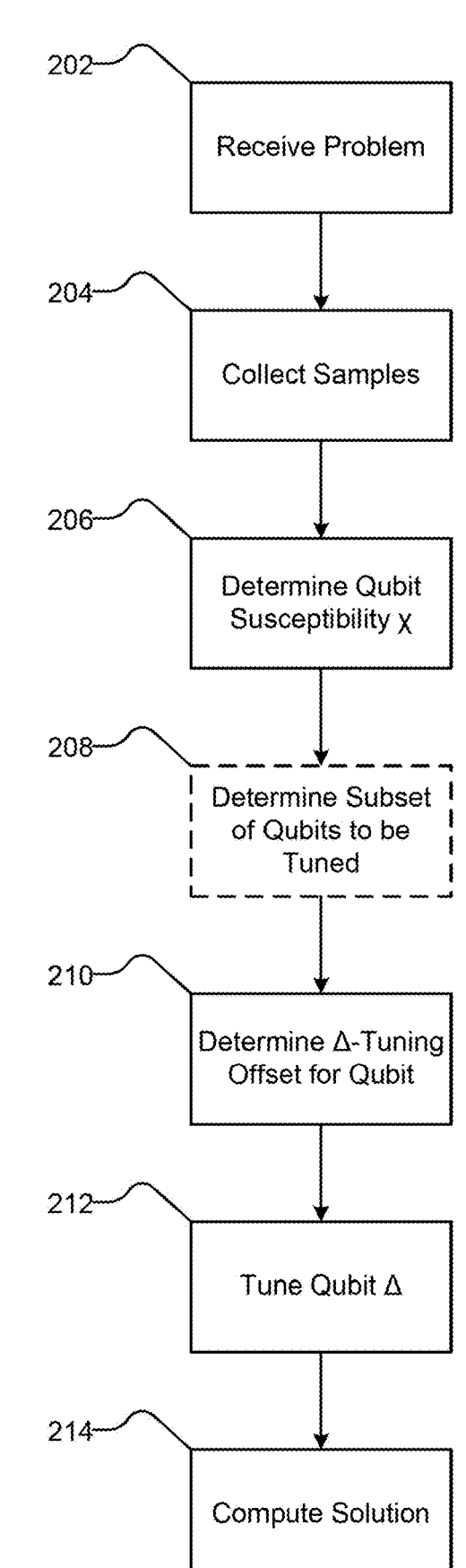
FIG. 2 is a flow chart illustrating an exemplary method of operation of a hybrid computing system comprising a quantum processor to mitigate degeneracy via susceptibility in accordance with the present systems, devices, articles, and methods.

FIG. 2 is a flow chart that illustrates an exemplary method 200 for tuning one or more qubits' tunneling rate(s) $\Delta_i$. Method 200 illustrated by FIG. 2 comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIG. 2, the acts are assumed to be performed by a hybrid computer comprising a quantum processor. Method 200 is an example, and those of skill in the art will appreciate that alternative embodiments may omit certain acts and/or include additional acts.

At 202, a problem is received by the hybrid computer and encoded on the quantum processor. At 204, the hybrid computer collects one or more number of samples based on the encoded problem. The hybrid computer may collect any number of samples, depending on the requirements of the various other acts of method 200 (e.g., depending on the number of samples required to determine the susceptibility of the one or more qubits at 206). For example, in some implementations, the number of samples collected is 1. As another example, in other implementations, the number of samples collected is 1,000.

At 206, the susceptibilities $\chi$ of the one or more qubits are determined by the hybrid computer. Various approaches to determining the susceptibility $\chi$ for each qubit may be taken. For example, the susceptibility $\chi$ of each qubit may be measured directly by measuring the magnetization response of each qubit to a flux bias. As another example, the susceptibility $\chi$ of each qubit may be estimated based on numerical methods applied to the one or more samples (and/or other data). Certain approaches to determining susceptibility $\chi$ of each of the one or more qubits are discussed in greater detail below, but persons skilled in the art will appreciate that other approaches may alternatively or additionally be used.

In some implementations, susceptibility $\chi$ is measured directly. This may be done in situ by, for example, instructing the quantum processor to perform a first set of evolutions of a problem, and performing a second set of evolutions of the problem where a flux bias $\Phi_X$ of one or more qubits is varied. A resulting difference in the magnetization response of the one or more qubits between the first and second sets may then be measured to determine the susceptibility $\chi$ of each of the one or more qubits. For example, susceptibility $\chi$ may be proportional to the change in persistent current $I_P$ relative to the change in flux bias $\Phi_X$ between the first and second sets of evolutions. Where each of the first and second sets of evolutions include a plurality of evolutions, thereby providing a plurality of sample measurements, mean values (or other estimators) of persistent current $I_P$ and/or flux bias $\Phi_X$ may be used. For instance, susceptibility $\chi$ of a qubit may be determined based on:

$$\chi \approx \frac{\overline{\{I_P\}}_1 - \overline{\{I_P\}}_2}{\Phi_{X_1} - \Phi_{X_2}}$$

where $\overline{\{I_P\}}_1$ is the mean of all persistent current measurements for the qubit in the first set of evolutions, $\overline{\{I_P\}}_1$ is the mean of all persistent current measurements for the qubit in the second set of evolutions, $\Phi_{X_1}$ is the flux bias applied to the qubit in the first set of evolutions, and $\Phi_{X_2}$ is the flux bias applied to the qubit in the second set of evolutions.

Since modifying a flux bias $\Phi_X$ of a qubit modifies the problem being computed, modifying fewer qubits per evolution is likely to provide results which more accurately describe the original problem. In some implementations, the flux bias $\Phi_X$ of only one qubit is varied in each set of evolutions, thereby requiring multiple sets of evolutions (and thus more time) to determine the susceptibility $\chi$ of multiple qubits. In some implementations, the flux biases $\{\Phi_X\}$ of a plurality of qubits are varied in a given evolution, thereby reducing the number of sets of evolutions required (but potentially at a loss of accuracy relative to a single-qubit measurement). In some implementations, a global flux bias $\Phi$ is applied uniformly to all qubits of a processor in the second set of evolutions.

The first and second sets of evolutions may be performed in any order, and may optionally be interleaved (e.g., with an evolution of the second set occurring between evolutions of the first set, and/or vice-versa). In some implementations, each of the first and/or second sets of evolutions comprises a single evolution. In some implementations, each of the first and/or second sets of evolutions comprises a plurality of evolutions. The first and second sets of evolutions may comprise different numbers of evolutions.

In some implementations, susceptibility $\chi$ is estimated, e.g., via post-processing techniques. For example, in some implementations, susceptibility $\chi$ of one or more qubits is estimated via a mean field method (e.g., via some implementations of the susceptibility estimation method of FIG. 5).

At 208, a subset D of the one or more qubits is optionally identified for tuning. Such a subset D may comprise, for example, each of the one or more qubits with a susceptibility $\chi$ which differs by more than a threshold amount T from a target susceptibility $\chi_T$. That is, a qubit X with susceptibility $\chi$ may be included in subset D if the following inequality is satisfied:

$$|\chi - \chi_T| > T$$

In some implementations, target susceptibility $\chi_T$ is based on the susceptibilities $\chi$ of the one or more qubits. For example, target susceptibility $\chi_T$ may be determined to be the mean, median, or mode of the susceptibilities $\chi$ of the one or more qubits. T may be a predetermined and/or user-provided value. Alternatively, or in addition, T may be determined based on the susceptibilities $\chi$ of the one or more qubits and/or the target susceptibility $\chi_T$. For example, T may be a percentage of the target susceptibility $\chi_T$ (e.g. $0.1\chi_T$, $0.5\chi_T$, $1.0\chi_T$, or any other suitable value).

As another example, subset D may be determined by identifying the N qubits with the most extreme susceptibilities $\chi$—e.g. the N qubits for which $|\chi-\chi_T|$ is maximized (where N is some positive integer).

In some implementations, only qubits which are to be advanced are included in subset D. In some implementations, only qubits which are to be retarded are included in subset D.

At 210, a $\Delta$-tuning offset co is determined for each of the qubits in D. The offset may be determined in various ways, and may depend, at least in part, on the approach taken at 212 to tune $\Delta_i$ for each qubit. In some implementations, qubits are tuned to have approximately equivalent tunneling rates $\Delta_i$, so that qubits freeze out roughly simultaneously (such qubits are said to be "synchronized"). In some implementations, the $\Delta$-tuning offset $\omega$ for a particular qubit X is determined based on a normalized difference between the susceptibility $\chi$ for qubit X and a threshold susceptibility $\chi_T$. For example, $\Delta$-tuning offset $\omega$ may be determined according to the following formula:

$$\omega = \frac{\chi - \chi_T}{\chi_T}$$

At 212, the tunneling rate $\Delta_i$ for each qubit of subset D is tuned according to the qubit's associated $\Delta$-tuning offset $\omega$. As discussed elsewhere herein, there are various ways to tune $\Delta_i$, for example by modifying a digital-to-analog converter (DAC) offset to the qubits' compound-compound Josephson junctions (CCJJs), forming logical qubits, etc. In some implementations, the tunneling rate $\Delta_i$ for each qubit of subset D is scaled proportionately to $\Delta$-tuning offset $\omega$. For example, an offset $\omega=0.2$ may correspond to an approximately 20% increase in $\Delta_i$ for a qubit (thus retarding the qubit's annealing rate and delaying freeze-out), whereas an offset $\omega=-0.1$ may correspond to an approximately 10% increase in $\Delta_i$ for a qubit (thus advancing the qubit's annealing rate and accelerating freeze-out). For example, each qubit in subset D may be provided with a new $\Delta_i$ according to the following formula:

$$\Delta_{new} = (1 + \omega)\Delta_{old}$$

where $\Delta_{old}$ is the $\Delta_i$ for the qubit prior to $\Delta$-tuning and new is the $\Delta_i$ for the qubit after $\Delta$-tuning.

Figure 3:
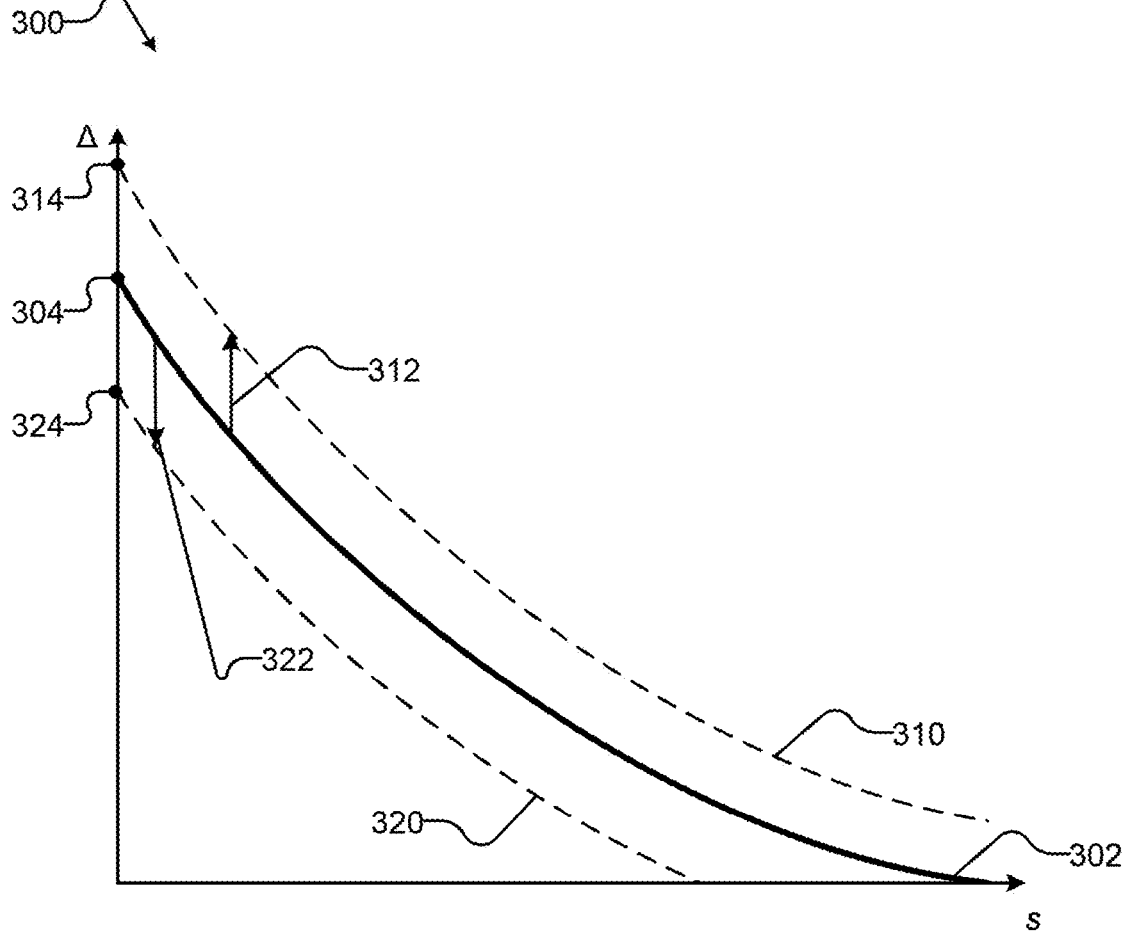
FIG. 3 is a plot that illustrates advancing or retarding the per-qubit annealing schedule by tuning the tunneling rate $\Delta_i$.

FIG. 3 shows a chart illustrating an example $\Delta$-tuning scenario. The vertical axis corresponds to the instantaneous tunneling rate $\Delta$ for a given qubit. The horizontal axis corresponds to time, and particularly to progress in the evolution (denoted s). Line 302 corresponds to the tunneling rate of an example qubit (not shown), and point 304 shows the initial tunneling rate $\Delta_i$ of the qubit. Line 310 corresponds to a scenario where evolution of the example qubit has been retarded by applying an offset 312 (e.g., which may be represented by a positive number), resulting in an initial tunneling rate $\Delta_i$ corresponding to point 314. Line 320 corresponds to a scenario where evolution of the example qubit has been advanced by applying an offset 322 (e.g., which may be represented by a negative number), resulting in an initial tunneling rate $\Delta_i$ corresponding to point 324. In the scenario of line 310, the evolution of the qubit freezes out later than the evolution originally would have (i.e., in the pre-$\Delta$-tuning scenario corresponding to line 302). In the scenario of line 320, the evolution of the qubit freezes out earlier than it original would have.

Returning to FIG. 2, at 214 the hybrid computer performs a computation of the problem (which may have been modified by the $\Delta$-tuning operation of 212) and determines a solution.

Estimation of Susceptibility

In some implementations, the susceptibility of qubits is estimated by using a model to estimate one or more characteristics of the qubits and, based on those characteristics, estimating the susceptibility of the qubits. Such estimations of susceptibility may be used, for example, at 206 of method 200. As is discussed in greater detail below, models which may be used in such estimation include, but are not limited to, mean field models.

Figure 5:
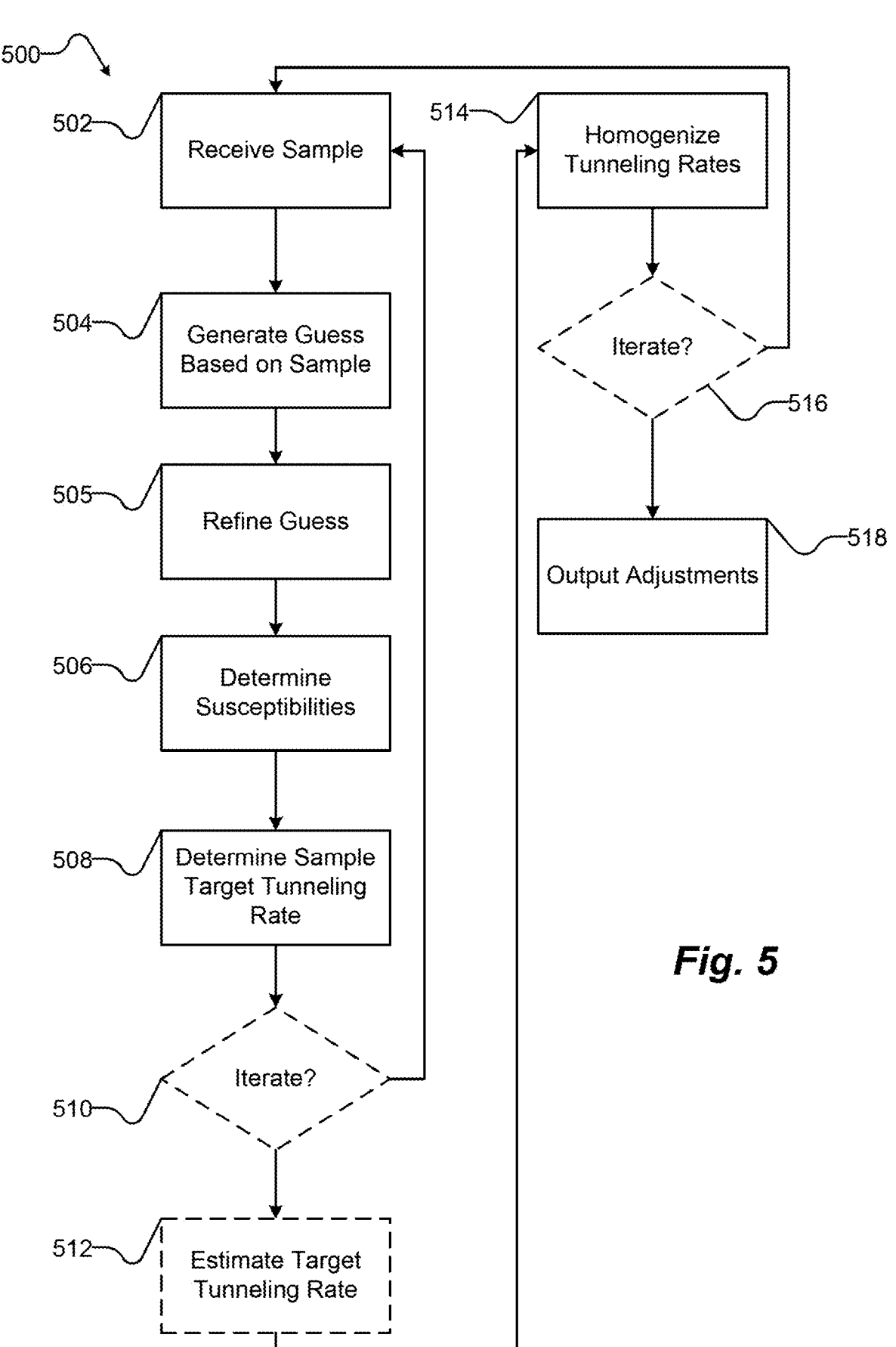
FIG. 5 is a flow chart illustrating an example susceptibility determination method.

FIG. 5 is a flow chart illustrating an example susceptibility determination method 500. At 502, a sample $\vec{s} = (s_1, s_2, \ldots, s_n)$ is received from the hardware, where each $s_i$ refers to the state of the $i^{th}$ qubit in the sample. For example, sample $\vec{s}$ may be a sample collected at 204 (FIG. 2). As is discussed in greater detail elsewhere herein, a plurality of samples $\vec{s}$ may be received by performing at least a portion of the susceptibility determination method 500a plurality of times (e.g., by iterating at 510). In some implementations, each sample $\vec{s}$ corresponds to the same problem encoded on the quantum processor (e.g., the problem received at 202). In some implementations, different samples g may be obtained by computing the problem at different energy scales. The following disclosure generally refers to a single sample $\vec{s}$ with the understanding that elements of method 500 may be performed for each sample $\vec{s}$ received at 502.

At 504, an initial guess or estimate relating to one or more characteristics of the qubits is generated based on the sample g. For example, the initial guess may be an estimate of a characteristic of the qubit which relates to susceptibility. In some implementations, the initial guess is a collection of estimated currents $\vec{\imath} = (I_1, I_2, \ldots, I_n)$, where each $I_i$ refers to the current of the $i^{th}$ qubit at a particular time t during the anneal. (Note that currents of qubits may vary over the course of an anneal.) Since further guesses may be generated while performing method 500, the initial guess may be denoted $$\vec{\imath}_g^{(1)},$$

with the $i^{th}$ guess denoted $$\vec{\imath}_g^{(1)}.$$

In some embodiments, initial guess $$\vec{\imath}_g^{(1)}$$

may be determined by circuitry based on the following equation:

$$I_i = -s_i I_p$$

where $I_p$ is the persistent current at time t for the $i^{th}$ qubit. It will be understood that other initial guesses may be used instead of, or in addition to, this example guess.

At 505, the initial guess is refined to generate a refined guess by the circuitry. For example, the initial guess $$\vec{I}_g^{(1)}$$

for $\vec{I}$ may be refined to generate another guess $$\vec{I}_g^{(2)},$$

which may be refined to generate another guess $$\vec{I}_g^{(3)}$$

and so on. Guesses for $\vec{I}$ may be successively generated until an end condition, thereby producing a refined guess denoted $$\vec{I}_g^{(p)} = \left( I_1^{(p)}, I_2^{(p)}, \dots I_n^{(p)} \right).$$

For example, guesses for $\vec{I}$ may be successively generated until $$\vec{I}_g^{(i)}$$

converges, and the value to which it converges (and/or the last-generated values at the time of convergence) may be used as refined guess $$\vec{I}_g^{(p)}.$$

As another example, guesses for $\vec{I}$ may be successively generated until a threshold number of iterations have occurred, and the last-generated guesses may be used as refined $$\vec{I}_g^{(p)}.$$

In some implementations, guesses may be refined by making use of a well-defined relationship between flux $\Phi$ applied to a superconducting quantum processor and the resulting current I flowing in the device. For instance, for at least some superconducting quantum processors, equilibrium states of the processor may be the solutions to the following set of coupled equations:

$$\vec{\Phi} = M\vec{I} + \vec{\Phi}_b$$

where $\vec{\phi} = (\Phi_1, \Phi_2, \dots \Phi_n)$ where $\Phi_i$ is the flux of the $i^{th}$ qubit, M is the matrix of mutual inductances between qubits, and $\vec{\phi}_b = (\Phi_{b1}, \Phi_{b2}, \dots \Phi_{bn})$ where $\Phi_{bi}$ is the external bias applied to the $i^{th}$ qubit.

In some implementations, guesses for $\vec{\phi}$ and $\vec{I}$ are iteratively generated by the circuitry so that each guess for $\vec{\phi}$ is based on a prior guess for $\vec{I}$ and vice-versa. For example, each guess for $\vec{\phi}$ may be determined based on the following equation:

$$\vec{\Phi}_g^{(i)} = M\vec{I}_g^{(i)} + \vec{\Phi}_b$$

where $$\vec{\Phi}_g^{(i)}$$

is the $i^{th}$ guess for $\vec{\phi}$. A further guess for $\vec{I}$, i.e $$\vec{I}_g^{(i+1)},$$

may be generated based on $$\vec{\Phi}_g^{(i)}.$$

A refined guess $$\Phi_g^{(p)} = \left( \Phi_1^{(p)}, \Phi_2^{(p)}, \dots \Phi_n^{(p)} \right)$$

for $\vec{\phi}$ may be generated based on the various guesses $$\vec{\Phi}_q^{(i)}.$$

In some implementations, one or more guesses subsequent to the initial guess $$\vec{I}_g^{(1)}$$

for $\vec{I}$ may be generated based on a mean field model. For instance, $$\vec{I}_g^{(i)}$$

may be generated based on an expectation value for the current of an isolated qubit having flux $$\vec{\Phi}_g^{(i)}.$$

25                    26

For example, $$\vec{I}_g^{(i)}$$

may be generated by determining each element $I_i$ based on the following equation:

$$I_i = \left\langle \vec{I}^{1q}(\Phi_i)\right\rangle$$

where $\vec{I}^{1q}(\Phi)$ is the current of an isolated qubit as a function of its flux $\Phi$, $\Phi_i$ is the $i^{th}$ element of $$\vec{\Phi}_g^{(i)},$$

and $\langle \bullet \rangle$ denotes the expectation value.

In some implementations, $\vec{I}^{1q}(\Phi)$ is determined, for example, by looking up a value in a lookup table, by the circuitry, based on known characteristics of isolated qubits.

In some implementations, $\vec{I}^{1q}(\Phi)$ is computed based on a model of isolated qubits. For example, the quantum behavior of a bistable rf-SQUID may be modeled by the Hamiltonian H of an isolated qubit based on the following equation:

$$H = -\frac{1}{2}\epsilon\sigma_z - \frac{1}{2}\sigma_x$$

where $\epsilon = 2I_p\Phi$, $\Delta$ is the tunneling rate between the states of the rf-SQUID at degeneracy, and $\sigma_z$ and $\sigma_x$ have the meanings provided above. The eigenenergies of H are $E_\pm = \pm\sqrt{\epsilon^2+\Delta^2}/2$. The expectation value of the rf-SQUID's persistent current $I_p$ in the ground state is $\langle I_g\rangle = I_p\langle \sigma_z\rangle = I_p\cos\Theta$ and the expectation value of the rf-SQUID's persistent current $I_p$ in the excited state is $\langle I_e\rangle = I_p\langle \sigma_x\rangle = -I_p\cos\Theta$, where $\Theta = \pi/2 - \tan^{-1}(\epsilon/\Delta)$. At temperature T, assuming thermal equilibrium, the persistent current expectation value for the isolated qubit is $\langle I_p\rangle = P_g\langle I_g\rangle + P_e\langle I_e\rangle$, where $P_g$ and $P_e$ are the ground state and excited state Boltzmann occupation factors, respectively.

The inventors have determined, based on the foregoing, that in such implementations the expectation value of the persistent current for an isolated qubit, $\langle I_p\rangle$, may be determined based on the following equation:

$$\langle I_p\rangle = -I_p\cos\Theta\tanh\left(\frac{E_+}{k_BT}\right)$$

where $k_B$ is the Boltzmann constant. Thus, a guess $$\vec{I}_g^{(j+1)}$$

may be generated, by the circuitry, by calculating its elements $I_i$ according to the following equation:

$$I_i = \langle I_p\rangle_i = -I_p\cos\left(\frac{\pi}{2} - \tan^{-1}\left(\frac{2I_p\Phi_i}{\Delta}\right)\right)\tanh\left(\frac{\sqrt{\epsilon^2+\Delta^2}/2}{k_BT}\right)$$

where $\Phi_i$ is the $i^{th}$ element of $$\vec{\Phi}_g^{(j)}.$$

In some implementations, the temperature T is modelled as a limit, with T approaching zero. This may be implemented by, for example, omitting the tanh term from the above equations. Temperature may be accounted for separately (e.g. via a subsequent adjustment step) or not at all.

In some implementations, guesses for $\vec{I}$ may be generated via gradient descent. For example, guesses $$\vec{I}_g^{(i)}$$

for $\vec{I}$ may be iteratively generated based on the following equation:

$$L_g^{(i)}\vec{I}_g^{(i+1)} = \vec{\Phi}_b - \vec{\Phi}_g^{(i)} + \left(\chi_D^{(i)}\right)^{-1}\vec{I}_g^{(i)}$$

where $$\vec{\Phi}_g^{(j)}$$

is expressible as a function of $$\vec{I}_g^{(i)}$$

(e.g., by taking the inverse of the formula for $I_i = \rangle I_{P\vec{I}\ i}$ described above), $$\chi_D^{(i)}$$

is a diagonal matrix where each $j^{th}$ diagonal element is a guess $$\chi_{gj}^{(i)}$$

of the susceptibility of the $j^{th}$ qubit, and $$L_g^{(i)} = \left(\chi_D^{(i)}\right)^{-1} - M.$$

This formula may be derived by observing that the flux $\Phi_j$ for a given qubit may be estimated to first order based on the following expansion:

$$\vec{\Phi} \cong \vec{\Phi}_g^{(i)} + \left(\chi_{gj}^{(i)}\right)^{-1}\left(I_{gj}^{(i)} - I_{gj}^{(i+1)}\right)$$

where $$I_{gj}^{(i)}$$

is the $j^{th}$ element of $$\vec{I}_g^{(i)} \text{ and } I_{gj}^{(i+1)}$$

is the $j^{th}$ element of $$\vec{I}_g^{(i+1)}.$$

This relationship may be substituted into the formula $\vec{\Phi} = M\vec{I} + \vec{\Phi}_b$ to yield the formula for $$L_g^{(i)}\vec{I}_g^{(i+1)}$$

provided above.

The guess of each qubit's susceptibility $$\chi_{gj}^{(i)}$$

may be generated based on the derivative of the current-flux relationship $dI_j/d\Phi_j$ evaluated at $$\Phi_j^{(i)}.$$

The derivative $dI_j/d\Phi_j$ may be determined via any suitable method (e.g., numerically, symbolically, analytically), and may be based on any available model for the current-flux relationship. In some implementations, $$\chi_{gj}^{(i)}$$

is determined based on the isolated-qubit expectation value for persistent current $\langle I_p \rangle$ described above, which may yield (for example) the following formula:

$$\chi_{gj}^{(i)} = \frac{dI_j}{d\Phi_j} = \frac{d}{d\Phi_j}\left[-I_p\cos\left(\frac{\pi}{2} - \tan^{-1}\left(\frac{2I_p\Phi_j}{\Delta}\right)\right)\tanh\left(\frac{\sqrt{\epsilon^2+\Delta^2}/2}{k_BT}\right)\right]_{\Phi_j^{(i)}}$$

At 506, an estimated problem susceptibility $$\chi_j^{(p)}$$

is determined for each qubit based on a guess produced at 505. In some implementations, problem susceptibility $$\chi_j^{(p)}$$

may be based, for example, on a guess $$\chi_{gj}^{(i)}$$

generated as described above based on $$\vec{I}_g^{(p)}.$$

Such a guess $$\chi_{gj}^{(i)}$$

may have been generated at 505 (e.g., as the last-generated guess $$\chi_{gj}^{(i)})$$

by the circuitry and/or may be generated at 506 based on refined guess $$\vec{I}_g^{(p)}$$

by the circuitry.

In some implementations, the estimated problem susceptibility $$\chi_j^{(p)}$$

is generated based on the refined guess of 505 and further based on an estimated perturbation of the fluxes $\vec{\Phi}$ of the qubits caused by a change in the flux bias $\vec{\Phi}_b$ of one or more qubits. For example, the estimated problem susceptibility $$\chi_j^{(p)}$$

may be determined based on the following equation:

$$\chi_{ij}^{(p)} = \frac{\partial I_i}{\partial \Phi_{bj}} = \left(L_g^{(p)}\right)_{ij}^{-1}$$

where $$\chi_{ij}^{(p)}$$

is an estimate of the susceptibility of the $i^{th}$ qubit to a change in the flux bias of the $j^{th}$ qubit and $$L_g^{(p)} \text{ is the } L_g^{(i)}$$

matrix (described above) where the diagonal elements of $$\chi_D^{(i)}$$

are determined based on $$I_g^{(p)}.$$

The $(i, j)^{th}$ element of the inverted $$L_g^{(p)}$$

matrix corresponds to $$\chi_{ij}^{(p)}.$$

The estimated problem susceptibility $$\chi_j^{(p)}$$

for a particular qubit may be determined based on (and, e.g., may be equal to) the $j^{th}$ diagonal entry of the inverted $$L_g^{(p)}$$

matrix, i.e.

$$\chi_{jj}^{(p)}.$$

To understand the above relation, it may be helpful to consider one potential derivation. Suppose that refined guess $$I_g^{(p)}$$

is accepted as a solution of the system of equations $\vec{\Phi} = M\vec{I} + \vec{\Phi}_b$. Then $$\vec{I} = \vec{I}_g^{(p)} \text{ and } \vec{\Phi} = \vec{\Phi}_g^{(p)} = M\vec{I}_g^{(p)} + \vec{\Phi}_b.$$

A small perturbation $\delta\vec{\Phi}_b$ in the flux bias $\vec{\Phi}_b$ yields:

$$\vec{I} \rightarrow \vec{I}_g^{(p)} + \delta\vec{I}$$

-continued $$\vec{\Phi}_b \rightarrow \vec{\Phi}_b + \delta\vec{\Phi}_b$$

which, based on the foregoing, allows us to derive:

$$L_g^{(p)}\left(\vec{I}_g^{(p)} + \delta\vec{I}\right) = \left(\vec{\Phi}_b + \delta\vec{\Phi}_b\right) - \vec{\Phi}_g^{(p)} + \left(\chi_D^{(p)}\right)^{-1}\vec{I}_g^{(p)}$$

which yields:

$$L_g^{(p)}\delta\vec{I} = \delta\vec{\Phi}_b$$

thereby relating the elements of $$L_g^{(p)}$$

to the susceptibilities of the qubits. In particular, the diagonal elements of $$\left(L_g^{(p)}\right)^{-1}$$

(which may be denoted $$\chi_{jj}^{(p)})$$

correspond to the estimated susceptibility of a qubit j to a change in its current, which allows $$\chi_{jj}^{(p)}$$

to be used as an estimate of $$\chi_j^{(p)}.$$

Figure 4:
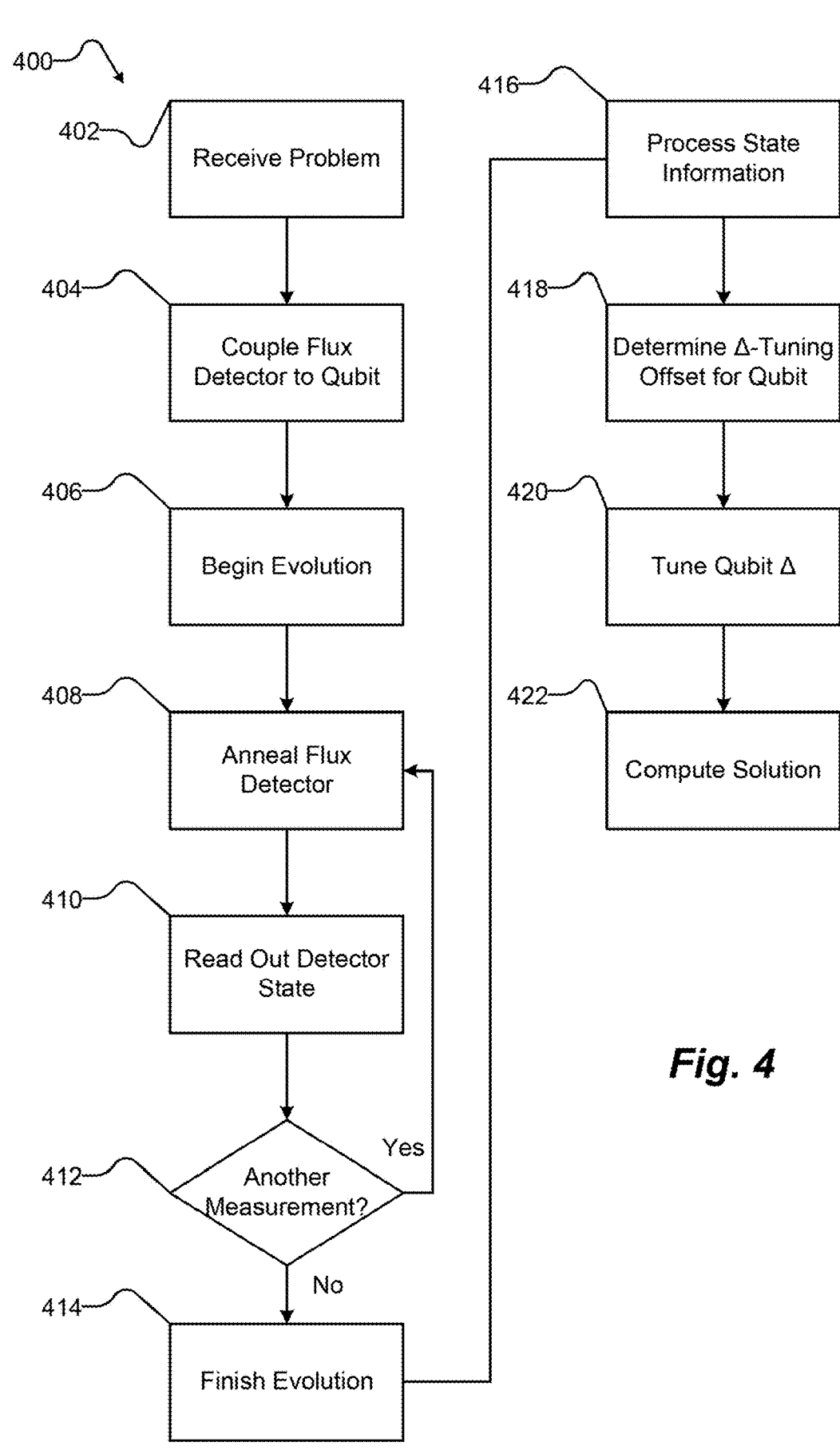
FIG. 4 is a flow chart illustrating an exemplary method of operation of a hybrid computing system comprising a quantum processor to mitigate degeneracy via mid-evolution measurement of qubits in accordance with the present systems, devices, articles, and methods.

In some implementations, method 500 may output the estimated susceptibilities generated as described above and method 500 may terminate. In some implementations, method 500 may repeat acts 502-506 to generate a plurality of estimates susceptibilities for each qubit by the circuitry. The plurality of estimates may be combined by the circuitry to generate a combined estimate $$\overline{\chi_j^{(p)}}$$

for each qubit. For example, the combined estimate $$\overline{\chi_j^{(p)}}$$

for a qubit may be determined by averaging the estimated susceptibilities generated for that qubit. Combined estimate $$\overline{\chi_j^{(p)}}$$

may be output and method 500 may terminate. In some implementations, such as the depicted implementation, method 500 may continue to generate $\Delta$-tuning offsets based on the generated susceptibilities. Method 500 may thus be performed as part of, or instead of, act 210 of method 200 (FIG. 2) and/or act 418 of method 400 (FIG. 4).

At 508, a target tunneling rate $$\Delta_j^{(p)}$$

for each qubit j is determined. In some implementations, the value of $$\Delta_j^{(p)}$$

is determined based on an isolated qubit model, e.g. so that the value of $\Delta_j$ is selected so that an isolated qubit with a tunneling rate of $$\Delta_j^{(p)}$$

would have a susceptibility that matches the estimated problem susceptibility $$\chi_j^{(p)}$$

determined at 506.

Since susceptibility can vary with flux/current (which, as noted above, are related characteristics), the isolated qubit model may also be based on flux and/or current. For example, the value of $\Delta_j$ may be determined according to the following equation:

$$\chi^{1q}\left(\Delta_j^{(p)}, \Phi_j\right) = \chi_j^{(p)}$$

where $\Phi_j$ is the flux of the $j^{th}$ qubit.

Tunneling rate $$\Delta_j^{(p)}$$

may be determined in any available manner. In some implementations, the value for $$\Delta_j^{(p)}$$

is found in a lookup table which relates flux $\Phi_j$ and susceptibility $$\chi_j^{(p)}$$

to tunneling rates $$\Delta_j^{(p)}.$$

In some implementations, tunneling rate $$\Delta_j^{(p)}$$

is determined based on a model and/or formula. In some implementations, $$\Delta_j^{(p)}$$

is determined so that the corresponding isolated qubit susceptibility is approximately equal to $$\chi_j^{(p)}$$

(e.g., if a lookup table comprises discrete values of $$\Delta_j^{(p)}$$

for a given flux $\Phi_j$, a value of $$\Delta_j^{(p)}$$

may be selected which corresponds to an isolated-qubit susceptibility $\chi^{1q}$ which most closely matches problem susceptibility $$\chi_j^{(p)}).$$

Optionally, at 510, acts 502-508 may be iteratively repeated by the circuitry to produce further values for tunneling rate $$\Delta_j^{(p)}$$

(e.g., based on further samples received from hardware).

If a plurality of values for tunneling rate $$\Delta_j^{(p)}$$

are iteratively determined via 510, at 512 the plurality of values for tunneling rate $$\Delta_j^{(p)}$$

$$\omega_j^{(p)}$$

are used by the circuitry to estimate a combined target tunneling rate $$\overline{\Delta_j^{(p)}}$$

for each qubit. In some implementations, $$\overline{\Delta_j^{(p)}}$$

is determined by averaging the plurality of values for tunneling rate $$\Delta_j^{(p)}.$$

For the sake of convenience, combined tunneling rate $$\overline{\Delta_j^{(p)}}$$

is referred to simply as tunneling rate $$\Delta_j^{(p)}$$

in the subsequent acts of method 500. It will be understood that subsequent acts make use of combined tunneling rate $$\overline{\Delta_j^{(p)}}$$

(if acts 510 and 512 are performed) in the place of the individually-generated values which comprise it.

At 514, adjustments (e.g., a Δ-tuning offset) for the tunneling rates $\Delta_i$ of one or more qubits are determined based on one or more of the target tunneling rates $$\Delta_j^{(p)}.$$

This determination is referred to herein as homogenization. A goal of homogenization is to reduce the difference between the freeze-out times of different qubits (relative to their initial, pre-homogenization freeze-out times) in at least some circumstances.

In some implementations, a Δ-tuning offset $\omega_j$ is determined based on a statistical characteristic of a plurality of target tunneling rates $$\Delta_j^{(p)}.$$

For example, the Δ-tuning offset $\omega_j$ for a qubit j may be determined based on the difference between the median value of the target tunneling rates and the pre-homogenization tunneling rate $\Delta_j$. In some implementations, $\omega_j$ is determined based on the following formula:

$$\omega_j = \text{median}_i(\Delta_i^{(p)}) - \Delta_j$$

In some implementations, a reduced offset $\omega_j$ (i.e., an offset having a reduced magnitude relative to the above) is used. In some circumstances, such reduction may help to account for nonlinearities and distributed effects encountered when adjusting $\Delta_j$. For example, offset $\omega_j$ may be determined as described above and then reduced by a constant factor (e.g., $\omega_j$ may be halved), reduced exponentially, and/or otherwise reduced.

Optionally, method 500 may iteratively repeat acts 502-514 at 516 based on the offsets $\omega_j$ generated at 514. In some implementations, further hardware samples are received after qubit tunneling rates have been adjusted based on the offsets $\omega_j$. In some implementations, further hardware samples are not necessarily received at 502, and instead (or additionally) modified samples may be generated based on hardware samples previously received at 502, the offsets $\omega_j$, and a model relating changes in tunneling rates $\Delta_j$ to changes in samples $\vec{s}$. Thus, subsequent iterations of method 500, executed by the circuitry, based on offsets $\omega_j$ may be wholly, partially, or not at all based on further hardware samples.

Further iterations may involve further homogenization at 514, thereby refining offsets $\omega_j$ over multiple iterations.

At 518, offsets $\omega_j$ are output by the circuitry. Such output may comprise, for example, adjusting tunneling rates $\Delta_j$ of one or more qubits based on offsets $\omega_j$ as described elsewhere herein, returning offsets $\omega_j$ in software, communicating offsets $\omega_j$ via a communication link, displaying offsets $\omega_j$ to a user, and/or otherwise providing offsets $\omega_j$ to a hardware and/or software interface.

Mitigation of Degeneracy Via Mid-Evolution Measurement

In some implementations, the state of qubits is measured during an evolution prior to completion. Such measurements may provide information about time-dependent quantum annealing dynamics over the course of the evolution (e.g., approximate freeze out times, correlations of states as a function of time, and/or other information). Such information may be used to manipulate the annealing process via (for example) Δ-tuning. In some implementations, flux detectors are used to measure expectation values of one or more qubits at one or more times during an evolution, and the measurements of the flux detectors are used to tune $\Delta_i$ for one or more of the one or more qubits.

FIG. 4 is a flow chart that illustrates an exemplary method 400 for tuning one or more qubits' tunneling rate(s) $\Delta_i$. Method 400 illustrated by FIG. 4 comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIG. 4, the acts are assumed to be performed by a hybrid computer comprising a quantum processor. Method 400 is an example, and those of skill in the art will appreciate that alternative embodiments may omit certain acts and/or include additional acts.

At 402, a problem is received by the hybrid computer and encoded on the quantum processor. At 404, the hybrid computer couples a flux detector to a qubit (referred to herein as the "problem qubit"). The problem qubit may be an individual hardware qubit or a logical qubit comprising a plurality of hardware qubits. Method 400 may involve any number of flux detectors and problem qubits; although this disclosure refers generally to "a problem qubit" and "a flux detector", it will be understood that a plurality of flux detectors and problem qubits may be simultaneously and/or sequentially measured and/or tuned according to method 400.

The flux detector may be any quantum flux parametron which is capable of being annealed separately from the problem qubit. For example, the flux detector may comprise a qubit that neighbours (i.e., shares a coupler with) the problem qubit. As another example, the flux detector may be a calibration device provided by the processor and configured to measure the problem qubit. The strength J of the coupling between the flux detector and the problem qubit may be problem-dependent; in general, the coupling strength J should be strong enough to reliably copy qubit states to the flux detector, but weak enough not to perturb the problem qubit's dynamics. Determining the appropriate strength will depend, in part, on the problem qubit's couplings with other qubits.

At 406, the quantum processor begins an evolution, which includes annealing the problem qubit and the flux detector. In some implementations, the problem qubit and flux detector begin annealing substantially simultaneously. In some implementations, the flux detector begins annealing after the problem qubit begins annealing.

At 408, the flux detector is annealed quickly relative to the problem qubit. This may be done by, for example, configuring the flux detector to have a low tunneling rate $\Delta_i$ via any suitable method described herein or otherwise known (now or in the future). The flux detector thus completes its annealing process before the evolution is complete, and potentially before the problem qubit freezes out. By the end of the flux detector's anneal, the expectation value of the state of the problem qubit over the course of the flux detector's anneal is copied to the flux detector.

At 410, the state of the flux detector is read out. In some embodiments, the state of the flux detector is stored in a buffer, and multiple states are read out together.

At 412, the hybrid computer determines whether to perform another measurement of the problem qubit. In some embodiments, the hybrid computer continues to perform measurements of the problem qubit until the evolution is complete. In some embodiments, the hybrid computer performs a predetermined number of measurements and then ceases to perform such measurements. In some embodiments, the hybrid computer ceases to perform measurements of a problem qubit after it determines that the problem qubit has frozen out (e.g., based on measurement information read out from the flux detector). In some implementations, the hybrid computer ceases taking measurements of different problem qubits at different times.

If the hybrid computer determines that another measurement should be performed, method 400 returns to 408. The hybrid computer may optionally incorporate a delay at 412 and/or 408 so that a predetermined amount of time elapses between measurements. The hybrid computer may return to 408 one or more times over the course of an evolution to obtain measurements of the problem qubit at different times during the evolution.

If the hybrid computer determines that no further measurements of the problem qubit should be performed during this evolution, the hybrid computer continues to 414. At 414, the quantum processor completes the evolution.

At 416, the information read out from the flux detector at 410 is processed to determine (at least approximately) information relating to the mid-evolution behavior of the problem qubit. For example, the approximate freeze-out time of the problem qubit may be determined by observing the approximate time at which the expectation value of the qubit's state ceased to change (and/or, in some implementations, ceased to change by more than a threshold amount) between measurements. As another example, avoided level crossings may be identified based on changes in state expectation values between measurements.

At 418, a $\Delta$-tuning offset $\omega$ is determined for the problem qubit based, at least in part, on the information determined at 416. For example, based on approximate freeze-out times determined at 416, the evolution of problem qubits may be advanced or retarded (e.g., as described elsewhere herein) to approximately synchronize their freeze-out times. Alternatively, or in addition, tunneling rates $\Delta_i$ may be modified to reduce the incidence of avoided level crossings, for instance by retarding problem qubits. In some implementations, the global annealing rate of the processor may be retarded to reduce the incidence of avoided level crossings (e.g., where problem qubits experiencing avoided level crossings are not freezing out earlier than the synchronized freeze out time).

Acts 420 and 422 generally correspond to 212 and 214 of FIG. 2, respectively. At 420, the problem qubit is tuned according to the $\Delta$-tuning offset $\omega$ determined at 418. At 422, the hybrid computer performs a computation of the problem (which may have been modified by the $\Delta$-tuning operation of 420) and determines a solution.

Logical Qubit Strategy

As noted elsewhere herein, at least some approaches to modifying a per-qubit annealing schedule $\Delta_i$ may result in modifying the problem which is effectively being computed. For example, modifying the persistent current of a flux qubit will vary the annealing schedule $\Delta_i$ of the qubit, but will also generally modify the flux of the qubit, thereby changing the problem being solved.

In some implementations, $\Delta$-tuning (e.g., at 160 and/or 212) may be performed by changing the encoding of the problem so that effectively the same problem is being solved (although it may be represented differently by the processor). For flux-qubit-based systems, such implementations may be said to provide orthogonal control of persistent current (and/or other parameters which define the problem) and tunneling rate $\Delta_i$.

In some implementations, orthogonal control of persistent current and tunneling rate $\Delta_i$ is provided by encoding the problem in an intermediate formulation which employs "logical" qubits. Logical qubits comprise multiple qubits coupled together (referred to herein as "internal" qubits) to effectively behave as a single qubit. A logical qubit represents a single variable of a problem. Techniques for forming logical qubits (e.g., as qubit chains) are described in, for example, U.S. Pat. Nos. 7,984,012, 8,244,662, and 8,174, 305.

Each internal qubit within a logical qubit has its own associated qubit parameters, such as tunneling rate $\Delta_i$ and persistent current. The logical qubit itself may have "effective" qubit parameters such as an effective tunneling rate $\Delta_{eff}$ and an effective persistent current $I_{eff}$. The effective qubit parameters of the logical qubit are influenced by the qubit parameters of the internal qubits, by the number of internal qubits in the logical qubit, by the strength of couplings $J_i$ between the internal qubits (referred to herein as "internal coupling strengths"), the internal topology of the logical qubit (i.e., the topology of the internal qubits and the couplings between them), and the strength and arrangement of couplings between internal and qubits not in the logical qubit. Accordingly, these parameters of the logical qubit may be selected to obtain a desired (or "target") effective tunneling rate $\Delta_{eff}$.

For example, the effective tunneling rate $\Delta_{eff}$ of a logical qubit having a chain topology with N superconducting qubits and N−1 couplings $J_i$, where each individual qubit has a tunneling rate of $\Delta_i$ and the processor operates in the perturbative regime of $\Delta \ll J$, is:

$$\Delta_{eff} \sim \frac{\prod_{i=1}^{N} \Delta_i}{\prod_{i=1}^{N-1} J_i}$$

If $\Delta_i = \Delta$ and $J_i = J$ for each internal qubit and coupling (i.e. if all $\Delta_i$ and $J_i$ are identical), then this may be simplified as:

$$\Delta_{eff} \sim \Delta \left(\frac{\Delta}{J}\right)^N$$

which implies that, as the number of qubits in the logical qubit increases, the effective tunneling rate of the logical qubit will decrease exponentially.

Logical qubits with different topologies may exhibit different behavior. For instance, effective tunneling rate $\Delta_{eff}$ may also or alternatively be suppressed by increasing the number of internal couplers and/or increasing the strength of internal couplings $J_i$. Significantly, this allows $\Delta_{eff}$ for a logical qubit to be suppressed (i.e., tuned to advance annealing) without necessarily modifying $\Delta_i$ for any internal qubits, thereby providing control of $\Delta_{eff}$ which is orthogonal to control of effective persistent current $I_{eff}$ (as well as the persistent currents $I_P$ of the internal qubits).

Accordingly, in some implementations, $\Delta$-tuning for a particular qubit is performed by modifying the representation of the problem on the processor so that the qubit is represented as a logical qubit. The per-qubit annealing schedule $\Delta_{eff}$ of the logical qubit may then be advanced proportionately to the number of qubits, the strength of couplings, and the topology of the logical qubit.

In some implementations, the qubit being tuned may already be represented as a logical qubit, and $\Delta$-tuning of the logical qubit may comprise modifying the number of qubits, the strength of couplings, and/or the topology of the logical qubit to retard the per-qubit annealing schedule $\Delta_{eff}$ of the logical qubit.

In some implementations, the topology of the logical qubit is determined based on connectivity to external qubits (i.e., qubits outside of the logical qubit). For example, if only a single internal qubit couples to one or more external qubits, then any coupling strengths $J_i$ may be provided for internal couplings (that is, couplers may use their full range of coupling strengths $J_i$, typically from zero up to some maximum coupling strength). However, if multiple internal qubits couple to external qubits, then there will be a problem-dependent minimum internal coupling strength $J_{min}$ which must be maintained to prevent the logical qubit from "breaking" (i.e., to prevent internal qubits from taking on different values). In some implementations, a logical qubit's topology is selected so that only one internal qubit couples to one or more external qubits; this topology may be preferentially selected over other topologies wherein multiple internal qubits couple to one or more external qubits.

Depending on the problem and/or processor topology, the minimum internal coupling strength $J_{min}$ of a logical qubit may be reduced by selecting a particular topology for the logical qubit. For example, a topology may be selected which reduces the number of internal qubits coupling to external qubits.

Ancillary Qubit Strategy

In one approach, results can be obtained using a C2 graph configured to form a 32-qubit 4-regular graph. The hybrid computer can send a 1BOP (1 bit of precision) problem with zero local qubit bias to the hardware. A 1BOP problem is one for which the coupling strength $J = \pm 1$. Some couplers can also be disabled making them "unavailable". While, in general, such problems are easy, the hybrid computer can find, for example, 100 hard instances by first generating 17,000 instances with 2 ground states and more than 400 first excited states, and then taking the 100 instances with the lowest hardware probability of success (typically less than 5%). By using the structure of a C2 embedded in a larger graph, an ancillary qubit can be attached to each of the 32 qubits.

The hybrid computer can apply an iterative method to implement the approach. First the hybrid computer can draw a plurality of samples (e.g., 1,000 samples) using the hardware. Next, the hybrid computer can attach an ancillary constraint to a qubit that is rarely floppy in the plurality of samples and which does not already have an ancillary qubit attached. The ancillary constraint can be pointing away from the current average spin (or magnetization). The hybrid computer can repeat this process, and the probability of success can vary from iteration to iteration. Other variations of the approach can be used, for example adding a local bias to the qubit instead of an ancillary constraint.

A method for removing perturbative crossings can be based on adding ancillary qubits so as to increase the degeneracy of the global minima compared to the degeneracy of competing local minima (see for example US Patent Application publication No. US2015/0032994).

Advancing Qubits During Quantum Annealing

Another approach modifies the energy spectrum by using the local CCJJ (compound-compound Josephson junction) DAC (digital-to-analog converter) to advance some of the qubits during quantum annealing with respect to other qubits. While it may cause a degradation in the persistent current balancing across the C2 ensemble, the primary effect to first order can be to modify the transverse field of some of the qubits during quantum annealing.

Example Comparative Results of Degeneracy Mitigation

Degeneracy mitigation is related to domain freeze-out. Domain freeze-out is generally correlated with degeneracy mitigation though the relationship is generally not one-to-one.

FIGS. 6 to 10 are plots that illustrate comparative results for an example implementation of degeneracy mitigation in a quantum processor in accordance with the present systems, devices, articles, and methods. The method used to generate FIGS. 6 to 10 was as follows:

1. Program a hard C2 problem instance.
2. Draw 1000 samples from the hardware.
3. For a given sample, for every qubit, compute the net bias from its neighbors:

$$b_i = \sum_j J_{ij} s_j$$

4. Over all qubits and samples, compute the prevalence of:

$$b_i = 0$$

5. Determine and select the five qubits with the highest prevalence of $b_i=0$

6. Adjust the local CCJJ DAC bias to advance these qubits with respect to the others by $2.5m\Phi_0$ 7. Collect another 100 samples after the bias has been applied.

FIGS. 6 to 10 were generated using the method described above (acts 1 to 7) and specific variants of the method as described below in reference to FIGS. 6 to 10.

Figure 6:
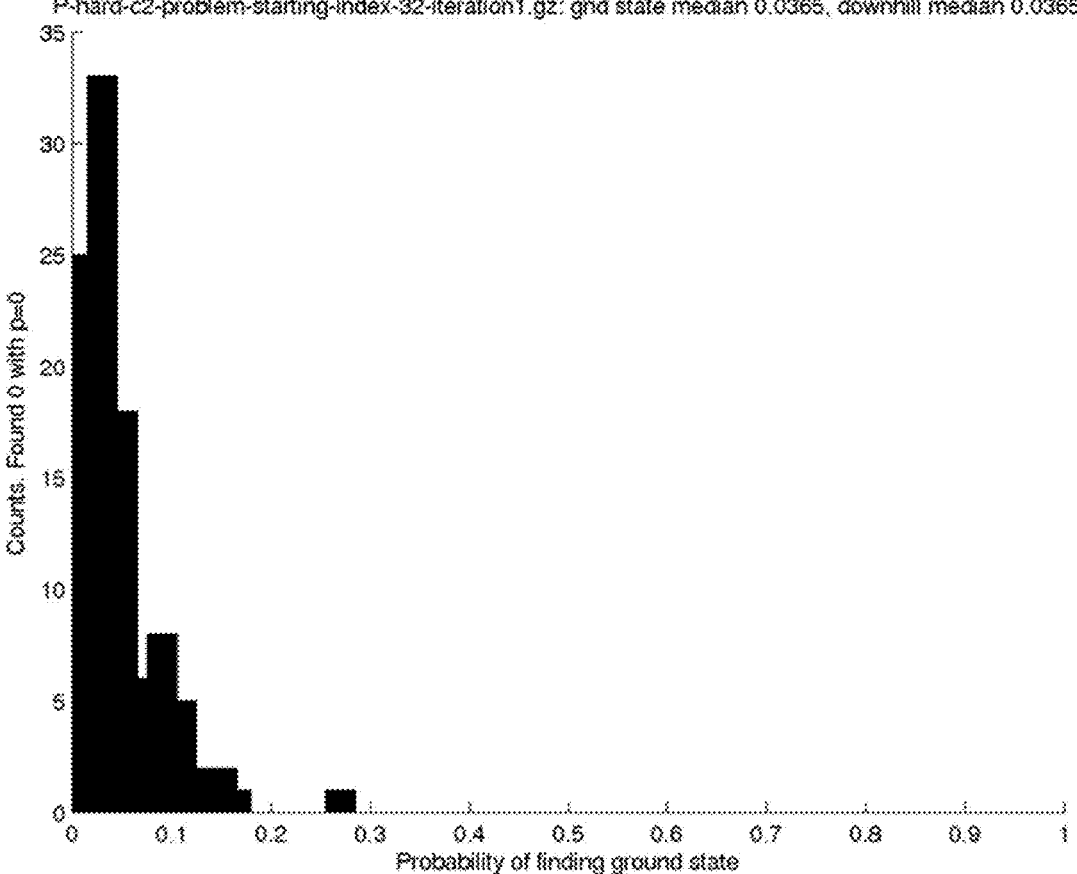

FIG. 6 is a histogram of the probability of finding a ground state for a selected hard problem instance. The problem was run using a variant of the method described above with 10 samples in act 2, instead of 1,000 samples. The problem was run with no local CCJJ DAC adjustment. This is the baseline case, i.e., with no degeneracy mitigation. The median value is approximately 0.04.

Figure 7:
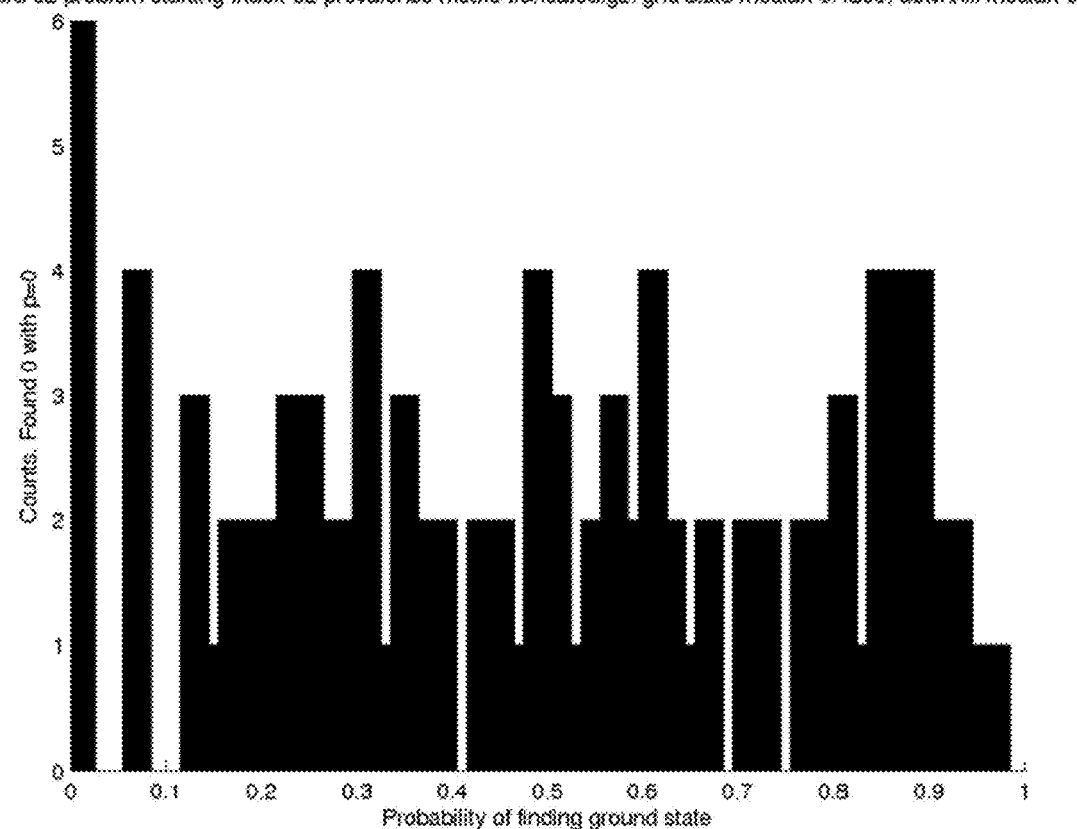

FIG. 7 shows the effect of degeneracy mitigation. Even with only 10 samples, the chances of finding the ground are significantly increased over the baseline case as a result of degeneracy mitigation. The median value in FIG. 7 is approximately 0.49.

Figure 8:
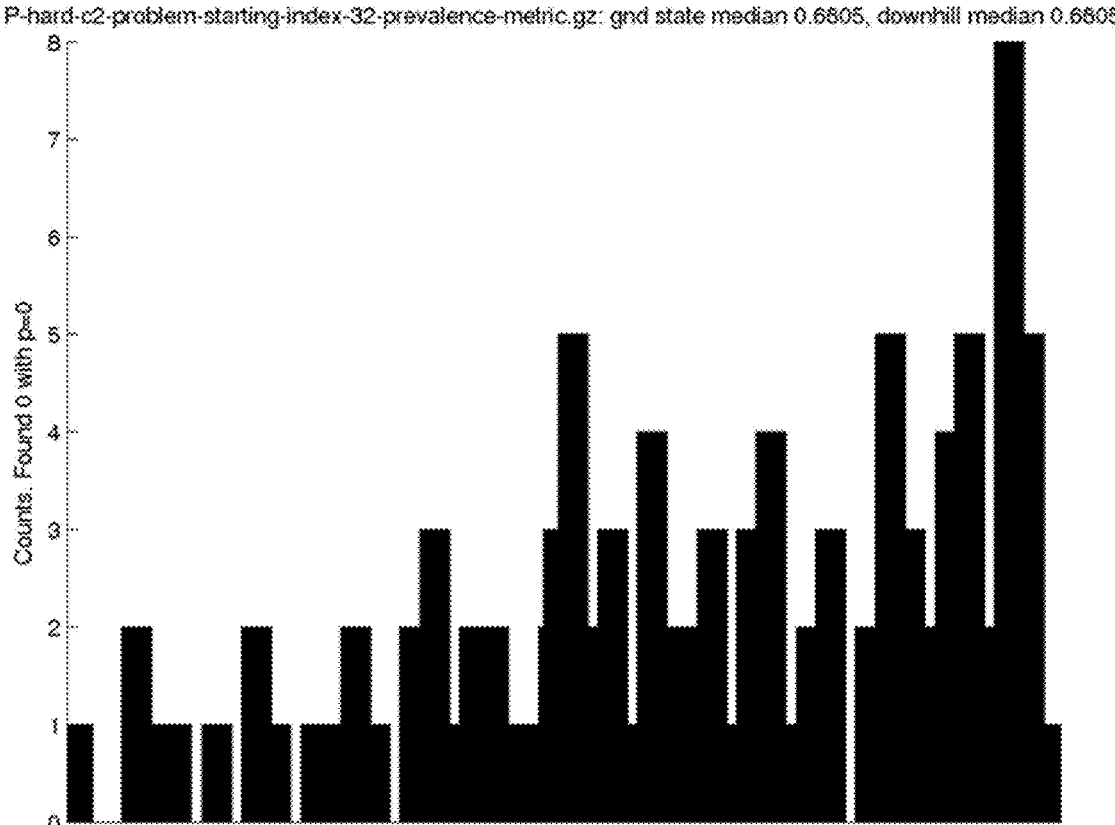

FIG. 8 is a histogram of the probability of finding a ground state for a selected hard problem instance. The problem was run using the method described above with 1,000 samples. FIG. 8 shows the effect of using more samples in degeneracy mitigation. The chances of finding the ground state are increased over the 10-sample case of FIG. 7. The median value in FIG. 8 is approximately 0.66.

Figure 9:
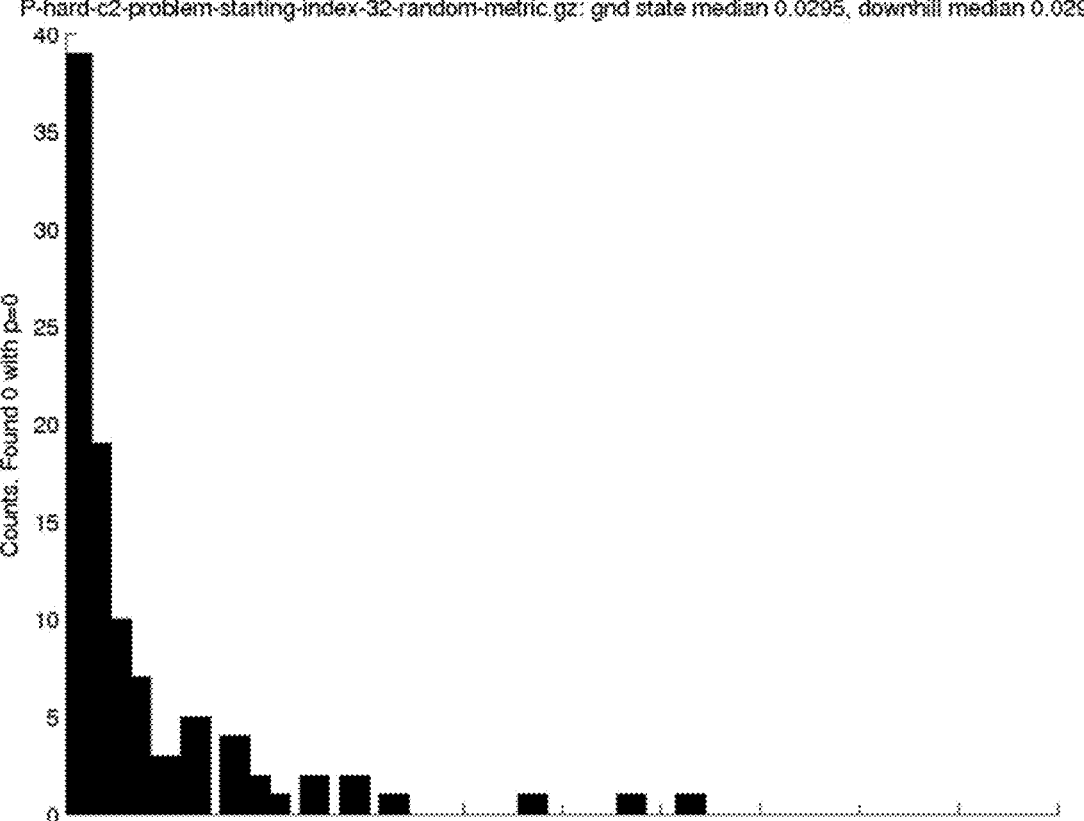

FIG. 9 is a histogram of the probability of finding a ground state for a selected hard problem instance. The problem was run using a variant of the method above advancing 5 random qubits rather than qubits having the highest prevalence of $b_i=0$. The result is similar to the baseline case, and indicates that random degeneracy mitigation can have little or no positive effect on the chances of finding the ground state. The result reinforces the importance of selecting the qubits to advance according to a criterion such as the one described in the method above. The median value in FIG. 9 is approximately 0.03.

FIG. 10 is a histogram of the probability of finding a ground state for a selected hard problem instance. The problem was run using the method described above but with retarding the qubit by making a reverse CCJJ DAC adjustment, instead of advancing the qubit. The result in this example shows an adverse effect on the chances of finding the ground state relative to the baseline case of no degeneracy mitigation. The result illustrates the importance of advancing rather than retarding the qubit. The median value in FIG. 10 is approximately 0.001.

In some implementations, another suitable metric can be used to determine floppiness, such as a metric that can be used with non-zero bias values. For example, instead of summing the bias values, the method can determine, for a given qubit, whether the energy of a given state changes when the state of the qubit is flipped. If the method determines that the energy of the given state does not change, then the qubit can be counted as a floppy qubit.

The present technology boosts performance algorithmically (and iteratively) by modifying an annealing trajectory. While the use of a set of initial samples to guide a modification to the annealing trajectory has been proposed theoretically, the present technology is believed to be the first practical implementation. In addition, the present systems and methods can be implemented to improve sampling diversity, for example the diversity of ground state and/or excited state samples.

A benefit of the present technology is that it can make the hardware sample probability distribution more like a Boltzmann distribution, which can be desirable for sampling.

The present technology is not limited to floppiness metrics. Other metrics can be used, for example to identify one or more "frozen" domains of qubits (domains in which the qubits are locked into the same configuration over many samples), and then retarding the domains during quantum annealing.

Mid-Anneal Pause

It can be beneficial to implement a pause in the annealing schedule.

Figure 11A:
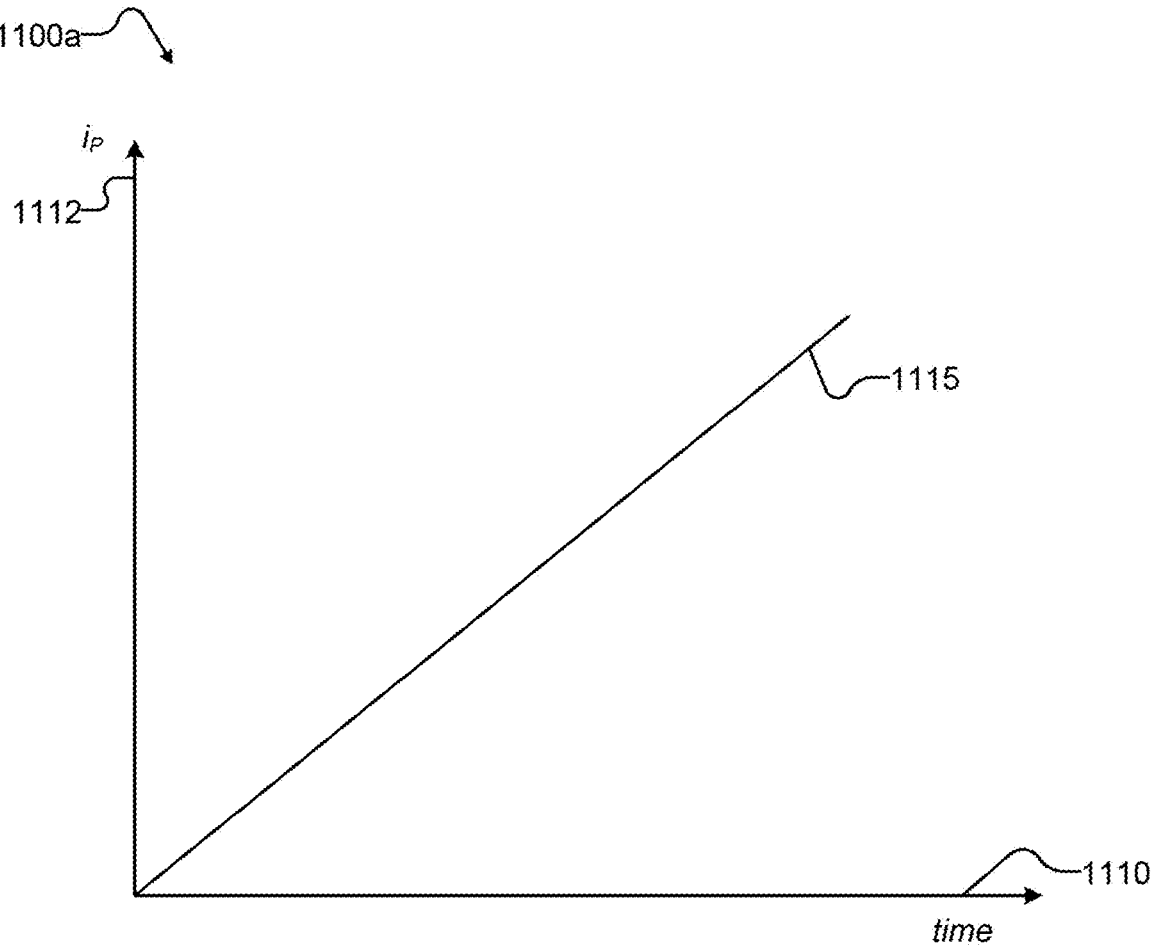
FIG. 11A is a graph illustrating an example annealing scenario with no pause in the annealing schedule.

FIG. 11A shows a chart 1100a illustrating an example annealing scenario with no pause in the annealing schedule. The horizontal axis 1110 corresponds to time. The vertical axis 1112 corresponds to persistent current $i_p$. The tunneling rate $\Delta_i$ for a qubit can be tuned according to the qubit's associated $\Delta$-tuning offset $\omega$. As discussed elsewhere herein, $\Delta_i$ can be tuned by varying the persistent current of the qubit. Line 1115 shows the variation of persistent current with time over the duration of the anneal. In the example shown, persistent current varies linearly with time.

Figure 11B:
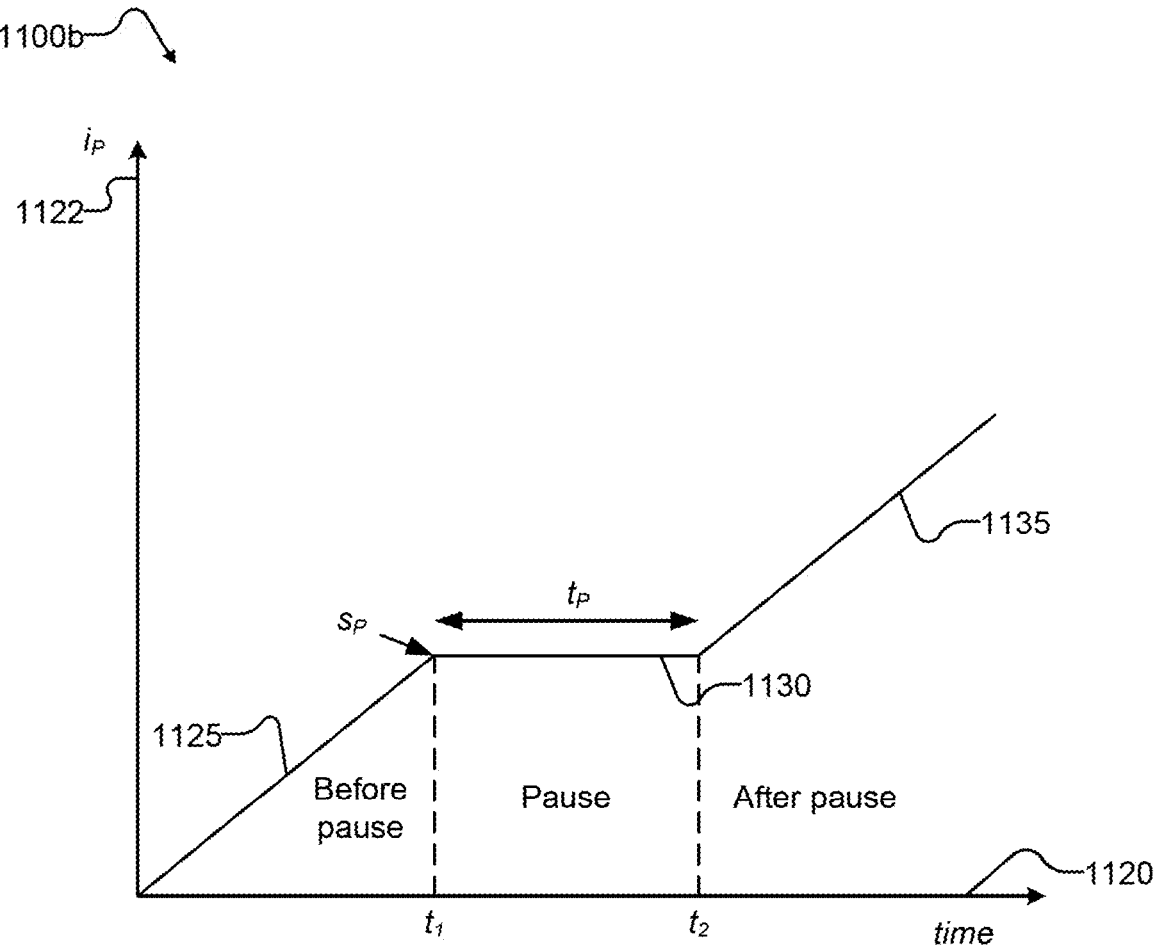
FIG. 11B is a graph illustrating an example annealing scenario with a pause in the annealing schedule.

FIG. 11B shows a chart 1100b illustrating an example annealing scenario with a pause in the annealing schedule. The horizontal axis 1120 corresponds to time. The vertical axis 1122 corresponds to persistent current $i_p$.

Lines 1125, 1130, and 1135 show the variation of persistent current with time over the duration of the anneal. Line 1125 shows the increase of persistent current until the start of the pause. Line 1130 shows the pause. The start of the pause begins at $s_P$ in the progress of the evolution, for example if the start of the pause is halfway through the anneal, then $s_P=0.5$. The start of the pause at $s_p$ corresponds to time $t_1$. The pause ends at time $t_2$ after a pause duration of $t_P$. Line 1135 shows the increase of persistent current from the end of the pause to the end of the anneal.

In some implementations, the annealing schedule has a single pause. In other implementations, the annealing schedule has more than one pause.

In some implementations, a user can specify the start of a pause $s_P$, and the duration of a pause $t_P$, via a user interface. The user interface can be a graphical user interface, a remote interface, and/or an Application Programming Interface. For example, to implement a pause of 100 μs halfway through the anneal, the user can specify $s_P=0.5$ and $t_P=100$ μs.

In testing, the applicant has observed an improvement in the performance of quantum annealing resulting from implementing a pause in the annealing schedule. For example, in the case of a quantum processor comprising 16 qubits, an approximately 30-fold improvement in performance can be achieved in an annealing schedule of 10 μs by incorporating a pause of 100 μs at a suitable stage of the anneal, for a total annealing time of 110 μs. The same improvement with no pause would require an annealing time of approximately 1,000 μs.

Fast and/or Slow Anneal

Annealing time can be adjusted. In some implementations of the presently described systems and methods, a user can specify a desired annealing time. The annealing time can be provided via a user interface, for example an Application Programming Interface (API). The annealing time may be faster or slower than a pre-adjustment annealing time.

Mid-Anneal Ramp

In some implementations of the presently described systems and methods, the annealing schedule can include a mid-anneal ramp. The standard anneal (for example, a linearly increase in persistent current) can be interrupted by a sudden acceleration of the annealing by increasing persistent current sharply at some point during the evolution.

Figure 11C:
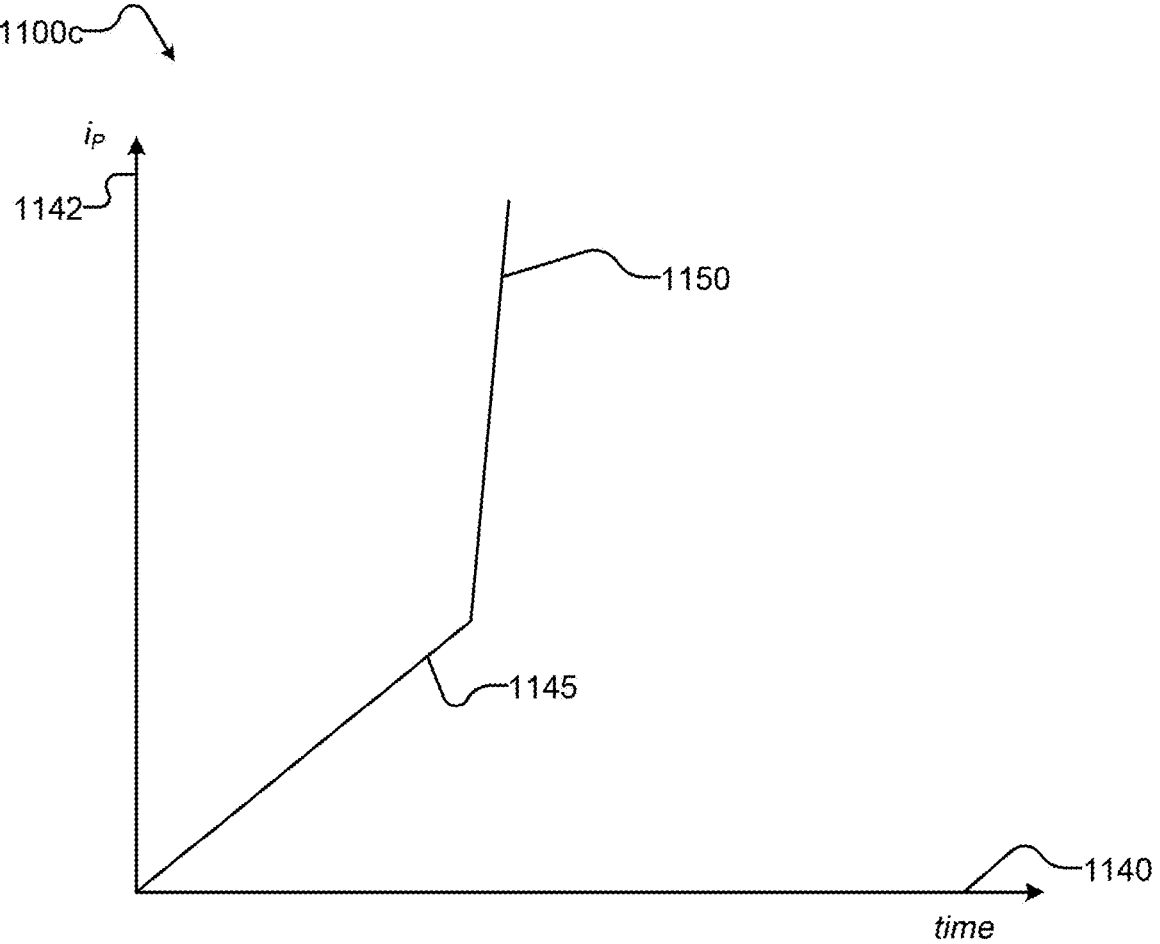
FIG. 11C is a graph illustrating an example annealing scenario with a mid-anneal ramp in the annealing schedule.

FIG. 11C shows a chart 1100c illustrating an example annealing scenario with a mid-anneal ramp 1150 in the annealing schedule. The horizontal axis 1140 corresponds to time. The vertical axis 1142 corresponds to persistent current $i_P$. The annealing schedule begins with a standard anneal 1145, followed by the mid-anneal ramp 1150.

In some implementations, the parameters defining the mid-anneal ramp can be provided via a user interface, for example an API.

Annealing Schedule Manipulations

In some implementations of the presently described systems and methods, the annealing schedule can include a suitable combination of one or more mid-anneal pauses and/or one or more mid-anneal ramps.

Figure 11D:
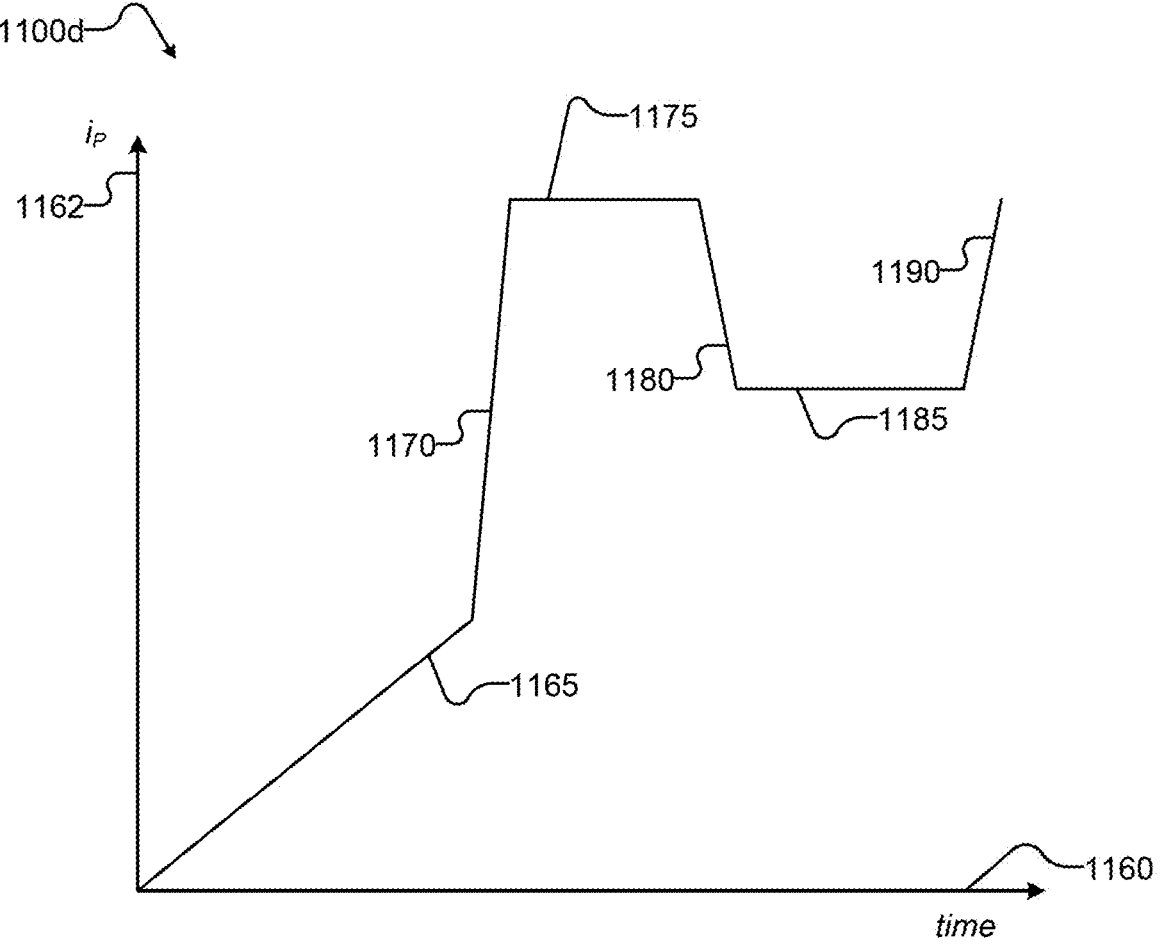
FIG. 11D is a graph illustrating an example annealing scenario with annealing schedule manipulations including a mid-anneal pause and a mid-anneal ramp in the annealing schedule.

FIG. 11D shows a chart 1100d illustrating an example annealing scenario with annealing schedule manipulations including a mid-anneal pause and a mid-anneal ramp in the annealing schedule. The horizontal axis 1160 corresponds to time. The vertical axis 1162 corresponds to persistent current $i_P$.

The annealing schedule begins with a standard anneal 1165, and is followed by a first mid-anneal ramp 1170. The annealing schedule proceeds with a first mid-anneal pause 1175 and then a second mid-anneal ramp 1180—this time in the opposite direction (a sharp decrease in persistent current). Ramp 1180 is followed by a second mid-anneal pause 1185, and a third ramp 1190.

In some implementations, the annealing schedule manipulations can be provided via a user interface, for example an API. The parameters defining the annealing schedule manipulations can be, for example, the start and duration of each segment of the schedule. The start of the first mid-anneal ramp 1170 can be defined by a measure of the progress of the evolution. The timing of the other ramps and pauses can be defined, for example, by durations.

FIGS. 11A-11D each show persistent current $i_P$ on the vertical axis for convenience. As described elsewhere herein, it is possible in at least some circumstances to vary one or more qubits' tunneling rates orthogonally to variations in persistent current. Accordingly, it will be understood that the presently-described mid-anneal pause, mid-anneal ramp, and fast anneal manipulations of annealing schedules may be implemented by any suitable technique (or combination of techniques) for varying tunneling rates.

Generalized Annealing Schedule

FIG. 11D shows a chart 1100d illustrating an example annealing scenario with annealing schedule manipulations including a mid-anneal pause and a mid-anneal ramp in the annealing schedule. While FIG. 11D shows an example annealing schedule, those of skill in the art will appreciate that other annealing schedules can be used to achieve a desired evolution.

An annealing schedule can be expressed using a suitable single-valued function of time. The function can be linear or non-linear. The function can be injective or non-injective. The function can be expressed as a series of segments, each segment having the same or different suitable single-valued functions of time.

Piecewise Linear Annealing Schedule

A piecewise linear annealing schedule is an example of an annealing schedule. The piecewise linear annealing schedule comprises one or more segments, each segment being a linear function of time. FIG. 11D is an example of a piecewise linear annealing schedule. In the example of FIG. 11D, persistent current $i_p$ varies in piecewise linear segments, each segment a linear function of time or linear as a function of progress through the evolution s. For example, the first linear segment is ramp 1165. The schedule has five other linear segments 1170, 1175, 1180, 1185, and 1190, respectively. Those of skill in the art will appreciate that any suitable sequence of linear segments can be combined to produce an annealing schedule.

Annealing Schedule Manipulation Using Programmable Parameters

As described above, a quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

In some implementations, a time-varying envelope function can be placed on the problem Hamiltonian. A suitable delocalization Hamiltonian is given by:

$$H_D \propto -\frac{1}{2}\sum_{i=1}^{N}\Delta_i\sigma_i^x$$

where N represents the number of qubits, $$\sigma_i^x$$

is the Pauli x-matrix for the $i^{th}$ qubit and $\Delta_i$ is the single qubit tunnel splitting induced in the $i^{th}$ qubit. Here, the $$\sigma_i^x$$

terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N}h_i\sigma_i^z + \sum_{j>i}^{N}J_{ij}\sigma_i^z\sigma_j^z\right]$$

where N represents the number of qubits, $$\sigma_i^z$$

is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

In the operation of the quantum processor, interfaces can be used to couple a flux signal into a respective compound Josephson junction of the qubits, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals".

Similarly, interfaces can be used to apply a flux signal into a respective qubit loop of the qubits, thereby realizing the $h_i$ terms in the system Hamiltonian. This coupling provides the diagonal $\sigma^z$ terms in the system Hamiltonian. Furthermore, an interface can be used to couple a flux signal into a coupler, thereby realizing the $J_{ij}$ term(s) in the system Hamiltonian. This coupling provides the diagonal $$\sigma_i^z \sigma_j^z$$

terms in the system Hamiltonian.

In one approach to quantum annealing, the system can manipulate the programmable parameters $h_i$ and $J_{ij}$ to advance or retard the evolution of qubits, logical qubits, chains, and/or domains of qubits. For example, the system can provide delays on the programmable parameters separately or in combination with each other and with the transverse field.

At the end of annealing, when the transverse field goes to zero, the programmable parameters $h_i$ and $J_{ij}$ achieve their final values. In the approach described here, the envelope functions A(t) and B(t) are effectively absorbed into the Hamiltonian and its associated parameters $\Delta_i$, $h_i$ and $J_{ij}$. The system can be flexible with regard to the annealing schedule e.g. $h_i$ and $J_{ij}$ can be fixed, and $\Delta_i$ evolved. Other schemes may produce similar results. In some cases, one approach to manipulation of the annealing schedule may produce superior results to another approach.

In one example implementation, the envelope function A(t) can be fixed for each qubit, the bias values $h_i$ fixed, the couplings $J_{ij}$ set to zero, and the envelope function B(t) varied for every $J_{ij}$ to perform the annealing. The per-qubit values of $A_i$, $B_i$, and $B_{ij}$ can be used to advance or retard the evolution of each qubit $q_i$.

In another example, $A_i$, and $B_i$ can be same for all qubits, and $B_{ij}$ can be used to advance the couplings $J_{ij}$ in the center of the graph and progressively delay the couplings $J_{ij}$ farther away from the center. A related approach is described elsewhere in this application and is referred to as annealing schedule manipulation based on qubits' locations in the graph. More generally, $B_{ij}$ can be used to progressively advance or retard the couplings $J_{ij}$ starting from a selected location in the graph or processor topology.

In another example, both the $B_i$ and $B_{ij}$ terms can be manipulated to achieve a similar effect.

In another example implementation of quantum annealing, the system can advance or retard clusters, domains and/or chains of qubits by advancing or retarding a set of couplings $J_{ij}$ relative to other couplings in the graph.

Figure 11E:
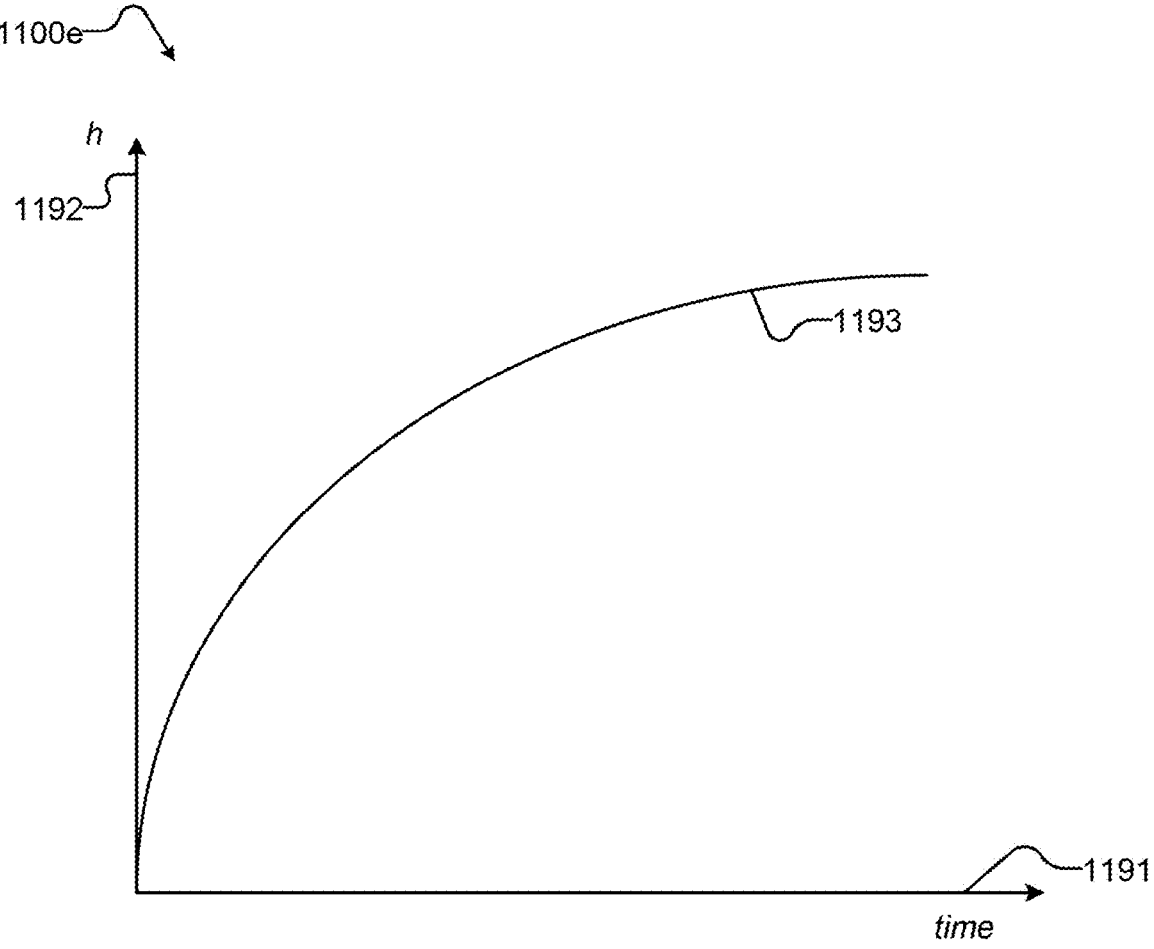
FIG. 11E is a graph illustrating an example annealing scenario in which a local bias h of a qubit is varied during evolution.

FIG. 11E shows a chart 1100*e* illustrating an example annealing scenario in which a local bias h of a qubit is varied during evolution.

The horizontal axis 1191 corresponds to time. The vertical axis 1192 corresponds to qubit bias h. The value of qubit bias h over time is represented by line 1193.

Figure 11F:
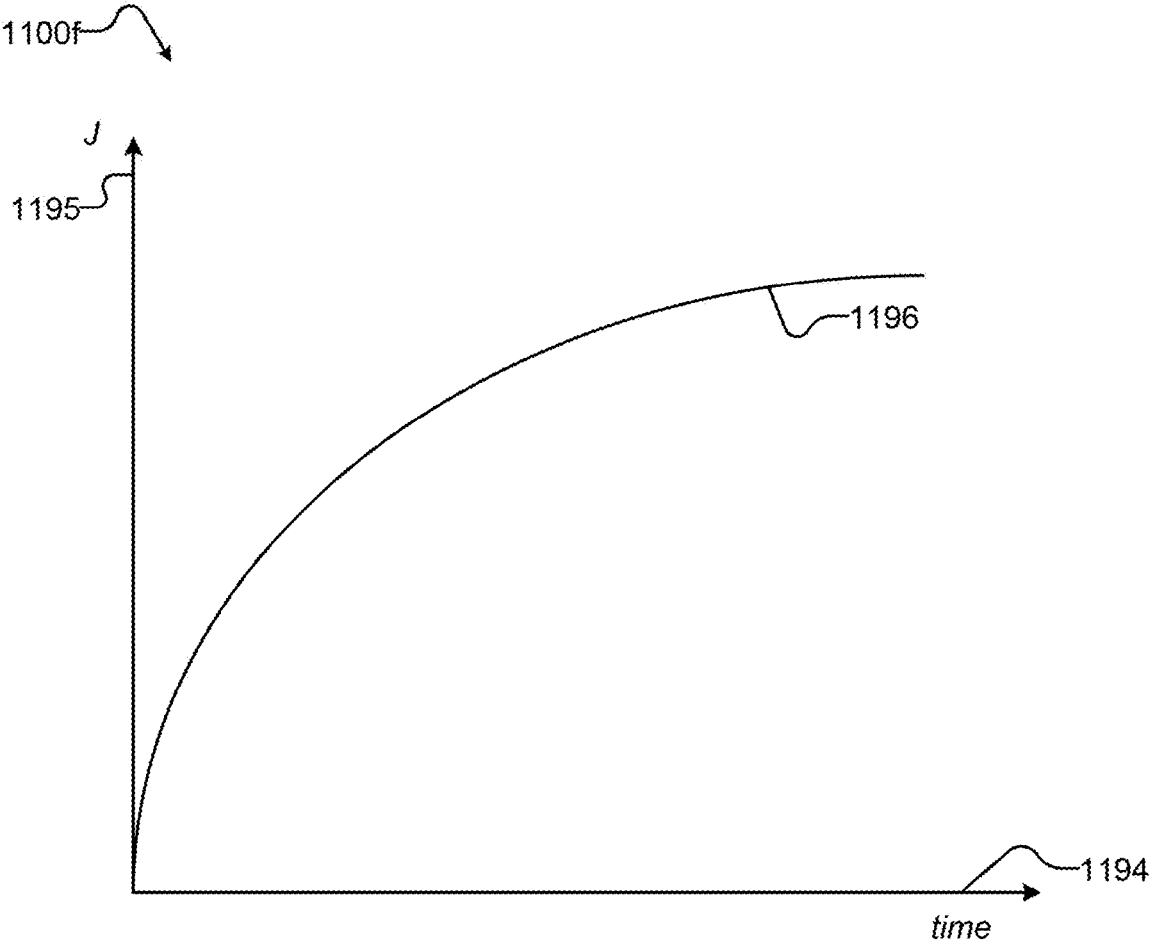
FIG. 11F is a graph illustrating an example annealing scenario in which a coupling strength J of a coupling device between a pair of qubits is varied during evolution.

FIG. 11F shows a chart illustrating an example annealing scenario in which a coupling strength J of a coupling device between a pair of qubits is varied during evolution.

The horizontal axis 1194 corresponds to time. The vertical axis 1195 corresponds to coupling strength J. The value of coupling strength J over time is represented by line 1196.

Annealing Schedule Manipulation of Logical Qubits

In some implementations of the presently described systems and methods, annealing schedules for logical qubits comprising multiple hardware qubits are determined based on the characteristics of the logical qubits. It has been observed elsewhere herein that logical qubits have effective tunneling rates ($\Delta_{eff}$) which depend on a variety of characteristics of the logical qubits, including (in part) the number of constituent qubits, internal and external couplings, and so on. As described elsewhere, one strategy is to manipulate these characteristics to obtain the desired $\Delta_{eff}$ or an approximation thereof.

In some implementations, the $\Delta_{eff}$ of a logical qubit is manipulated based on one or more of the characteristics of the logical qubit, which may or may not include modifying the characteristics themselves. For example, in an implementation having logical qubits with a chain topology (described elsewhere herein), a potentially-convenient heuristic for the logical qubit's dynamics is the length of the chain (i.e., the number of constituent qubits), since a chain which is significantly shorter than another chain is likely to have a smaller $\Delta_{eff}$ than the longer chain. In at least some circumstances, the $\Delta_{eff}$ of the chain may be modified based on a length of the chain (with or without considering any other characteristics of the chain).

As described elsewhere herein, the modification of $\Delta_{eff}$ may be effected via one or more strategies. For example, $\Delta_{eff}$ may be increased by extending the chain (thus retarding it in the anneal) or decreased by shortening the chain (thus advancing it in the anneal). Alternatively, or in addition, the $\Delta_{eff}$ of the chain may be modified by modifying the flux biases and/or coupling strengths of its constituent qubits and/or couplers, by modifying a DAC parameter (such as a CCJJ DAC), or by any other available strategy.

In some implementations, for problems which are embedded using representations comprising multiple chains of varying lengths, the chains' respective $\Delta_{eff}$ values may be synchronized by modifying their annealing schedules as described here. In some implementation, harmonization occurs by synchronizing the chains' $\Delta_{eff}$ at a particular energy level. The inventors have found, through experiment, that this modification strategy can yield impressive results in some circumstances. For instance, a hundredfold increase in the solution rate has been observed in certain instances of factoring a 2n-bit semiprime into distinct n-bit primes (relative to attempting to solve the same problem without modifying an annealing schedule).

Example of Annealing Schedule Manipulation of Logical Qubits

Figure 19:
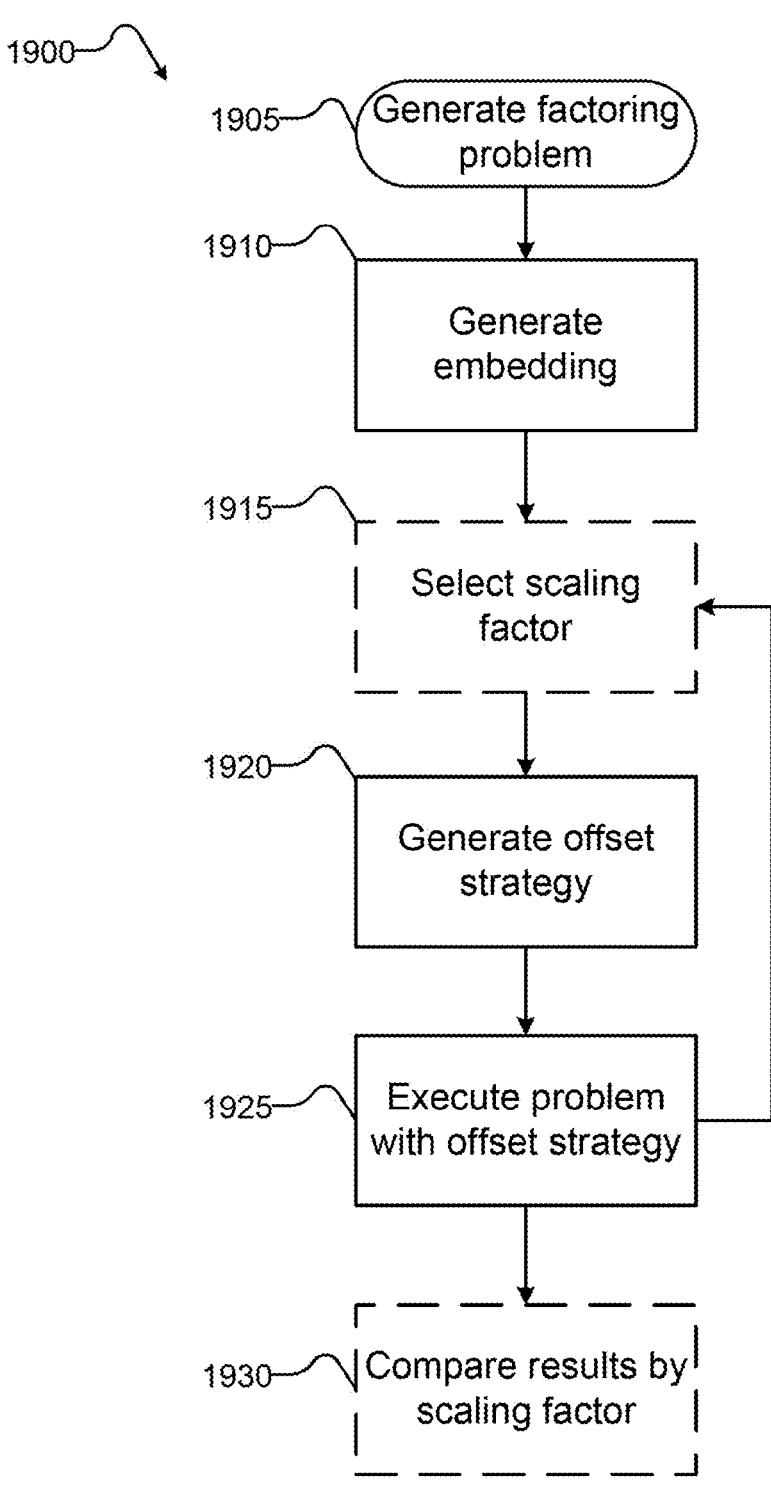
FIG. 19 is a flow chart that illustrates an example method of an annealing schedule manipulation of logical qubits in accordance with the present systems, devices, articles, and methods.

An example of such an experiment is illustrated as method 1900 in FIG. 19. At 1905, a factoring problem is generated (e.g. finding a solution (a, b) for a×b=35). At 1910, an embedding for a multiplication circuit encoding that problem is generated, for example as described in U.S. Pat. No. 8,700,689. Optionally at 1915, one or more scaling factors is selected. For example, a plurality of scaling factors in the range [0,1] may be selected, such as the set of factors {0, 0.1, 0.2, . . . 1}. More or fewer scaling factors may be selected.

At 1920, an annealing schedule offset strategy is generated based on the one or more scaling factors. Any suitable offset may be selected. Chains of different lengths may be assigned different offsets in order to synchronize their dynamics at a particular energy scale. In at least the example experiment, a CCJJ offset of was selected based on:

$$\frac{2^{k-1}}{k-1}$$

for each chain of length k>1. If a scaling factor $\alpha$ was selected, a CCJJ offset of:

$$\alpha \frac{2^{k-1}}{k-1}$$

was used. It will be understood that other formulations may be possible; the inventors found that these formulae were reasonable and fairly efficient-to-calculate approximations of the offset needed to synchronize the dynamics of chains in at least the example problem.

At 1925, the quantum processor executes the problem and generates a sample solution. 1925 may be repeated with the same and/or different scaling factors (e.g., each scaling factor may have multiple corresponding executions). Optionally, method 1900 may return to 1915 to generate additional scaling factors; alternatively (or in addition) method 1900 may generate multiple scaling factors at 1915 and does not necessarily return to 1915 from 1925.

Optionally at 1930, the results generated at 1925 may be compared, for example by applying a performance metric and ranking the scaling factors on that metric. For example, scaling factors with higher success rates and/or shorter time to solution may rank higher than scaling factors with relative lower success rates and/or higher times to solution. One or more of the highest-ranking scaling factors may be stored and recalled at a later time for use on similar problems.

It will be understood that method 1900 may be performed with other annealing scheduling strategies as described herein, and may make use of any available annealing offset technique (such as manipulation of logical qubit characteristics, manipulation of programmable parameters, etc.).

Annealing Schedule Manipulation Based on Qubits' Locations in Graph

In some implementations of the presently described systems and methods, an annealing schedule for a qubit and/or a set of qubits is determined based on a location of the qubit and/or set of qubits relative to one or more other qubits. For example, one or more qubits located on or proximate to an outward edge of a graph of qubits may be advanced or retarded relative to other qubits in the graph. The graph may be, for example, a working graph of hardware qubits, a virtual graph simulating a particular working graph of hardware qubits (e.g., as described in U.S. Provisional Patent Application No. 62/375,785), and/or an embedded graph of logical qubits where each logical qubit corresponds to one or more hardware qubits.

Figure 18:
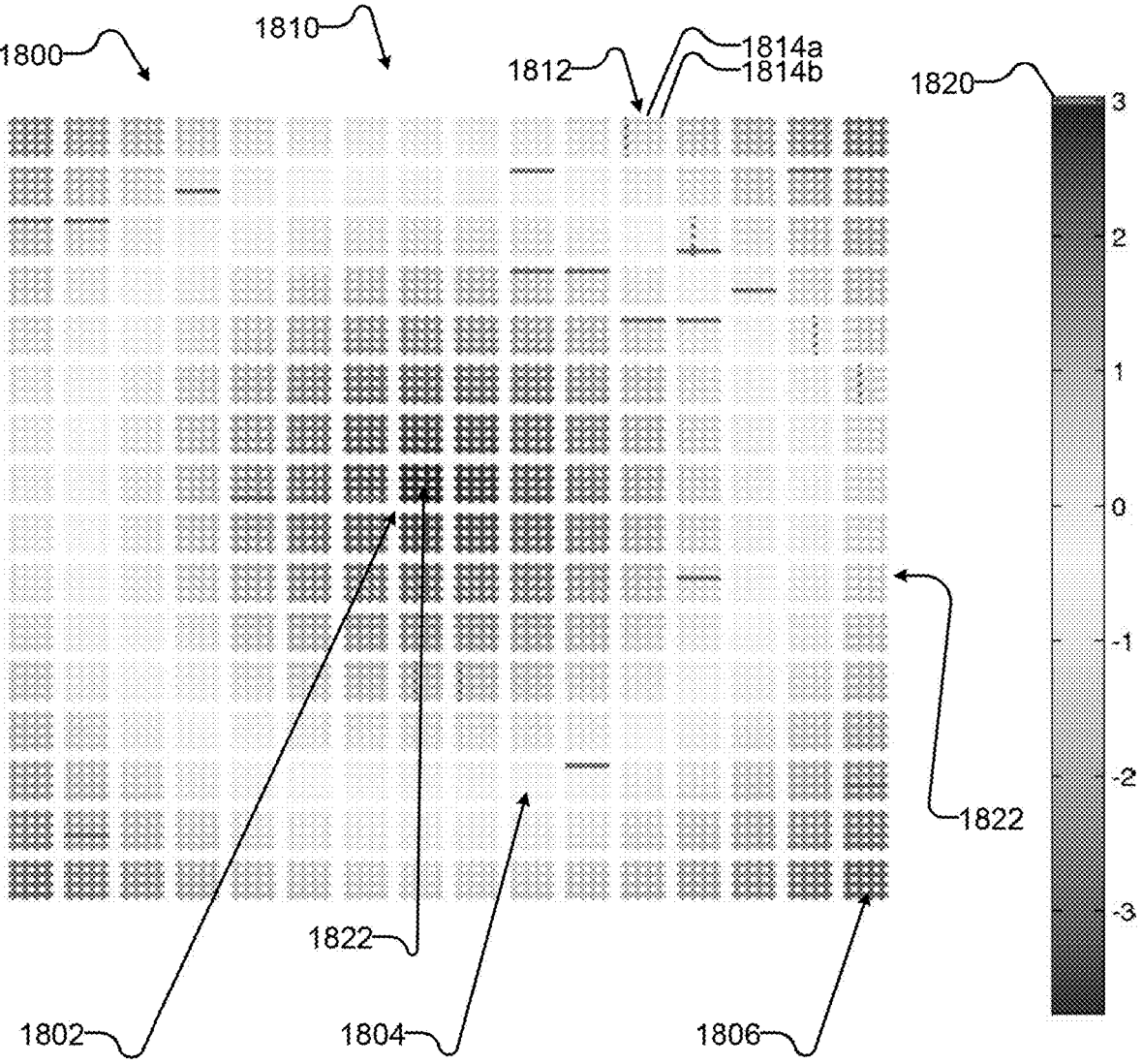
FIG. 18 is a schematic diagram of an example gradient defined on a graph comprising Chimera-structured groups of qubits in accordance with the present systems, devices, articles, and methods.

For example, annealing schedules may be modified according to a gradient defined on the graph. FIG. 18 shows an example gradient 1800 defined on a graph 1810 comprising Chimera-structured groups 1812 of qubits 1814a, 1814b, etc. (collectively and individually "qubits 1814"). Due to the large number of groups 1812 and qubits 1814 of graph 1800, most of their labels are omitted for clarity of illustration. It will be understood that the presently-described systems and methods are not restricted to Chimera-structured graphs, and that graph 1810 is exemplary and non-limiting.

Gradient 1800 associates each qubit 1814 with a value (depicted visually by a shading intensity which corresponds to legend 1820). Qubits 1814 in first region 1802 are advanced in the anneal (e.g., by applying A offsets as described elsewhere herein), qubits 1814 in third region 1806 are retarded in the anneal (e.g., by applying A offsets with opposing signs to the A offsets applied in first region) and qubits 1814 in second region 1804 are not advanced or retarded and/or are advanced or retarded by comparatively small amounts relative to qubits 1814 in first and third regions 1802 and 1806. In some implementations, gradient 1800 only advances (or only retards) qubits 1814, although different qubits 1814 may be advanced (or retarded) by different amounts, and/or some qubits 1814 may not be advanced (or retarded).

The inventors have observed that, in at least some problems executable on at least some quantum processors, qubits 1814 nearer outward edges tend to freeze out earlier than other qubits 1814 spaced relatively away from the edges of the graph. In some implementations, a gradient is defined which corresponds to an annealing schedule modification which causes qubits 1814 nearer the outward edges of graph 1810 to be retarded and qubits 1814 further from the outward edges of graph 1810 to be advanced. Gradient 1800 is a non-limiting example of such gradients, although it will be understood that other gradients with this behavior may be defined (e.g., a gradient where each qubit 1814 has an annealing offset determined by its distance from an outward edge, with greater distances corresponding to earlier annealing times).

Gradient 1800 is an exemplary radial gradient. Each qubit 1814 is associated with an offset value which decreases proportionately with the distance of that qubit 1814 from a point 1822. Other gradients are possible; for example, a gradient may be a linear gradient, where each qubit 1814 is associated with an offset value based on the distance of that qubit 1814 from a line defined across graph 1810 (e.g., based on a distance between qubit 1814 and one side-edge of graph 1810, such as edge 1822). In some implementations, a gradient extends across the entirety of graph 1810; in alternative or additional implementations, a gradient is defined on a portion of graph 1810.

One or more gradients may be defined on graph 1810; where multiple gradients are defined, they may be disjoint and/or they may overlap. Qubits 1814 on which multiple gradients are defined may have annealing schedules defined by a combination of the overlapping gradients' associated values for those qubits 1814. For example, the annealing schedule of a qubit 1814 may be based on a sum, product, or other function of the overlapping gradients' associated values.

Annealing Schedule Manipulation within Logical Qubits

In some implementations of the presently described systems and methods, an annealing schedule for a logical qubit may be manipulated so that qubits composing the logical qubit have the same or different annealing schedule offsets. For example, all qubits within a logical qubit may have the same annealing offset, qubits with external couplings may be assigned different offsets (and/or may be assigned offsets according to different criteria) than qubits with only internal couplings, and/or qubits with different locations in a graph may be assigned different offsets (and/or may be assigned offsets according to different criteria). This annealing schedule manipulation may be in addition to (or an alternative to) other annealing schedule manipulation strategies described elsewhere herein. Logical qubit-level schedules may be referred to as "sub-schedules" to distinguish them from broader (e.g. processor-wide) annealing schedules.

For example, in some implementations where a broader annealing schedule is directional, logical qubits may follow a directional annealing sub-schedule that varies the broader annealing schedule. For instance, given an annealing schedule based on a linear gradient across logical qubits in an embedded graph (e.g., so that qubits anneal earlier relative to other qubits if they lie further along an axis across the embedded graph), a corresponding gradient may be determined within a logical qubit. The logical qubit's constituent qubits (which may be hardware qubits) may anneal earlier relative to other qubits within the same logical qubit based on the gradient. The logical qubit-level gradient may have a different slope than the broader annealing schedule's gradient (e.g., qubits within a logical qubit may anneal relatively more closely together in time than similarly-proximate qubits elsewhere in the graph which are not part of the same logical qubit).

Selective Annealing

In some implementations of the presently described systems and methods, a subset of qubits is annealed while another subset of qubits does not anneal. Subsets of qubits may comprise hardware qubits, logical qubits, and/or any other qubit representation. For example, a subset of qubits may be selected for annealing, an annealing schedule may be assigned to those qubits, the remaining qubits may be clamped or otherwise obstructed from changing their dynamics (e.g., by programming their corresponding CCJJ DAC biases); such obstruction will be referred to herein as a form of "pausing" the remaining qubits. The selected qubits may then be annealed according to their annealing schedule. The remaining qubits may then be un-paused (i.e., permitted to resume annealing).

For example, a subset of qubits may be selected for reverse annealing at a certain point in the evolution. The remaining qubits may be paused and the subset may be reverse annealed (e.g., as described in US Patent Application Publication No. 2015/363708). The selected qubits may then be forward annealed while the remaining qubits remain paused (which may result in a different resulting state than would previously have been the case) and the remaining qubits may be permitted to anneal once the selected qubits have returned to the point in the anneal that they occupied before reverse annealing occurred. Alternatively, or in addition, some or all of the remaining qubits may be permitted to anneal after the reverse anneal completes and before the selected qubits have forward annealed again.

Intentional De-Tuning of Annealing Schedules

Another implementation of the presently disclosed systems and methods for advancing (or retarding) qubits during annealing identifies constraints and back-propagates them, for example across a logic circuit from the circuit outputs towards the circuit inputs. For example, qubits closer to circuit outputs can be frozen out earlier in the evolution. This can be achieved by either starting to decrease the tunneling amplitudes for a subset of qubits earlier than another subset of qubits, or decreasing the tunneling amplitudes at a faster rate. For example, a time-dependent gradient in tunneling amplitude can be established across the logic circuit. The gradient in tunneling amplitude can correspond to an annealing schedule.

A modified annealing schedule can be generated by intentionally de-tuning tunneling amplitudes and problem Hamiltonian energy scales for a selected subset of qubits. In one implementation, as described elsewhere in the present disclosure, de-tuning is achieved by adjusting qubit parameters via a DAC in the quantum processor such as a CCJJ DAC.

Controllably Simulating Noise in Annealing Schedules

Analog processors tend to be susceptible to noise, and substantial efforts are generally made in existing systems to reduce the quantity and effect of such noise. For example, at least some analog processors are operated in extremely low-temperature environments (e.g. at less than 1° K) to reduce thermal noise. Even in such environments, however, noise may enter. For example, communication lines connecting a super-cooled analog processor may also connect to devices in a much warmer (e.g. room-temperature) environment, thereby introducing a potential pathway for noise to affect the analog processor.

However, in at least some circumstances further noise reductions may negatively impact certain performance metrics of an analog processor. For instance, in at least some cases, the inventors have observed that operating an analog processor at even lower-than-usual temperatures has resulted in the sample diversity and/or optimization success rates for certain problems being reduced relative to the same metrics for the same problem executed at a higher temperature (and thus with more noise).

One potential effect of noise is that it may cause small, random (and/or quasi-random) variations in annealing schedules. For instance, in at least some quantum processors, noise on an annealing control line may cause small, brief increases and/or decreases in persistent current, thereby causing some amount of jitter in qubits' annealing schedules.

Figure 22:
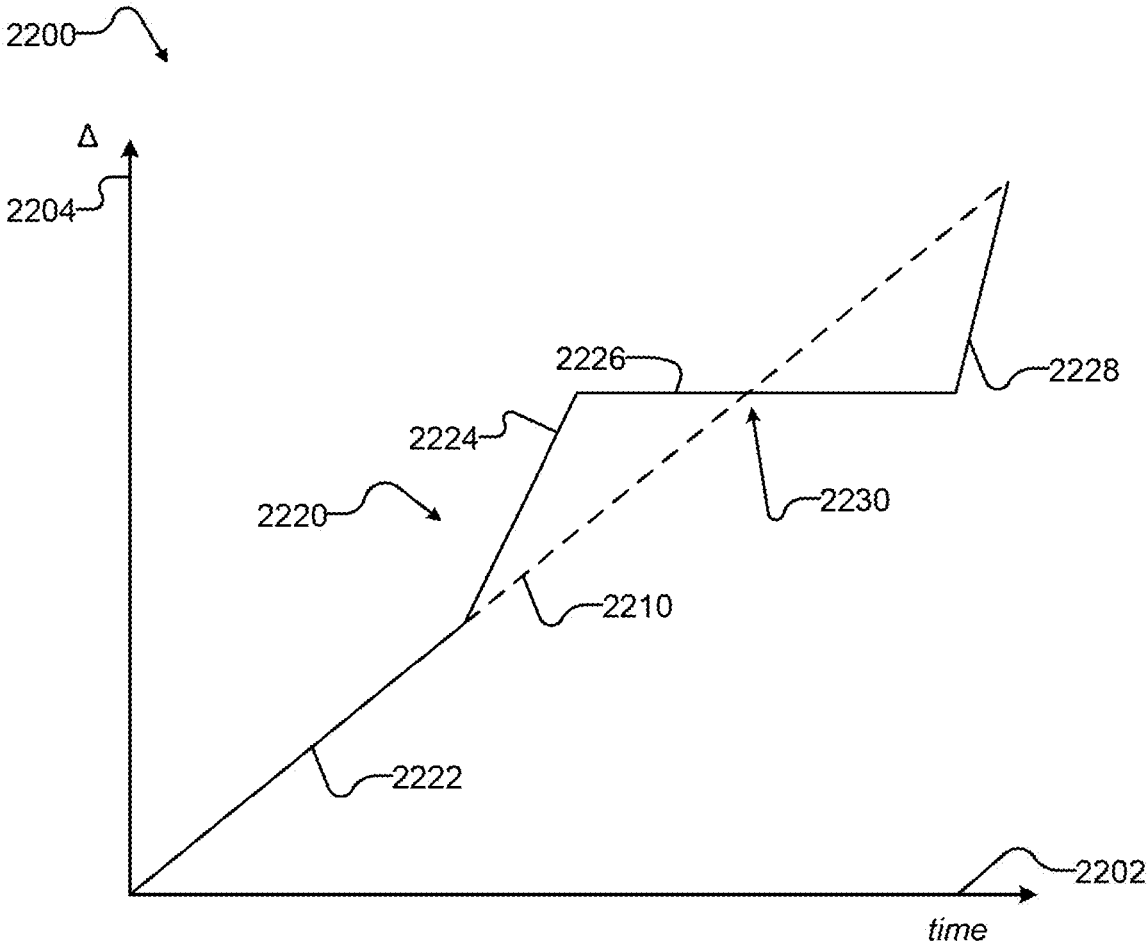
FIG. 22 is a graph illustrating an example annealing scenario in which noise is controllably simulated and added to an input annealing schedule.

In some implementations, noise may be controllably simulated by a digital computer by applying brief ramps and pauses to an annealing schedule for execution in association with a problem by an analog computer. FIG. 22 shows a chart 2200 illustrating an example annealing scenario where noise has been controllably added to the anneal. The horizontal axis 2202 corresponds to time. The vertical axis 2204 corresponds to a tunneling rate $\Delta$. As described elsewhere herein, the tunneling rate may be determined or influenced according to one or more of several techniques, such as varying a persistent current $i_p$.

Line 2210 corresponds to an example input annealing schedule. The input annealing schedule may be, for example, an ideal, noiseless annealing schedule for a qubit in a problem. As another example, the input annealing schedule may already comprise some degree of noise, either intentionally or unintentionally. In the illustrated example, line 2210 is shown as a dashed line which is coincident with portion 2222 of line 2220 (and is thus partially obscured).

Line 2220 corresponds to an example output annealing schedule. The output annealing schedule is generated by the digital computer based on the input annealing schedule and on a controllable noise addition algorithm. For example, the output annealing schedule corresponding to line 2220 may be determined by applying a dithering technique to input annealing schedule 2210.

In some implementations, the output annealing schedule is determined by the digital computer by modifying the input annealing schedule by adding mid-anneal ramps and pauses.

For example, line 2220 comprises a portion 2222 which is coincident with line 2210, thereby illustrating a period of the anneal when the input and output annealing schedules are the same. At portion 2224 of line 2220, a ramp is added, causing line 2220 to deviate from line 2210 (in this case, the deviation corresponds to an advancement in the output annealing schedule relative to the input annealing schedule). At portion 2226 of line 2220, a pause is added, causing line 2220 to reduce its deviation from line 2210.

In the illustrated example of FIG. 22, the pause of portion 2226 is sufficiently long to cause line 2220 to meet line 2210 at intersection point 2230. The pause may end at intersection point 2230, thereby causing line 2220 to coincide with line 2210 again (similar to portion 2222), or the pause may continue, thereby causing line 2220 to deviate again from line 2210 (as shown, for example, in FIG. 22). A subsequent ramp may cause line 2220 to again meet line 2210, e.g., as shown by portion 2228 of line 2220. In some implementations, a pause or ramp may be added which reduces a deviation from the input annealing schedule but ends before the input and output annealing schedules meet.

Other modifications are possible. For example, the output annealing schedule may comprise portions where reverse annealing occurs. As another example, the output annealing schedule may comprise non-piecewise-linear modifications; for example, the output annealing schedule may be based on a product of the input annealing schedule with a low-amplitude sinusoidal curve and/or some other continuous function. As a further example, fast and/or slow anneals may be provided in the place of (or in addition to) ramps and/or pauses, respectively. For instance, the output annealing schedule could anneal slowly during the period corresponding to some or all of portion 2226 (this would be illustrated graphically as portion 2226 having a positive slope less than the slope of line 2210). Lines 2210 and 2220 would therefore meet at a later point in time than intersection point 2230, unless a further modification were added to hasten the meeting of lines 2210 and 2220.

In some implementations, modifications to the input annealing schedule (such as pauses and ramps) are added randomly and/or pseudo-randomly by the digital computer. In some implementations, pauses and ramps (and/or slow and fast anneals) are added as alternating pairs (e.g. first a pause, then a ramp, followed by either a pause-ramp pair or a ramp-pause pair). In some implementations, the duration and amplitude of a modification is determined randomly or quasi-randomly.

In some implementations, modifications are added to the output annealing schedule by the digital computer subject to one or more constraints. For example, one or both of the duration and amplitude of the modification may be constrained so that the modification and/or the deviation of the output annealing schedule from the input annealing schedule do not exceed a threshold. As an example, each 0.1 millisecond period of the anneal may have randomly-added (and/or pseudo-randomly-added) modifications, thereby constraining each modification to 0.1 milliseconds. Optionally, some periods may have no modifications.

As another example, the duration and/or amplitude of one or more modifications may be selected randomly or pseudo-randomly by the digital computer, subject to the constraint that each modification may not cause the output annealing schedule to deviate from the input annealing schedule by more than a threshold. For instance, the amplitude of the output annealing schedule may be constrained from deviating from the input annealing schedule by more than an amount proportional to the amplitude of the input annealing schedule at the same point in time of the input annealing schedule (e.g. within 1%, 5%, etc.). Alternatively, or in addition, the amplitude of the output annealing schedule may be constrained from deviating from the input annealing schedule by more than a constant amount (e.g. by an amount corresponding to 0.1%, 0.5%, 1%, etc. of the maximum persistent current).

Modifications simulating noise may be added on a per-qubit basis and/or on a multi-qubit basis. For example, an initial set of modifications may be determined and applied uniformly to the annealing schedules of all qubits on the analog processor (and/or all qubits in the problem). A further set of modifications may be determined and applied individually for each qubit. Intermediate sets of modifications may be determined and applied for groups of qubits, e.g. by grouping qubits which receive annealing control signals on a shared annealing line together and applying an intermediate set of modifications uniformly to the group.

Mitigating Sampling Bias

The presently-disclosed techniques for manipulating annealing schedules are not limited to optimization problems. For example, they may also be applied to improve the performance of an analog processor (and/or hybrid computer) in the course of sampling operations. As will be familiar to those skilled in the art, analog processors may be used to draw samples from distributions defined by an input problem.

Particular problems may be susceptible to sampling bias, where particular groups of solutions are sampled more frequently than others. For example, problems with highly degenerate ground states and/or first excited states may show strong sampling bias, resulting in "valleys" with high degeneracy being sampled more frequently than others, perhaps even to the extent that samples from high-degeneracy valleys tend to dominate samples from other valleys. A "valley" is a group of one or more solutions (or samples) occupying a low-energy region of the energy landscape defined by the problem's Hamiltonian between which the analog processor (and/or hybrid computer) may transition during the anneal without a change in energy; that is, valleys are low-energy iso-energetic clusters of solutions (or samples).

In some implementations of the presently disclosed systems and methods, sampling bias is mitigated by modifying the problem's annealing schedule, thereby allowing samples of other valleys to be obtained with greater frequency.

Figure 21:
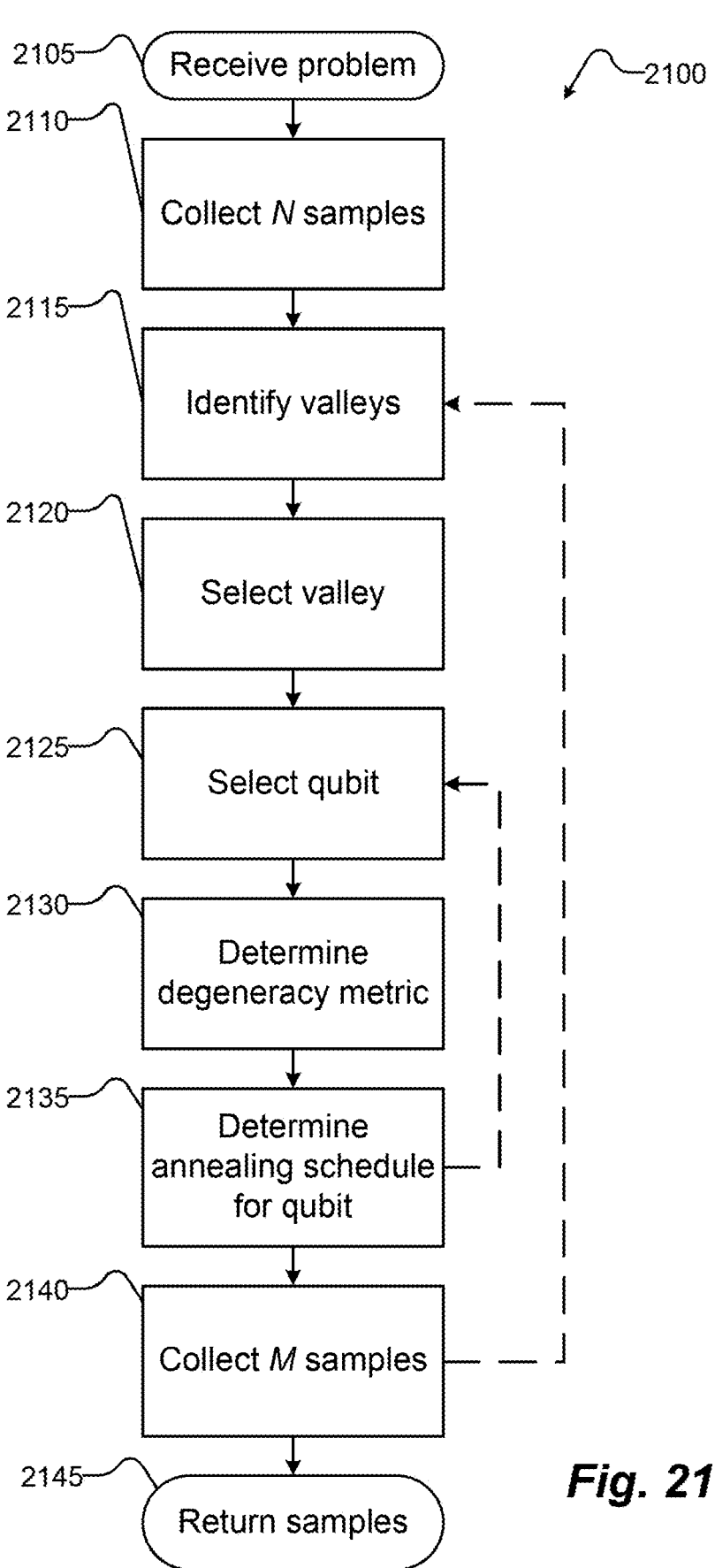
FIG. 21 is a flowchart that illustrates an example method of mitigating sampling bias.

A flowchart illustrating an example method 2100 for mitigating sampling bias in an analog processor is shown FIG. 21. At 2105, a problem is received by a processor (e.g. a digital processor). At 2110 N samples are collected from the analog processor (e.g. as described above with respect to FIG. 1).

At 2115, the N samples are analyzed and one or more valleys are identified. Valleys may be identified by the digital processor, for example, by grouping samples into clusters based on iso-energetic qubit flips. For instance, two samples may occupy the same valley if there is a series of qubit flips that can be applied to one sample to obtain the other sample without any flip causing a change in energy (or without causing more than a threshold change in energy). Each qubit flip may comprise flipping one or more qubits. In some implementations, only samples which are related to each other by no more than a determined (e.g., predetermined) number of iso-energetic qubit flips are grouped together as an identified valley; such implementations may be said to use an iso-energetic Hamming distance as a metric for valley membership.

In some implementations, all valleys are identified by the digital processor at 2115. In some implementations, only a subset of valleys are identified. For instance, valleys having more than a certain number of degenerate states, valleys for which at least a threshold number of samples have been collected, a subset containing the v largest valleys for some integer v, valleys with less than a threshold energy, and/or other valleys may be identified.

At 2120, a valley $v_i$ is selected from the one or more valleys by the digital processor. For example, the highest-probability valley (i.e. the valley from which the largest number of samples have been drawn) may be selected.

At 2125, a qubit $q_i$ is selected from the selected valley by the digital processor. At 2130, a degeneracy metric $\mu_i$ for qubit $q_i$ is determined. The degeneracy metric provides a measure of qubit $q_i$'s contribution to the degeneracy of the corresponding valley. For example, degeneracy metric $\mu_i$ may comprise a normalized floppiness metric as described with respect to act 130 of method 100 (see FIG. 1). For instance, the normalized floppiness metric may be determined according to the formula:

$$\mu_i = n_i / S$$

where $n_i$ is the number of times qubit $q_i$ was floppy in the S samples of valley $v_i$.

Acts 2125 and 2130 may be performed by the digital processor for a plurality of qubits (e.g. all available qubits, all qubits within a region of interest, etc.). thereby generating a plurality of degeneracy metrics corresponding to the plurality of qubits.

At 2135, an annealing schedule is determined by the digital processor for each qubit based on its corresponding degeneracy metric. In some implementations, the annealing schedule comprises an annealing offset $\omega_i$ which is determined for each qubit $q_i$ based on degeneracy metric $\mu_i$. In some implementations, offset $\omega_i$ is proportionate to degeneracy metric $\mu_i$. For example, each qubit $q_i$ may be assigned an offset $\omega_i=\mu_i A$, where A is a constant annealing offset factor (and, in at least some embodiments, is the maximum-magnitude offset which may assigned in one iteration of method 2100). Annealing factor A may represent either advancing or retarding a qubit in the anneal, and thus in at least some implementations may be positive or negative.

As described elsewhere herein, the term "qubit" may refer to a single qubit or a domain of qubits (and qubits may be hardware devices, logical qubits, etc.). Where a qubit $q_i$ corresponds to a domain of qubits, an annealing offset may be applied to each qubit in the domain. For example, each qubit in the domain $q_i$ may receive the same offset $\omega_i$. Alternative or additional approaches to applying annealing schedules to qubits within a domain may be used as described elsewhere herein.

In some implementations, only qubits $q_i$ with corresponding degeneracy metrics $\mu_i$ greater than a threshold T (and/or greater than or equal to threshold T) are assigned a non-zero annealing offset $\omega_i$. In some implementations, $\Delta_i$ is the same for each such qubit $q_i$.

In some implementations, each qubit $q_i$ in valley $v_i$ is advanced in the annealing schedule to the beginning of the anneal or retarded to the end of the anneal. For example, the determined annealing schedules may cause qubits $q_i$ to finish annealing before at least some other qubits have begun their anneals and/or to begin annealing after at least some other qubits have ended their respective anneals. For example, qubits $q_i$ may be advanced (retarded) before (after) all other qubits. As another example, qubits $q_i$ may be advanced (retarded) before (after) only those other qubits which have not already been advanced or retarded by method 2100. In some implementations, one or more other qubits not in selected valley $v_i$ are retarded in order to allow the qubits of selected valley $v_i$ to complete their anneal before the other qubits start theirs.

Optionally, act 2135 may comprise determining a plurality of annealing schedules for each qubit $q_i$ by the digital processor. For example, act 2135 may generate one or more annealing schedules which advance qubit $q_i$ and one or more annealing schedules which retard qubit $q_i$. Additionally, or alternatively, act 2135 may comprise generating a plurality of annealing schedules by first determining one or more annealing schedules and subsequently applying a set of scaling factors to each of the one or more annealing schedules. For instance, an annealing schedule may be determined as described above and then determining the product of the annealing schedule with each scaling factor $\{\alpha_1, \alpha_2, \ldots, \alpha_n\}$ (e.g. $\{0.1, 0.2, \ldots, 1\}$). For example, act 2135 may comprise generating an annealing offset $\omega_i$ for qubit $q_i$ and further generating a plurality of scaled annealing offsets $\{\alpha_1\omega_i, \alpha_2\omega_i, \ldots, \alpha_n\omega_i\}$ for qubit $q_i$.

Act 2135 may comprise selecting one of the determined annealing schedules from the plurality by the digital processor based on one or more selection criteria, such as an objective function and/or one or more constraints. For instance, an annealing schedule may be selected based on avoiding a contradiction, minimizing floppiness, and/or some other criteria.

At 2140, an additional M samples are collected by executing the problem by the analog processor with the determined annealing schedules of act 2135. Optionally, method 2100 may iterate by returning to act 2115 and performing acts 2115-2135 based on the M samples, thereby refining the determined annealing schedules. In such implementations, act 2120 may comprise selecting a valley $v_i$ which has not been selected in a previous iteration of method 2100. In some implementations, the same valley $v_i$ selected in a previous iteration may be used. Iteration may terminate upon satisfaction of a termination criterion; for example, method 2100 may iterate until results converge, until a threshold number of iterations have been completed, until all valleys have been iterated over, until no eligible valleys remain (where "eligible valley" refers to a valley which may be selected at act 2120), and/or until some other criterion is met.

At 2145 one or more samples generated by method 2100 are returned by at least one of the digital processor and the analog processor. In some implementations, the M samples collected in the last iteration of method 2100 are returned. In some implementations, samples collected in a plurality of iterations are returned; for example, all samples collected by method 2100 may be returned. In some implementations, a set of annealing schedules determined at one iteration of act 2135 is selected based on an optimality metric (e.g. an objective function for an optimization algorithm) and the M samples generated according to those annealing schedules are returned.

Detecting Quantum Fluctuations Using a Probe Qubit

To determine an improved, or optimized, annealing schedule, it can be beneficial to measure quantum fluctuations at different points during annealing. The quantum fluctuations tend to be high, or maximum, near quantum phase transitions, and it can be beneficial to slow down annealing at points where the quantum fluctuations are high.

The presently disclosed systems and methods include an approach in which the quantum fluctuations are measured directly via the hardware, and the results used to improve, or optimize, the annealing schedule. In one implementation, determining an improved, or optimized, annealing schedule is based on Macroscopic Resonant Tunneling (MRT) noise measurements of quantum fluctuations.

In one implementation, one or more computational problems of interest are encoded in a first subset of the qubits available in the quantum processor. The qubits in the first subset of qubits are known as the computation qubits. A second subset of qubits (disjoint to the first subset of qubits) comprises probe qubits, operable to make MRT noise measurements of quantum fluctuations during annealing. The probe qubits can be weakly coupled to the computation qubits, and a signal from the computation qubits detected by the probe qubits can be noise-like.

The MRT peak width measurable by each of the probe qubits can depend on the integral of the noise spectrum, and can vary according to quantum fluctuations arising from the computation qubits. As mentioned above, quantum fluctuations can increase near a phase transition, or near a many-body localization point. An increase in quantum fluctuations of computation qubits coupled to a probe qubit can widen the MRT peak measurable by the probe qubit.

The annealing schedule can be adjusted based, at least in part, on the width of the MRT peak.

Figure 12:
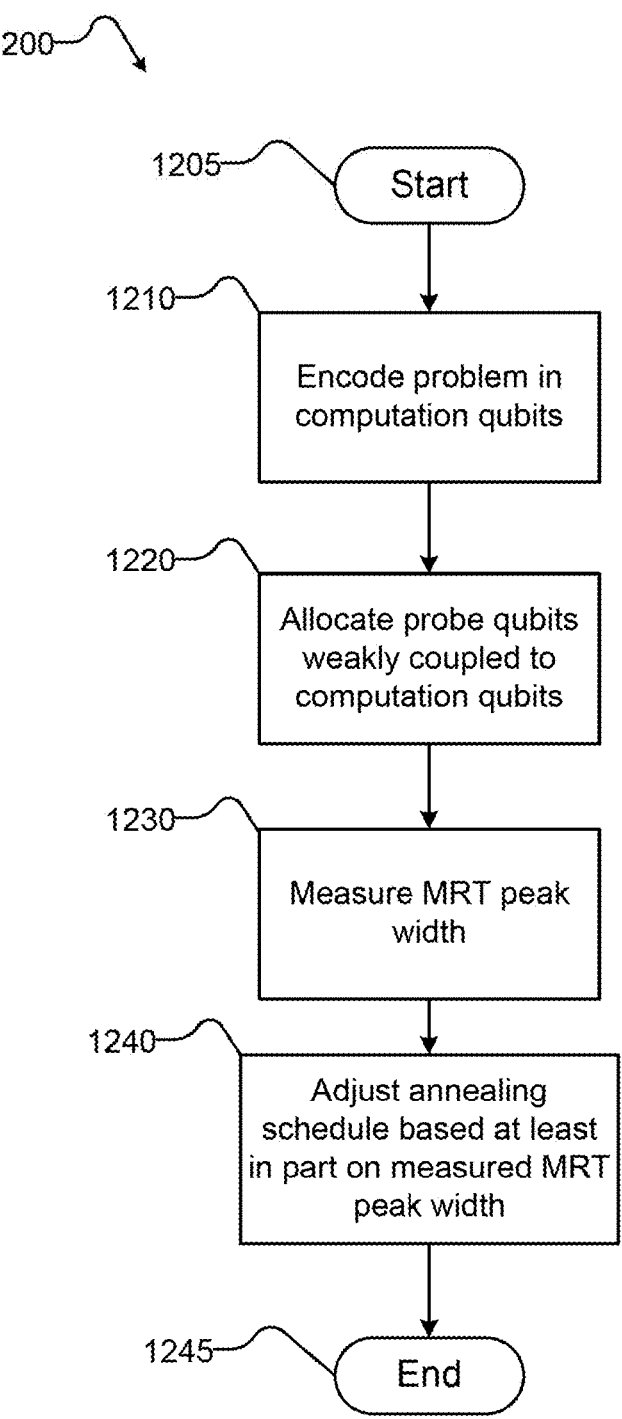
FIG. 12 is a flow chart that illustrates an example method of operation of a hybrid computer for adjusting a quantum annealing schedule.

FIG. 12 is a flow chart that illustrates an example method 1200 of operation of a hybrid computer for adjusting a quantum annealing schedule. Method 1200 illustrated by FIG. 12 comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIG. 12, the acts are assumed to be performed by a hybrid computer comprising a quantum processor. Method 1200 describes an example embodiment, and those of skill in the art will appreciate that alternative embodiments may omit certain acts and/or include additional acts.

At 1205, method 1200 starts. At 1210, the hybrid computer encodes a computational problem in a first subset of qubits in a quantum processor. In one implementation, the qubits are superconducting flux qubits. At 1220, the hybrid computer allocates a second subset of qubits as probe qubits. The probe qubits can be weakly coupled to the first subset of qubits. At 1230, the hybrid computer measures the MRT peak width. At 1240, the hybrid computer adjusts an annealing schedule based at least in part on one or more measurements of MRT peak width. Method 1200 ends at 1245, for example until invoked again.

Selecting Annealing Schedules Using an Equilibrium Enemy Statistic

An annealer (such as a physical quantum annealer) can proceed according to an annealing schedule through a sequence of models between a prepared model and a target model. The prepared model can be for example a uniform superposition of states or a uniform distribution over classical states. The target model can be for example a distribution over the minima of an energy function, or a Boltzmann distribution at a low system temperature. Physical, or Markov Chain Monte Carlo (MCMC), dynamics can modify the state during annealing.

The aim of annealing is generally to sample from a final distribution as close as possible to the distribution of the target model. If the target distribution is a Boltzmann distribution described by an energy function E(x), or by an energy operator (classical or quantum), it can be beneficial to select an annealing schedule that can improve, or maximize, the closeness of the final distribution to the target distribution.

While an annealing schedule selected this way is generally specific to a particular problem, there can be many large-scale problems that share statistical features so that a single schedule can, in practice, be good enough for more than one problem. It can be beneficial to determine an improved, or optimal, schedule for a class of problems of interest. Alternatively, a set of schedules can be presented to an expert user from which the user can select based on an evaluation. The approach can also be adapted to choose the models appropriate for multi-canonical MCMC procedures, such as a preferred, or optimized, discrete set of intermediate models for parallel tempering.

A thermal annealer can be programmed with a classical Hamiltonian H(x) and a sequence of inverse temperatures $\beta$. The function $\Gamma(t)$ can be used to describe the time-dependence of $\beta$, where $\Gamma(0)=\beta_{min}$ is an initial state, and $\Gamma(1)=1$ is a target state.

A quantum annealer can be programmed with a Hamiltonian operator $\hat{H}$, and a curve in the transverse field ($\Delta$) and energy scale (E). With an appropriate choice of units, the inverse temperature $\beta=1$. In this case, the function $\Gamma(t)$ is a vector describing the time-dependent state (E, log $\Delta$), with $\Gamma(0)$ the prepared state parameterization, and $\Gamma(1)$ the target state. The function $\Gamma(t)$ can be referred to as a schedule.

A classical Hamiltonian can be defined for either the classical case, the semi-classical case, or the quantum case, as follows:

$$H(x) = \Gamma^T \phi(x)$$

$\phi(x)$ is a vector when the schedule has more than one component. In the quantum case, the classical Hamiltonian can be constructed by the Trotter slice trick. In the quantum (or semi-classical) case, the first component $\phi_1(x)$ is a classical energy statistic, and is conjugate to the energy scale (E) and models a variable that is diagonal in the operator formulation. The second component $\phi_2(x)$ is a quantum energy function since it is conjugate to log $\Delta$ and is absent for a diagonalized operator.

The equilibrated energy distribution along a path in the trajectory can be evaluated. The distribution can be approximated by a Gaussian, and modeled by a mean and a covariance $\Sigma$. The quality of a schedule can be determined by the integral of the energy fluctuations along the trajectory, multiplied by the rate at which the annealer proceeds along the trajectory. One approach is to maximize the following objective function:

$$f(\Gamma) = - \int_{t=0}^{1} \frac{d\Gamma^T(t)}{dt} \sum \frac{d\Gamma(t)}{dt}$$

subject to boundary conditions.

In the case where $\Gamma(t)$ is a scalar, or a function of one parameter, (e.g. in the classical case presented), there can be a straightforward solution to the above equation, for example using:

$$\frac{d\Gamma(t)}{dt} \propto \sqrt{\Sigma}^{-1}$$

In the case where $\Gamma(t)$ is a vector, or a function of more than one parameter, (e.g. in the quantum case presented), one approach is to perform a local search method to find $\Gamma$. Another approach attempts to optimize a weighted combination of functions meeting the boundary conditions.

The Gaussian approximation can be suitable for a variety of distributions, since distributional errors can be accumulated over many steps or iterations, and the central limit theorem applies to the accumulation of the errors.

If the target model has zero transverse field, or large energy scale, then the Gaussian approximation may no longer hold. It can be possible to optimize over at least part of the schedule. Once the energy variance becomes sufficiently close to zero, the schedule can be completed by quenching (i.e., by proceeding very quickly), and the procedure described above is not required at this stage.

Energy statistics used in model optimization can be collected by annealed importance sampling, or parallel tempering, for example.

Energy variance can be used to determine schedules for thermal annealing (see e.g., Kone and Kofke, 2005). The presently disclosed systems and methods address the challenges of determining schedules for quantum annealing.

The energy statistics can be estimated for a physical quantum annealer. In one implementation, the quantum hardware can be modeled as stoquastic (i.e., a function of the transverse field, energy scale, and physical temperature), in which case the equilibrium properties for the hardware can be measured using a quantum Monte-Carlo approach.

Hardware dynamics can affect the degree of success. The presently disclosed systems and methods are likely to produce beneficial outcomes, using schedules optimized as described above, for a number of problem classes. The degree of success can be measured, for example, by generating two different schedules, predicting the quality of samples for a number of problems, and determining if there is a positive correlation with the quality of the output samples. Quality of the output samples can be measured, for example, by using KL divergence, ground state frequency, or another suitable metric.

Benefits of the presently disclosed systems and methods may include some, or all, of the following:

- selection of an annealing schedule for a suitable Hamiltonian that can be implemented without reliance on dynamical insight;
- selection of an annealing schedule based on estimated equilibrium energy statistics; and
- selection of an annealing schedule for a physical quantum annealer based on input from quantum simulation.

Figure 13:
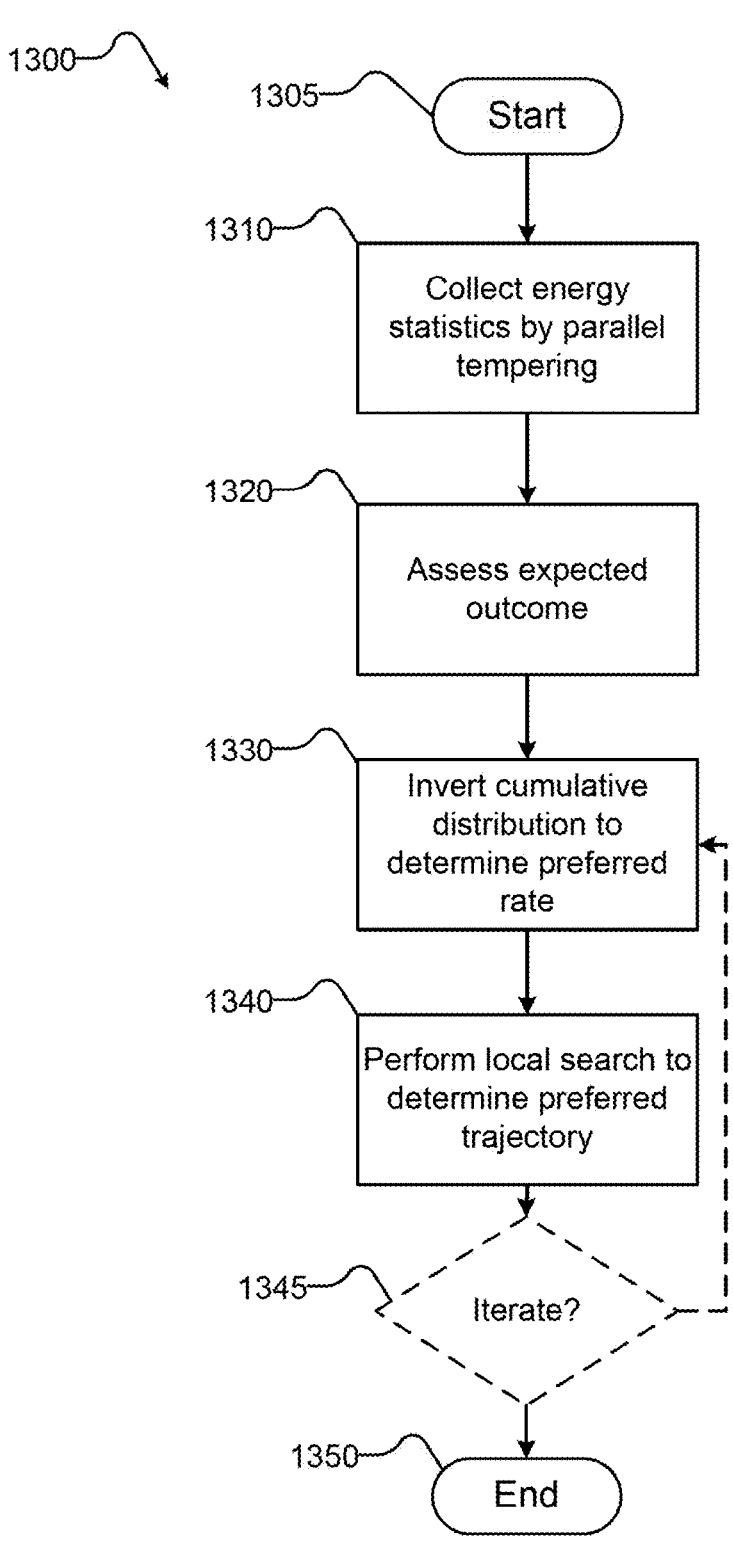
FIG. 13 is a flowchart that illustrates an example method for adjusting an annealing schedule based on an equilibrium energy statistic.

FIG. 13 is a flowchart that illustrates an example method 1300 for adjusting an annealing schedule based on an equilibrium energy statistic. At 1305, method 1300 starts. At 1310, the hybrid computer collects energy statistics by parallel tempering, with respect to a classical Hamiltonian, a Hamiltonian operator, or a classical approximation to a Hamiltonian operator, for a problem. The problem can be a specific problem, or a problem chosen to be representative of a class of problems.

At 1320, the hybrid computer evaluates the equation for fixed F to determine the expected quality of the outcome for the selected problem or class of problems. At 1330, the hybrid computer determines a preferred, or optimized, rate (given a fixed trajectory in F) by inverting a cumulative distribution function. At 1340, the hybrid computer determines a preferred, or optimized, trajectory by performing a local search. As described above, the local search at 1340 can be replaced by a method that attempts to optimize a weighted combination of functions meeting the boundary conditions.

At 1345, the hybrid computer determines whether to iterate acts 1330 and 1340. Upon determining, at 1345, to iterate, method 1300 proceeds to 1330. Upon determining, at 1345, not to iterate, method 1300 proceeds to 1350 where method ends, for example until invoked again. Iteration is optional, as indicated by the dashed line in FIG. 13.

Selecting Annealing Schedules Based on an Objective Function

Figure 20:
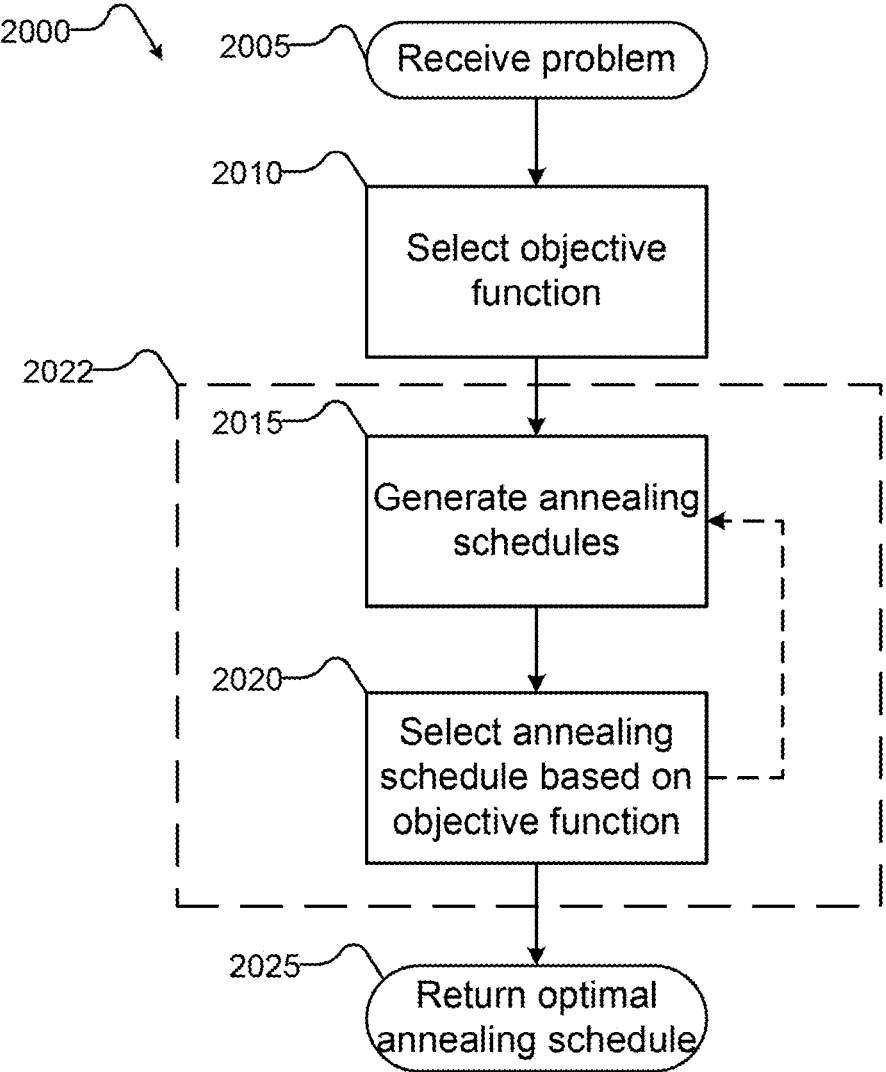
FIG. 20 is a flowchart that illustrates an example method of selecting an annealing schedule for a problem based on an objective function.

In some implementations, an annealing schedule for a problem executable by an analog processor is selected by a digital processor based on an objective function. An example of such a selection method 2000 is shown as a flowchart in FIG. 20. At 2005, a problem is received by the digital processor for which an annealing schedule is to be generated.

At 2010, an objective function is selected by the digital processor. The objective function may be determined (e.g., pre-determined which, in the present disclosure, is considered a type of selection), selected by a user, selected in response to a characteristic of the problem, selected based on another act in the method (e.g., the technique applied at 2015 and/or 2020), and/or may be otherwise selected. The objective function measures, at least in part, one or more characteristics of an annealing schedule, and may provide different annealing schedules with different measures based on those characteristics (although different annealing schedules do not necessarily receive the same measure in every instance).

For example, the objective function may provide a measure of the degree to which an annealing schedule improves, degrades, or otherwise changes the performance of the problem when executed. For example, the objective function may provide a measure of sample quality (where the problem relates to sampling), computation success rates (e.g., where the problem is associated with constraints which may, due to the analog nature of the computation, be violated), computational efficiency (e.g., a time-to-solution metric), and/or some other measure relating to a performance of the problem when executed according to a candidate annealing schedule.

At 2015, one or more annealing schedules are generated by the digital processor. For example, a set of candidate annealing schedules may be generated by a user or a remote computing system and received by the digital processor, and/or a set of candidate annealing schedules may be generated according to a series of computations performed by the digital processor. In some implementations, the annealing schedules are generated by the computing system by performing an optimization algorithm based on the objective function. Example implementations of method 2000 which use such optimization algorithms are described in greater detail below.

At 2020, an annealing schedule is selected by the digital processor based on the objective function. For example, at 2020, an annealing schedule may be selected from a set of candidate annealing schedules by determining which of the annealing schedules in the group provides an optimal result (in the present disclosure, "optimal" is used in the sense of "optimal among the choices considered", and not necessarily the singularly most ideal annealing schedule possible).

For instance, if the objective function provides a measure of time-to-solution, then the annealing schedule which minimizes the objective function may be selected. In some implementations, the annealing schedule which maximizes the objective function may be selected. In some implementations, act 2020 may select an annealing schedule which is then used in 2015 to generate further annealing schedules, which may result in a different annealing schedule being subsequently selected.

In at least some implementations, generating and selecting annealing schedules may be performed by the digital processor via a single act or operation, as interleaved or overlapping acts or operations, sequentially, and/or otherwise. For example, method 2000 may comprise performing an optimization algorithm which involves selectively generating and evaluating annealing schedules iteratively so as to generate an optimized annealing schedule. Thus, acts 2015 and 2020 are not necessarily clearly disentangled in some implementations. For convenience, acts 2015 and 2020 may be referred to together as act 2022, whether or not acts 2015 and 2020 may be considered separately in a particular implementation.

Although an annealing schedule may be selected for the optimality of its measure relative to other candidate annealing schedules, it need not necessarily provide a computed result which is superior to each other candidate annealing schedule (e.g., where the objective function provides a heuristic measure which is not perfectly correlated with the quality of the computed result). For example, an objective function which is relatively easy to compute and which provides relatively consistent improvements to the computed result may be preferred in some circumstances over an objective function which is relatively costly to compute and provides only a minor (and/or inconsistent) further improvement.

At 2025, an optimal annealing schedule (selected at 2020) is returned. The optimal annealing schedule may then be used by the analog processor in the course of computing the problem received at 2005 and/or related problems.

The inventors have identified, through experiment and theory, certain combinations of optimization algorithms and objective functions which provide, in at least some circumstances and for at least some problems, annealing schedules which tend to yield an improvement to the computation of their corresponding problems. Examples of these include optimization to avoid phase transitions (e.g., via parallel tempering) and Bayesian optimization, implementations of which are described in greater detail below.

In some implementations, the objective function selected at 2010 measures the ability of an annealing schedule to reduce floppiness and/or avoid phase transitions during annealing. The objective function may measure the ability to avoid phase transitions directly (e.g., by executing the problem with the annealing schedule a number of times and determining the frequency of phase transitions) and/or indirectly (e.g., by measuring a characteristic of the annealing schedule which is a proxy its ability to avoid phase transitions during annealing).

For example, the objective function may describe a number of models (also referred to as replicas) and/or chains linking models generated by a parallel tempering algorithm (e.g., a quantum parallel tempering algorithm) at 2022. Parallel tempering may be performed on the problem (as modified by the annealing schedule being described) by the digital processor, thereby generating a number of models which are linked by chains.

Parallel tempering algorithms are sometimes described as placing models along a path existing in a two-dimensional space where the dimensions are energy scale and temperature. Annealing schedules which tend to reduce floppiness and/or avoid phase transitions will tend, in at least some circumstances, to require fewer models towards the end of the path in the higher-energy region of that space to obtain a particular efficiency between adjacently-placed models. Such annealing schedules may thus result in the parallel tempering algorithm generating fewer models overall. Thus, in at least some circumstances, an annealing schedule which minimizes an objective function which describes a number of models (and/or chains linking models) generated by a parallel tempering algorithm will tend to reduce floppiness and/or avoid phase transitions during annealing.

An objective function based on a placement of models in a parallel tempering algorithm may be computed relatively efficiently by performing a limited number of iterations (or "sweeps") of the parallel tempering algorithm. Although it will be understood that parallel tempering algorithms may be used to solve the problem received at 2005 directly, this may take many iterations—often hundreds of thousands or millions of iterations. However, finding an efficient placement of models typically requires far fewer iterations—in at least some cases, on the order of thousands or tens of thousands of iterations. Thus, a modified (partial) parallel tempering algorithm may be used which terminates after a number of iterations which is less than would be performed to solve the problem.

In some implementations, act 2022 comprises Bayesian optimization. In some such implementations, the objective function selected at 2010 provides a measure of the ground state distribution of the problem (as modified by the annealing schedule being measured) when performed by the digital processor. Such a measure may correlate with the uniformity of the distribution and/or the characteristics of outliers in the distribution. For example, the objective function may provide a measure of the entropy of the ground state distribution, the distance of the ground state distribution from a uniform distribution, the Gini coefficient of the ground state distribution, a width of the ground state distribution (e.g., a ratio of maximum to minimum probability), and/or some other measure of the ground state distribution. In at least some embodiments, the Bayesian optimization algorithm aims to maximize an entropy-based objective function and minimize the other above-described objective functions.

Any suitable acquisition function and surrogate model may be used. In some implementations, a Bayesian optimization algorithm is performed using an expected improvement acquisition function and Gaussian processes for a surrogate model. Alternative (or additional) acquisition functions include a probability of improvement and an upper confidence bound. Alternative (or additional) surrogate models include linear models, regression trees and random forests, and neural networks. Once suitable objective functions, acquisition functions, and surrogate models have been selected, Bayesian optimization may be performed to generate and select an optimal annealing schedule.

Ancilla Qubit-Delta Tuning

Advancing or retarding floppy qubits or floppy domains of qubits during quantum annealing can mitigate effects of degeneracy and improve hardware performance. Mitigation can be achieved by using the local CCJJ DAC bias. In quantum hardware where advancing or retarding floppy qubits reduces tunneling rate $\Delta_q$, the persistent current can be desynchronized, leading to errors in qubit bias and coupling terms, h and J respectively. While the errors can be corrected at one time during the quantum annealing process, advancing or retarding floppy qubits can produce a time-dependent error on h and J in devices being mitigated. Consequently, the final Hamiltonian can be distorted by the mitigation process.

The presently disclosed systems and methods include another approach to mitigation which uses ancilla qubits instead of the local CCJJ DAC bias. In this approach, a qubit in a quantum processor can have an associated ancilla qubit to which it can be tunable coupled with strength J. In one implementation, the ancilla qubit is a dedicated ancilla device attached to a processor qubit. In another implementation, the ancilla qubit is a processor qubit reserved for use as an ancilla qubit, rather than being used as a computation qubit.

The floppy qubits or floppy domains can be identified using a small number of samples via the initial Hamiltonian. The ancilla qubits can be coupled to the floppy qubits or domains with a coupling strength J that is designed to modify the dynamics of the floppy qubit or domain. In some cases, the coupling strength J is designed to slow the dynamics of the floppy qubit or domain.

Coupling a floppy qubit to an ancilla qubit can modify the tunneling amplitude of the floppy qubit, as follows:

$$\Delta_{floppy} \approx \frac{\Delta_q \Delta_{ancilla}}{2J}$$

where $\Delta_q$ is the initial tunneling amplitude, $\Delta_{ancilla}$ is the ancilla tunneling amplitude, J is the coupling strength, and $\Delta_{floppy}$ is the effective tunneling amplitude of the floppy qubit when coupled to the ancilla qubit.

In one implementation, the ancilla device is on a separate annealing line to the floppy qubit. In another implementation, the CCJJ DAC in the quantum processor can be used to further modify the dynamics of the ancilla device by reducing $\Delta_{ancilla}$. Orthogonal control of $\Delta_{floppy}$ and $|I_p|$ can be achieved this way, eliminating, or at least reducing, the time-dependent errors in h and J.

Figure 14:
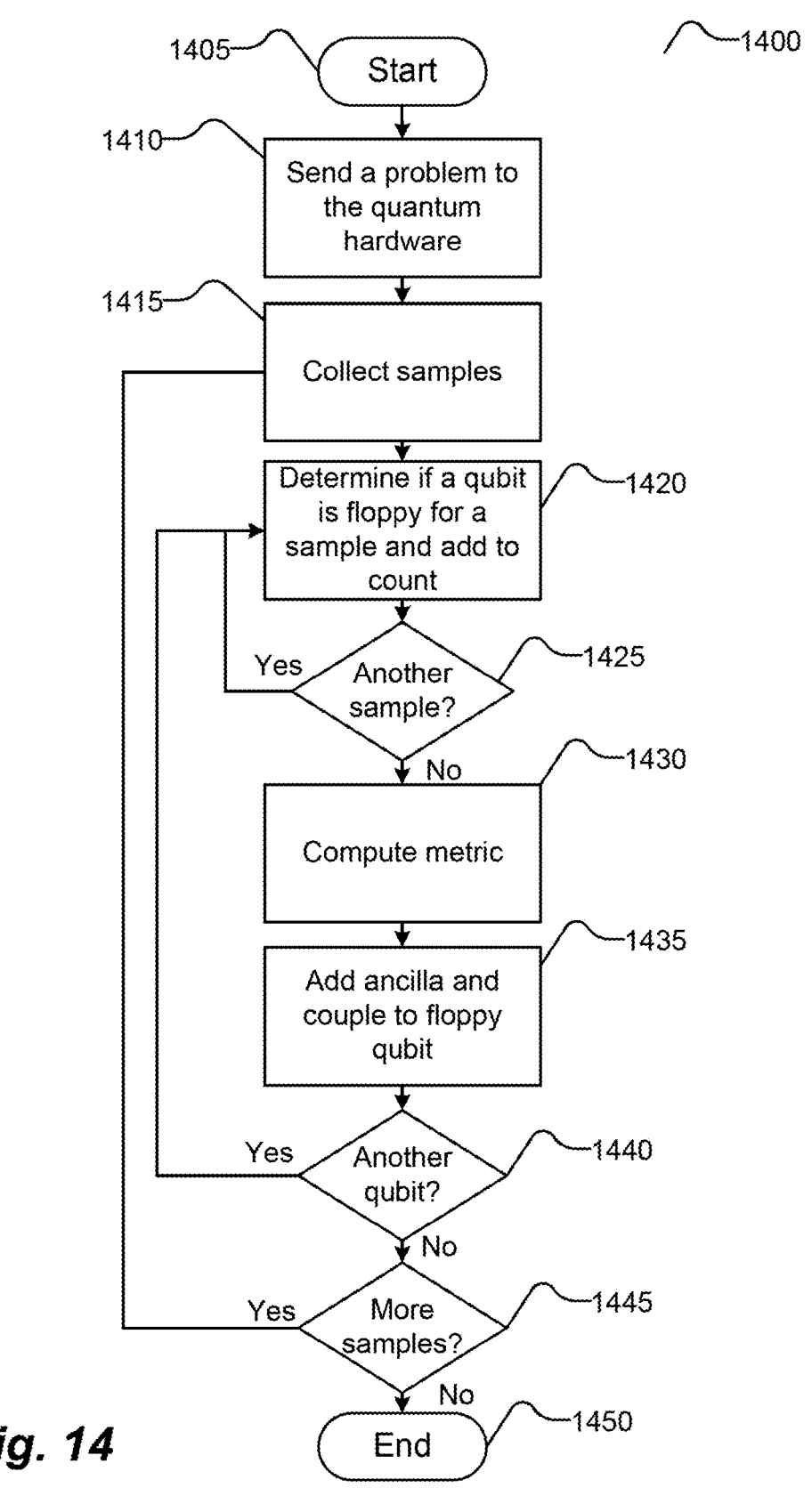
FIG. 14 is a flow chart that illustrates an example method for mitigating the effects of degeneracy using ancilla qubits.

FIG. 14 is a flow chart that illustrates an example method 1400 for mitigating the effects of degeneracy using ancilla qubits. Method 1400 illustrated by FIG. 14 comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIG. 14, the acts are assumed to be performed by a hybrid computer comprising a quantum processor. Method 1400 describes an example embodiment, and those of skill in the art will appreciate that alternative embodiments may omit certain acts and/or include additional acts.

Method 1400 starts at 1405. At 1410, the hybrid computer sends a computational problem to the quantum hardware. At 1415, the hybrid computer collects a set of samples from the quantum hardware. At 1420, the hybrid computer determines whether a qubit (or domain of qubits) is floppy in a sample by flipping the qubit state and determining whether it changes the energy of the sample.

At 1425, the hybrid computer determines whether there is another sample. Upon the hybrid computer determining, at 1425, there is another sample, method 1400 returns to 1420. Upon the hybrid computer determining, at 1425, there is not another sample, method 1400 proceeds to 1430.

At 1430, the hybrid computer generates a "normalized floppiness metric" $\mu_i$ describing the fraction of samples for which the qubit is floppy, as follows:

$$\mu_i = n_i / N$$

where $n_i$ is the number of times the qubit is floppy, and N is the number of samples used to generate the metric.

The floppiness metric is an example metric that can be used. In other implementations, another suitable metric is used. More generally, the presently disclosed systems and methods can include collecting samples, and then performing processing of the samples to determine which qubits to advance (or retard) and by how much. Processing is not limited to determining floppiness or a floppiness metric. Another suitable processing method can be used to determine which qubits to advance (or retard) and by how much.

At 1435, the hybrid computer adds an ancilla qubit to the floppy qubit and couples it with strength J to modify the tunneling amplitude as described above. In one implementation, an ancilla qubit is added for each floppy qubit. In another implementation, an ancilla qubit is added for each of a subset of the floppy qubits. In one implementation, $\Delta_{floppy} \sim \Delta_q(1-\mu_i)$.

At 1440, the hybrid computer determines whether there is another qubit. Upon the hybrid computer determining, at 1440, there is another qubit, method 1400 returns to 1420. Upon the hybrid computer determining, at 1440, there is not another sample, method 1400 proceeds to 1445.

At 1445, the hybrid computer determines whether to collect another set of samples. Upon the hybrid computer determining, at 1445, to collect another set of samples, method 1400 returns to 1415. Upon the hybrid computer determining, at 1445, not to collect another set of samples, method 1400 proceeds to 1450, and ends.

Correcting h/J Mismatch Using Ancilla Qubits

Quantum annealing can include evolving a time-dependent Hamiltonian from a simple superposition to a useful classical problem. A shortcoming of quantum annealing is that the annealer can be biased towards an undesirable state if the state is unfavourable according to the final Hamiltonian and yet favourable according to an intermediate Hamiltonian earlier in the anneal. This can occur, for example, if both h (qubit bias) and J (coupling) terms are used. It is possible for the bias terms to be given relatively higher priority earlier in the anneal than the coupling terms. This can create a time-dependent h/J mismatch that pushes the annealer towards an unfavourable subspace (or valley in the energy landscape). To find a preferred, or correct, solution, the annealer tunnels from the unfavourable subspace into another valley.

The mismatch can occur because the coupling terms in the Ising Hamiltonian are typically weighted by the product of at least two Pauli matrices whose expectations are small in magnitude early in the anneal. In contrast, the bias terms are typically weighted by a single Pauli matrix with a higher expectation magnitude early in the anneal than the coupling terms, as follows:

$$H = \sum_{i<j} J_{ij} \sigma_i^z \sigma_j^z + \sum_i h_i \sigma_i^z$$

The presently disclosed systems and methods provide an approach to mitigating the h/J mismatch described above. The approach includes shifting each local bias $h_i$ to an ancilla qubit. For a qubit $q_i$ and an input bias $h_i=x$, an ancilla qubit $q'_i$ can be added, and a large negative bias can be provided to ancilla qubit $q'_i$, for example, $h'_i=-2$. The bias is generally chosen to be large enough that the bias on ancilla qubit $q'_i$ is not frustrated in the ground state. The coupling between qubit $q_i$ and ancilla qubit $q'_i$ can then be set to x, and the bias on qubit $q_i$ to 0. If the input bias $|x| \leq 1$, then it is in the range of acceptable coupler values.

In one implementation, if $|x| \ll 1$, then the qubit and the ancilla qubit can be coupled with a coupler having a value of $-1$, and the bias of x can be provided to the ancilla qubit ($h'_i=x$) to avoid frustrating the coupler in the ground state. In another implementation, if $|x| \ll 1$, the situation is handled the same way as described in the previous paragraph for the general case of $|x| \leq 1$.

If $|x| > 1$, then a portion of the bias $h_i$ can be shifted to the coupling to an ancilla qubit $q'_i$. In one implementation, a portion of the bias is shifted to the coupling of a single ancilla qubit. In another implementation, a portion of the bias is shifted to two or more ancilla qubits.

FIG. 15 is a flow chart that illustrates an example method 1500 for mitigating h/J mismatch using an ancilla qubit. Method 1500 illustrated by FIG. 15 comprises a plurality of acts. One or more of these acts may be performed by (or via) one or more circuits, for instance one or more processors, e.g., digital processors, and analog processors such as quantum processors, or a hybrid computer including both digital and analog processors. For the purposes of the description of FIG. 15, the acts are assumed to be performed by a hybrid computer comprising a quantum processor. Method 1500 describes an example embodiment, and those of skill in the art will appreciate that alternative embodiments may omit certain acts and/or include additional acts.

Method 1500 starts at 1505. At 1510, the hybrid computer receives a bias for a qubit. At 1515, the hybrid computer adds an ancilla qubit. At 1520, the hybrid computer determines if the bias is less than or equal to 1. Upon the hybrid computer determining, at 1520, that the bias is less than or equal to 1, method 1500 proceeds to 1525. At 1525, the hybrid computer determines if the bias is much less than 1. Upon the hybrid computer determining, at 1525, that the bias is much less than 1, method 1500 proceeds to 1530. At 1530, the hybrid computer couples the qubit and the ancilla qubit with a coupler of value $-1$. At 1535, the hybrid computer provides the qubit bias to the ancilla qubit, and method 1500 proceeds to 1540.

Upon the hybrid computer determining, at 1525, that the bias is not much less than 1, method 1500 proceeds to 1545. At 1545, the hybrid computer provides the ancilla qubit with a large negative bias (e.g. $-2$). At 1550, the hybrid computer sets the coupling between the qubit and the ancilla qubit to the input bias value. At 1555, the hybrid computer sets the bias of the qubit to zero, and method 1500 proceeds to 1540.

Upon the hybrid computing determining, at 1520, that the bias is greater than 1, method 1500 proceeds to 1560. At 1560, the hybrid computer moves a portion of the input bias onto the coupling to the ancilla qubit, and method 1500 proceeds to 1540.

At 1540, the hybrid computer determines if there is another qubit to which a bias adjustment can be made. Upon the hybrid computer determining, at 1540, that there is another qubit to which a bias adjustment can be made, method 1500 returns to 1510.

Upon the hybrid computer determining, at 1540, that there is not another qubit to which a bias adjustment can be made, method 1500 returns proceeds to 1565. At 1565, method 1500 ends.

Hybrid Computing System Comprising a Quantum Processor

Figure 16:
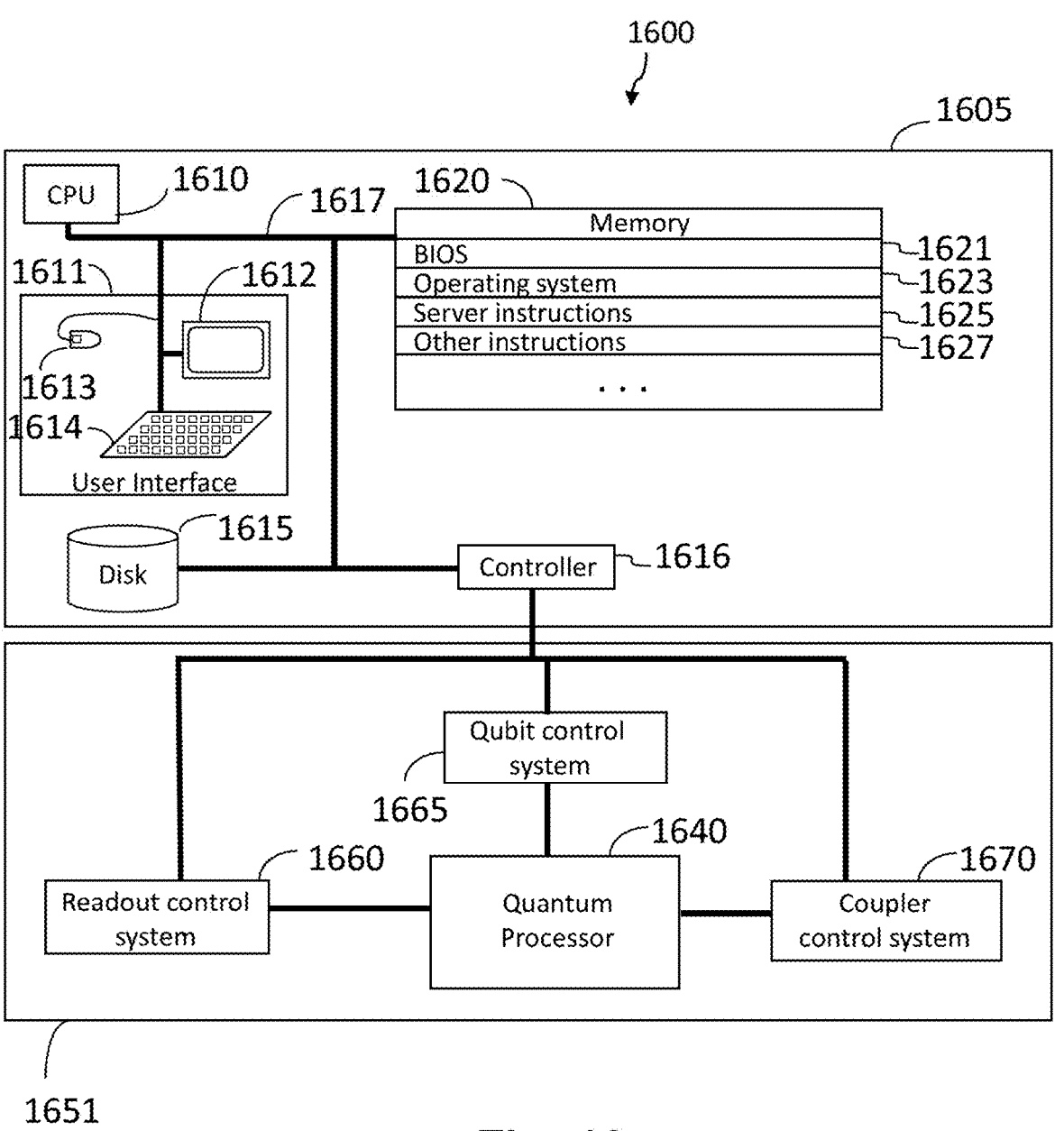
FIG. 16 is a schematic diagram of an example hybrid computing system including a digital computer coupled to an analog computer.

FIG. 16 illustrates an example hybrid computing system 1600 including a digital computer 1605 coupled to an analog computer 1651. In some implementations, the analog computer 1651 is a quantum computer and the digital computer 1605 is a classical computer. The exemplary digital computer 1605 includes a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 1605 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (sometimes known as program modules), application programs and/or data, may be located in both local and remote memory storage devices (e.g., nontransitory computer- or processor-readable media).

Digital computer 1605 may include at least one digital processor (such as, central processor unit) 1610, at least one system memory 1620, and at least one system bus 1617 that couples various system components, including system memory 1620 to digital processor(s) 1610.

The digital processor(s) 1610 may be any logic processing unit, for example with one or more cores, for instance one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 16 are of conventional design. As a result, such blocks need not be described in further detail herein, as they will be understood by those skilled in the relevant art.

Digital computer 1605 may include a user input/output subsystem 1611. In some implementations, the user input/output subsystem includes one or more user input/output components such as a display 1612, mouse 1613, and/or keyboard 1614. System bus 1617 can employ any known bus structures or architectures, including a memory bus with a memory controller, a peripheral bus, and a local bus. System memory 1620 may include non-volatile memory, such as read-only memory ("ROM"), static random access memory ("SRAM"), Flash NAND; and volatile memory such as random access memory ("RAM") (not shown), all of which are examples of nontransitory computer- or processor-readable media. A basic input/output system ("BIOS") 1621, which can form part of the ROM, contains basic routines that help transfer information between elements within digital computer 1605, such as during startup.

Digital computer 1605 may also include other non-volatile memory 1615. Non-volatile memory 1615 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 1615 may communicate with digital processor via system bus 1617 and may include appropriate interfaces or controllers 1616 coupled to system bus 1617. Non-volatile memory 1615 may serve as long-term storage for computer- or processor-readable instructions, data structures, or other data (also called program modules) for digital computer 1605.

Although digital computer 1605 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 1620. For example, system memory 1620 may store an operating system 1623, and a set of computer- or processor-readable server instructions (i.e., server modules) 1625. In some implementations, server module 1625 includes instructions for communicating with remote clients and scheduling use of resources including resources on the digital computer 1605 and analog computer 1651. For example, a Web server application and/or Web client or browser application for permitting digital computer 1605 to exchange data with sources via the Internet, corporate Intranets, or other networks, as well as with other server applications executing on server computers.

In some implementations, system memory 1620 may store other sets of computer- or processor-readable instructions 1627 such as calculation instructions, analog computer interface instructions and the like.

While shown in FIG. 16 as being stored in system memory 1620, the modules shown and other data can also be stored elsewhere including in non-volatile memory 1615 or one or more other non-transitory computer- or processor-readable media.

The analog computer 1651 can be provided in an isolated environment (not shown). For example, where the analog computer 1651 is a quantum computer, the environment shields the internal elements of the quantum computer from heat, magnetic field, and the like, and other external noise (not shown) and/or which cools the analog processor to temperatures (i.e., critical temperature) at or below which the circuitry of the analog processor becomes superconductive. In contrast, the digital computer 1605 will typically operate at much higher temperatures (e.g., room temperature) at which superconductivity does not occur and/or may employ materials that do not superconduct even at or below the critical temperature. The analog computer 1651 includes an analog processor 1640. Examples of analog processor 1640 include quantum processors such as those described below in reference to FIG. 13.

A quantum processor includes programmable elements such as qubits, couplers, and other devices. The qubits are read out via readout system 1660. These results are fed to the various sets of computer- or processor-readable instructions for the digital computer 1605 including server module 1625, or other modules 1627 stored in non-volatile memory 1615, returned over a network or the like. The qubits are controlled via qubit control system 1665. The couplers are controlled via coupler control system 1670. In some embodiments of the qubit control system 1665 and the coupler control system 1670 are used to implement quantum annealing as described herein on analog processor 1640.

In some implementations, the digital computer 1605 can operate in a networking environment using logical connections to at least one client computer system. In some implementations, the digital computer 1605 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 1605 may be connected to the LAN through an adapter or network interface card ("NIC") (communicatively linked to system bus 1617). When used in a WAN networking environment, digital computer 1605 may include an interface and modem (not shown), or a device such as NIC, for establishing communications over the WAN. Non-networked communications may additionally, or alternatively, be employed.

Exemplary Superconducting Quantum Processor for Quantum Annealing

Figure 17:
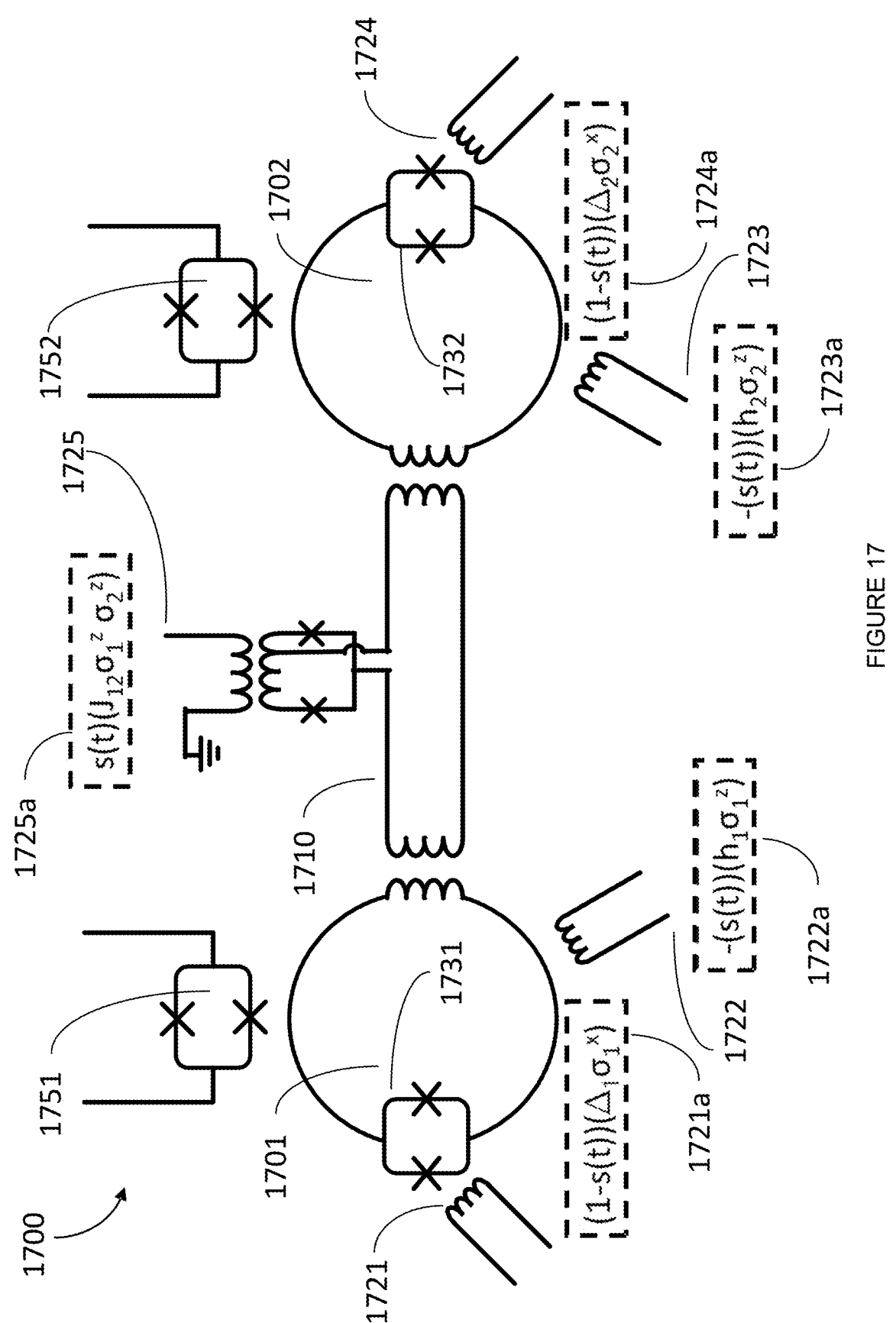
FIG. 17 is a schematic diagram of a portion of an exemplary superconducting quantum processor designed for quantum annealing (and/or adiabatic quantum computing) components from which may be used to implement the present systems and devices.

FIG. 17 is a schematic diagram of a portion of an exemplary superconducting quantum processor 1700 designed for quantum annealing (and/or adiabatic quantum computing) components from which may be used to implement the present systems and devices. The portion of superconducting quantum processor 1700 shown in FIG. 17 includes two superconducting qubits 1701, and 1702. Also shown is a tunable coupling (diagonal coupling) via coupler 1710 between qubits 1701 and 1702 (i.e., providing 2-local interaction). While the portion of quantum processor 1700 shown in FIG. 17 includes only two qubits 1701,1702 and one coupler 1710, those of skill in the art will appreciate that quantum processor 1700 may include any number of qubits and any number of couplers coupling information between them.

The portion of quantum processor 1700 shown in FIG. 17 may be implemented to physically realize quantum annealing and/or adiabatic quantum computing. Quantum processor 1700 includes a plurality of interfaces 1721-1725 that are used to configure and control the state of quantum processor 1700. Each of interfaces 1721-1725 may be realized by a respective inductive coupling structure, as illustrated, as part of a programming subsystem and/or an evolution subsystem.

Such a programming subsystem and/or evolution subsystem may be separate from quantum processor 1700, or it may be included locally (i.e., on-chip with quantum processor 1700).

In the operation of quantum processor 1700, interfaces 1721 and 1724 may each be used to couple a flux signal into a respective compound Josephson junction 1731 and 1732 of qubits 1701 and 1702, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals".

In some implementations, the tunneling term is selected to make a first portion of the qubits on the quantum processor more classical relative a second portion of the qubits. For example, qubit 1701 may be a hidden unit in a Boltzmann machine and have a smaller tunneling term relative to qubit 1702.

Similarly, interfaces 1722 and 1723 may each be used to apply a flux signal into a respective qubit loop of qubits 1701 and 1702, thereby realizing the hi terms in the system Hamiltonian. This coupling provides the diagonal $\sigma^z$ terms in the system Hamiltonian. Furthermore, interface 1725 may be used to couple a flux signal into coupler 1710, thereby realizing the $J_{ij}$ term(s) in the system Hamiltonian. This coupling provides the diagonal $$\sigma_i^z \sigma_j^z$$

terms in the system Hamiltonian.

In FIG. 17, the contribution of each of interfaces 1721-1725 to the system Hamiltonian is indicated in boxes 1721a-1725a, respectively. As shown, in the example of FIG. 17, the boxes 1721a-1725a are elements of time-varying Hamiltonians for quantum annealing and/or adiabatic quantum computing.

Throughout this specification and the appended claims, the term "quantum processor" is used to generally describe a collection of physical qubits (e.g., qubits 1701 and 1702) and couplers (e.g., coupler 1710). The physical qubits 1701 and 1702 and the coupler 1710 are referred to as the "programmable elements" of the quantum processor 1700 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 1722, 1723, and 1725) used to apply the programmable parameters to the programmable elements of the quantum processor 1700 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 1721 and 1724) used to evolve the programmable elements of the quantum processor 1700 and other associated control circuitry and/or instructions. For example, the evolution subsystem may include anneal-ing signal lines and their corresponding interfaces (1721, 1724) to the qubits (1701, 1702).

Quantum processor 1700 also includes readout devices 1751 and 1752, where readout device 1751 is associated with qubit 1701 and readout device 1752 is associated with qubit 1702. In some embodiments, such as shown in FIG. 17, each of readout devices 1751 and 1752 includes a DC-SQUID inductively coupled to the corresponding qubit. In the context of quantum processor 1700, the term "readout subsystem" is used to generally describe the readout devices 1751, 1752 used to read out the final states of the qubits (e.g., qubits 1701 and 1702) in the quantum processor to produce a bit string. The readout subsystem may also include other elements, such as routing circuitry (e.g., latching elements, a shift register, or a multiplexer circuit) and/or may be arranged in alternative configurations (e.g., an XY-address-able array, an XYZ-addressable array, etc.). Qubit readout may also be performed using alternative circuits, such as that described in PCT Patent Publication WO2012064974.

While FIG. 17 illustrates only two physical qubits 1701, 1702, one coupler 1710, and two readout devices 1751, 1752, a quantum processor (e.g., processor 1700) may employ any number of qubits, couplers, and/or readout devices, including a larger number (e.g., hundreds, thou-sands or more) of qubits, couplers and/or readout devices. The application of the teachings herein to processors with a different (e.g., larger) number of computational components should be readily apparent to those of ordinary skill in the art.

Examples of superconducting qubits include supercon-ducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent cur-rent qubits, which include a superconducting loop inter-rupted by three Josephson junctions, and the like.

The qubits and coupling devices in a quantum processor may be arranged according to an architecture into a topology such that a certain number of qubits may be laid out in a sub-topology of qubits (hereinafter, "sub-topology"). A sub-topology is a portion of a quantum processor topology comprising qubits and coupling devices. A plurality of sub-topologies may be repeated or tiled (or otherwise directly communicatively coupled to one another) over an area of a quantum processor to produce a certain quantum processor topology.

In some implementations, each sub-topology in a topol-ogy is identical to each other sub-topology in the same topology. In other implementations, one or more sub-topolo-gies in the topology comprise a different configuration of qubits and coupling devices than another sub-topology in the same topology.

The above description of illustrated embodiments, includ-ing what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be com-bined to provide further embodiments. To the extent that they are not inconsistent with the specific teachings and definitions herein, all of the US patent application publications, US patent applications, U.S. patents, International patent applications, foreign patents, and foreign patent applications referred to in this specification and/or listed in the Application Data Sheet that are commonly assigned to D-Wave Systems Inc. are incorporated herein by reference, in their entirety, including but not limited to: U.S. Pat. Nos. 7,984,012; 8,244,662; 8,174,305; 8,670,807; 8,700,689; PCT Patent Publication WO2012064974; US Patent Application Publication No. US2015/0032994, U.S. Provisional Patent Application Ser. No. 62/247,085, filed Oct. 27, 2015; U.S. Provisional Patent Application Ser. No. 62/324,210, filed Apr. 18, 2016; U.S. Provisional Patent Application Ser, No. 62/331,288, filed May 3, 2016; U.S. Provisional Patent Application Ser. No. 62/399,764, filed Sep. 26, 2016; US Provisional Patent Application No. 62/375,785; and U.S. provisional patent application Ser. No. 62/399,683, file concurrently herewith and entitled "Systems, Methods and Apparatus For Sampling from a Sampling Server". Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a hybrid computing system that comprises a quantum processor and a digital processor, the quantum processor and the digital processor communicatively coupled to one another, the quantum processor comprising a plurality of qubits, the method comprising:

receiving a pause start and a pause duration by the digital processor as inputs via a user interface;

controlling by the digital processor a quantum annealing evolution performed by the quantum processor, the controlling comprising:

initiating the quantum annealing evolution;

upon reaching the pause start, causing the quantum annealing evolution to pause for the pause duration; and completing the quantum annealing evolution;

reading out the state of the plurality of qubits by the hybrid computing system.

2. The method of claim 1 wherein receiving a pause start comprises receiving a measure of progress through the quantum annealing evolution.

3. The method of claim 1 wherein receiving a pause start and a pause duration comprises receiving a pause start and a pause duration via an Application Programming Interface.

4. The method of claim 1 wherein controlling by the digital processor a quantum annealing evolution performed by the quantum processor comprises controlling by the digital processor a quantum annealing evolution performed by a plurality of superconducting flux qubits.

5. The method of claim 1 wherein causing the quantum annealing evolution to pause for the pause duration comprises selecting a subset of qubits, causing the quantum annealing evolution to pause for one or more qubits not in the subset of qubits, and reverse annealing the subset of qubits while the one or more qubits are paused.

6. The method of claim 1 wherein receiving a pause start and a pause duration by the digital processor comprises receiving more than one pause start and pause duration and wherein the controlling comprises upon reaching each pause start, causing the quantum annealing evolution to pause for the respective pause duration.

7. The method of claim 1 wherein receiving a pause start and a pause duration by the digital processor as inputs via a user interface further comprises receiving an annealing time and wherein initiating the quantum annealing evolution comprises initiating the quantum annealing evolution in accordance with the annealing time.

8. The method of claim 1 wherein receiving a pause start and a pause duration by the digital processor as inputs via a user interface further comprises receiving one or more annealing ramp starts and annealing ramp durations and wherein upon reaching the annealing ramp start, causing the quantum annealing evolution to ramp for the annealing ramp duration.

9. The method of claim 5, further comprising: forward annealing the subset of qubits after reverse annealing the subset of qubits and before completing the quantum annealing evolution.

* * * * *